US006820252B2

United States Patent
Sakamoto et al.

(10) Patent No.: US 6,820,252 B2
(45) Date of Patent: Nov. 16, 2004

(54) SELECTIVE CONVERSION TO NATIVE CODE USING HARDWARE TRANSLATOR, SOFTWARE TRANSLATOR, AND SOFTWARE INTERPRETER

(75) Inventors: Mamoru Sakamoto, Hyogo (JP); Toyohiko Yoshida, Hyogo (JP)

(73) Assignee: Renesas Technology Corp., Tokyo (JP)

(*) Notice: Subject to any disclaimer, the term of this patent is extended or adjusted under 35 U.S.C. 154(b) by 503 days.

(21) Appl. No.: 09/995,837

(22) Filed: Nov. 29, 2001

(65) Prior Publication Data

US 2002/0099930 A1 Jul. 25, 2002

(30) Foreign Application Priority Data

Dec. 4, 2000 (JP) ........................................ 2000-368729

(51) Int. Cl.[7] ................................................. G06F 9/45
(52) U.S. Cl. ........................ 717/136; 717/138; 717/139; 717/148; 703/26
(58) Field of Search .......................... 703/26; 717/136, 717/138, 139, 148

(56) References Cited

U.S. PATENT DOCUMENTS

| 5,590,331 A | * | 12/1996 | Lewis et al. ................ 717/144 |
| 5,875,336 A | | 2/1999 | Dickol et al. ................ 717/143 |
| 5,896,522 A | * | 4/1999 | Ward et al. .................... 703/23 |
| 5,898,885 A | | 4/1999 | Dickol et al. .................. 712/36 |
| 6,026,485 A | | 2/2000 | O'Connor et al. ........... 712/226 |
| 6,279,079 B1 | | 8/2001 | Sakamoto .................... 711/133 |
| 6,292,883 B1 | * | 9/2001 | Augusteijn et al. .......... 712/209 |
| 2002/0052727 A1 | * | 5/2002 | Bond et al. .................... 703/26 |
| 2002/0069402 A1 | * | 6/2002 | Nevill et al. ................. 717/139 |

FOREIGN PATENT DOCUMENTS

| EP | 0 930 793 | 7/1999 |
| JP | 11-312152 | 11/1999 |
| WO | 2000-507015 | 6/2000 |

* cited by examiner

Primary Examiner—Kenneth S. Kim
(74) Attorney, Agent, or Firm—McDermott Will & Emery LLP

(57) ABSTRACT

A data processor includes a hardware translator converting non-native code into a native code to a processor, a software translator converting non-native code into a native code to the processor by software, and a software interpreter sequentially interpreting a code that is non-native to the processor, and executing the interpreted code using a native code of the processor. The data processor includes a circuit selecting the hardware translator, software translator or software interpreter according to a predetermined criterion for operation.

20 Claims, 56 Drawing Sheets

FIG. 2

| MNEMONIC | | OPERATION | CONDITION BIT (C) |
|---|---|---|---|
| ADD | Rdest,Rsrc | Rdest = Rdest + Rsrc | — |
| ADD3 | Rdest,Rsrc,#imm16 | Rdest = Rsrc + (sh)imm16 | — |
| ADDI | Rdest,#imm8 | Rdest = Rdest + (sb)imm8 | — |
| ADDV | Rdest,Rsrc | Rdest = Rdest + Rsrc | CHANGE |
| ADDV3 | Rdest,Rsrc,#imm16 | Rdest = Rsrc + (sh)imm16 | CHANGE |
| ADDX | Rdest,Rsrc | Rdest = Rdest + Rsrc + C | CHANGE |
| AND | Rdest,Rsrc | Rdest = Rdest & Rsrc | — |
| AND3 | Rdest,Rsrc,#imm16 | Rdest = Rsrc & (uh)imm16 | — |
| BC | pcdisp8 | if(C) PC=PC+((sb)pcdisp8<<2) | — |
| BC | pcdisp24 | if(C) PC=PC+((s24)pcdisp24<<2) | — |
| BEQ | Rsrc1,Rsrc2,pcdisp16 | if(Rsrc1 == Rsrc2) PC=PC+((sh)pcdisp16<<2) | — |
| BEQZ | Rsrc,pcdisp16 | if(Rsrc == 0) PC=PC+((sh)pcdisp16<<2) | — |
| BGEZ | Rsrc,pcdisp16 | if(Rsrc >= 0) PC=PC+((sh)pcdisp16<<2) | — |
| BGTZ | Rsrc,pcdisp16 | if(Rsrc > 0) PC=PC+((sh)pcdisp16<<2) | — |
| BL | pcdisp8 | R14=PC+4,PC=PC+((sb)pcdisp8<<2) | — |
| BL | pcdisp24 | R14=PC+4,PC=PC+((s24)pcdisp24<<2) | — |
| BLEZ | Rsrc,pcdisp16 | if(Rsrc <= 0) PC=PC+((sh)pcdisp16<<2) | — |
| BLTZ | Rsrc,pcdisp16 | if(Rsrc < 0) PC=PC+((sh)pcdisp16<<2) | — |
| BNC | pcdisp8 | if(!C) PC=PC+((sb)pcdisp8<<2) | — |
| BNC | pcdisp24 | if(!C) PC=PC+((s24)pcdisp24<<2) | — |
| BNE | Rsrc1,Rsrc2,pcdisp16 | if(Rsrc1 != Rsrc2) PC=PC+((sh)pcdisp16<<2) | — |
| BNEZ | Rsrc,pcdisp16 | if(Rsrc != 0) PC=PC+((sh)pcdisp16<<2) | — |
| BRA | pcdisp8 | PC=PC+((sb)pcdisp8<<2) | — |
| BRA | pcdisp24 | PC=PC+((s24)pcdisp24<<2) | — |
| CMP | Rsrc1,Rsrc2 | (s)Rsrc1 < (s)Rsrc2 | CHANGE |
| CMPI | Rsrc,#imm16 | (s)Rsrc < (sh)imm16 | CHANGE |
| CMPU | Rsrc1,Rsrc2 | (u)Rsrc1 < (u)Rsrc2 | CHANGE |
| CMPUI | Rsrc,#imm16 | (u)Rsrc < (u)((sh)imm16) | CHANGE |
| DIV | Rdest,Rsrc | Rdest = (s)Rdest / (s)Rsrc | — |
| DIVU | Rdest,Rsrc | Rdest = (u)Rdest / (u)Rsrc | — |
| JL | Rsrc | R14 = PC+4, PC = Rsrc | — |
| JMP | Rsrc | PC = Rsrc | — |
| LD | Rdest,@(displ16,Rsrc) | Rdest = *(s *)(Rsrc+(sh)displ16) | — |
| LD | Rdest,@Rsrc | Rdest = *(s *)Rsrc | — |
| LD | Rdest,@Rsrc+ | Rdest = *(s *)Rsrc, Rsrc += 4 | — |

FIG. 3

| MNEMONIC | | OPERATION | CONDITION BIT (C) |
|---|---|---|---|
| LD24 | Rdest,#imm24 | Rdest = imm24 & 0x00ffffff | — |
| LDB | Rdest,@(disp16,Rsrc) | Rdest = *(sb *)(Rsrc+(sh)disp16) | — |
| LDB | Rdest,@Rsrc | Rdest = *(sb *)Rsrc | — |
| LDH | Rdest,@(disp16,Rsrc) | Rdest = *(sh *)(Rsrc+(sh)disp16) | — |
| LDH | Rdest,@Rsrc | Rdest = *(sh *)Rsrc | — |
| LDI | Rdest,#imm16 | Rdest = (sh)imm16 | — |
| LDI | Rdest,#imm8 | Rdest = (sb)imm8 | — |
| LDUB | Rdest,@(disp16,Rsrc) | Rdest = *(ub *)(Rsrc+(sh)disp16) | — |
| LDUB | Rdest,@Rsrc | Rdest = *(ub *)Rsrc | — |
| LDUH | Rdest,@(disp16,Rsrc) | Rdest = *(uh *)(Rsrc+(sh)disp16) | — |
| LDUH | Rdest,@Rsrc | Rdest = *(ub *)Rsrc | — |
| LOCK | Rdest,@Rsrc | LOCK = 1, Rdest = *(s *)Rsrc | — |
| MACHI | Rsrc1,Rsrc2 | accumulator += (s)(Rsrc1 & 0xffff0000) * (s)((s)Rsrc2>>16) | — |
| MACLO | Rsrc1,Rsrc2 | accumulator += (s)(Rsrc1<<16) * (sh)Rsrc2 | — |
| MACWHI | Rsrc1,Rsrc2 | accumulator += (s)Rsrc1 * (s)((s)Rsrc2>>16) | — |
| MACWLO | Rsrc1,Rsrc2 | accumulator += (s)Rsrc1 * (sh)Rsrc2 | — |
| MUL | Rdest,Rsrc | Rdest = (s)Rdest * (s)Rsrc | — |
| MULHI | Rsrc1,Rsrc2 | accumulator = (s)(Rsrc1 & 0xffff0000) * (s)((s)Rsrc2>>16) | — |
| MULLO | Rsrc1,Rsrc2 | accumulator = (s)(Rsrc1<<16) * (sh)Rsrc2 | — |
| MULWHI | Rsrc1,Rsrc2 | accumulator = (s)Rsrc1 * (s)((s)Rsrc2>>16) | — |
| MULWLO | Rsrc1,Rsrc2 | accumulator = (s)Rsrc1 * (sh)Rsrc2 | — |
| MV | Rdest,Rsrc | Rdest = Rsrc | — |
| MVFACHI | Rdest | Rdest = accumulator >> 32 | — |
| MVFACLO | Rdest | Rdest = accumulator | — |
| MVFACMI | Rdest | Rdest = accumulator >> 16 | — |
| MVFC | Rdest,CRsrc | Rdest = CRsrc | — |
| MVTACHI | Rsrc | accumulator[0:31] = Rsrc | — |
| MVTACLO | Rsrc | accumulator[32:63] = Rsrc | — |
| MVTC | Rsrc,CRdest | CRdest = Rsrc | CHANGE |
| NEG | Rdest,Rsrc | Rdest = 0 - Rsrc | — |
| NOP | | /*no-operation*/ | — |
| NOT | Rdest,Rsrc | Rdest = ~Rsrc | — |
| OR | Rdest,Rsrc | Rdest = Rdest \| Rsrc | — |
| OR3 | Rdest,Rsrc,#imm16 | Rdest = Rsrc \| (uh)imm16 | — |
| RAC | | Round the 32-bit value in the accumulator | — |
| RACH | | Round the 16-bit value in the accumulator | — |
| REM | Rdest,Rsrc | Rdest = (s)Rdest % (s)Rsrc | — |
| REMU | Rdest,Rsrc | Rdest = (u)Rdest % (u)Rsrc | — |
| RTE | | PC = BPC & 0xfffffffc, PSW[SM,IE,C] = PSW[BSM,BIE,BC] | CHANGE |

FIG. 4

| MNEMONIC | | OPERATION | CONDITION BIT (C) |
|---|---|---|---|
| SETH | Rdest,#imm16 | Rdest = imm16 << 16 | — |
| SLL | Rdest,Rsrc | Rdest = Rdest << (Rsrc & 31) | — |
| SLL3 | Rdest,Rsrc,#imm16 | Rdest = Rsrc << (imm16 & 31) | — |
| SLLI | Rdest,#imm5 | Rdest = Rdest << imm5 | — |
| SRA | Rdest,Rsrc | Rdest = (s)Rdest >> (Rsrc & 31) | — |
| SRA3 | Rdest,Rsrc,#imm16 | Rdest = (s)Rsrc >> (imm16 & 31) | — |
| SRAI | Rdest,#imm5 | Rdest = (s)Rdest >> imm5 | — |
| SRL | Rdest,Rsrc | Rdest = (u)Rdest >> (Rsrc & 31) | — |
| SRL3 | Rdest,Rsrc,#imm16 | Rdest = (u)Rsrc >> (imm16 & 31) | — |
| SRLI | Rdest,#imm5 | Rdest = (u)Rdest >> imm5 | — |
| ST | Rsrc1,@(disp16,Rsrc2) | *(s *)(Rsrc2+(sh)displ6) = Rsrc1 | — |
| ST | Rsrc1,@+Rsrc2 | Rsrc2 += 4, *(s *)Rsrc2 = Rsrc1 | — |
| ST | Rsrc1,@-Rsrc2 | Rsrc2 -= 4, *(s *)Rsrc2 = Rsrc1 | — |
| ST | Rsrc1,@Rsrc2 | *(s *)Rsrc2 = Rsrc1 | — |
| STB | Rsrc1,@(disp16,Rsrc2) | *(sb *)(Rsrc2+(sh)displ6) = Rsrc1 | — |
| STB | Rsrc1,@Rsrc2 | *(sb *)Rsrc2 = Rsrc1 | — |
| STH | Rsrc1,@(disp16,Rsrc2) | *(sh *)(Rsrc2+(sh)displ6) = Rsrc1 | — |
| STH | Rsrc1,@Rsrc2 | *(sh *)Rsrc2 = Rsrc1 | — |
| SUB | Rdest,Rsrc | Rdest = Rdest - Rsrc | — |
| SUBV | Rdest,Rsrc | Rdest = Rdest - Rsrc | CHANGE |
| SUBX | Rdest,Rsrc | Rdest = Rdest - Rsrc - C | CHANGE |
| TRAP | #n | PSW[BSM,BIE,BC] = PSW[SM,IE,C] PSW[SM,IE,C] = PSW[SM,0,0] Call trap-handler number-n | CHANGE |
| UNLOCK | Rsrc1,@Rsrc2 | if(LOCK) { *(s *)Rsrc2 = Rsrc1; } LOCK=0 | — |
| XOR | Rdest,Rsrc | Rdest = Rdest ^ Rsrc | — |
| XOR3 | Rdest,Rsrc,#imm16 | Rdest = Rsrc ^ (uh)imm16 | — | where:
```
typedef singed int      s;   /* 32 bit signed integer (word)*/
typedef unsigned int    u;   /* 32 bit unsigned integer (word)*/
typedef signed short    sh;  /* 16 bit signed integer (halfword)*/
typedef unsigned short  uh;  /* 16 bit unsigned integer (halfword)*/
typedef signed char     sb;  /* 8 bit signed integer (byte)*/
typedef unsigned char   ub;  /* 8 bit unsigned integer (byte)*/
```

FIG. 6

| ADDRESS | Java BYTECODE | MEANING |
|---|---|---|
| 0 | iload_0 | PUSH LOCAL VARIABLE 0 ONTO STACK |
| 1 | iload_1 | PUSH LOCAL VARIABLE 1 ONTO STACK |
| 2 | iadd | POP TWO INTEGERS FROM STACK TOP, ADD THEM, AND PUSH THE RESULT ONTO STACK |
| 3 | istore_2 | POP INTEGER FROM STACK TOP, AND STORE IT INTO LOCAL VARIABLE 2 |
| 4 | iconst_1 | PUSH 1 ONTO STACK |
| 5 | iload_0 | PUSH LOCAL VARIABLE 0 ONTO STACK |
| 6 | ifge 21 | POP FROM STACK TOP, AND JUMP TO ADDRESS 21 IF POPPED VALUE IS EQUAL TO OR GREATER THAN 0 |
| 9 | iconst_2 | PUSH 2 ONTO STACK |
| 10 | iload_0 | PUSH LOCAL VARIABLE 0 ONTO STACK |
| 11 | iload_1 | PUSH LOCAL VARIABLE 1 ONTO STACK |
| 12 | iconst_3 | PUSH 3 ONTO STACK |
| 13 | iload_2 | PUSH LOCAL VARIABLE 2 ONTO STACK |
| 14 | iadd | POP TWO INTEGERS FROM STACK TOP, ADD THEM, AND PUSH THE RESULT ONTO STACK |
| 15 | idiv | POP TWO INTEGERS FROM STACK TOP, DIVIDE THE FIRST BY THE SECOND, AND PUSH THE RESULT ONTO THE STACK |
| 16 | iadd | POP TWO INTEGERS FROM STACK TOP, ADD THEM, AND PUSH THE RESULT ONTO STACK |
| 17 | imul | POP TWO INTEGERS FROM STACK TOP, MULTIPLY THEM, AND PUSH THE RESULT ONTO STACK |
| 18 | goto 28 | JUMP TO ADDRESS 28 |
| 21 | iload_0 | PUSH LOCAL VARIABLE 0 ONTO STACK |
| 22 | iconst_1 | PUSH 1 ONTO STACK |
| 23 | isub | POP TWO INTEGERS FROM STACK TOP, SUBTRACT THE SECOND FROM THE FIRST, AND PUSH THE RESULT ONTO STACK |
| 24 | iload_2 | PUSH LOCAL VARIABLE 2 ONTO STACK |
| 25 | invokestatic <int F(int, int)> | CALL METHOD int F(int, int) |
| 28 | iadd | POP TWO INTEGERS FROM STACK TOP, AND PUSH ADDED RESULT ONTO STACK |
| 29 | ireturn | POP STACK TOP, AND JUMP TO SUBROUTINE CALLING SOURCE WITH POPPED VALUE AS RETURN VALUE |

FIG. 21

| Java BYTECODE | OPERAND ALLOCATION S<js> | NATIVE CODE |
|---|---|---|
| iconst_<n> | REGISTER | ldi S<js>, #n |
| | MEMORY | ldi r0, #n<br>st r0, @S<js> |

FIG. 22

| Java BYTECODE | OPERAND ALLOCATION | | NATIVE CODE |
|---|---|---|---|
| | S<js> | L<n> | |
| iload_<n> | REGISTER | REGISTER | mv S<js>, L<n> |
| | REGISTER | MEMORY | ld S<js>, @L<n> |
| | MEMORY | REGISTER | st L<n>, @S<js> |
| | MEMORY | MEMORY | ld r0, @L<n><br>st r0, @S<js> |

FIG. 23

| Java BYTECODE | OPERAND ALLOCATION | | NATIVE CODE |
|---|---|---|---|
| | S<js-1> | L<n> | |
| istore_<n> | REGISTER | REGISTER | mv L<n>, S<js-1> |
| | REGISTER | MEMORY | st S<js-1>, @L<n> |
| | MEMORY | REGISTER | ld L<n>, @S<js-1> |
| | MEMORY | MEMORY | ld r0, @S<js-1><br>st r0, @L<n> |

FIG. 24

| Java BYTECODE | OPERAND ALLOCATION | | OPERAND ALLOCATION |
|---|---|---|---|
| | S<js-2> | S<js-1> | |
| iadd | REGISTER | REGISTER | add S<js-2>, S<js-1> |
| | REGISTER | MEMORY | ld r0, @S<js-1><br>add S<js-2>, r0 |
| | MEMORY | REGISTER | ld r0, @S<js-2><br>add r0, S<js-1><br>st r0, @S<js-2> |
| | MEMORY | MEMORY | ld r0, @S<js-2><br>ld r1, @S<js-1><br>add r0, r1<br>st r0, @S<js-2> |

FIG. 25

| Java BYTECODE | OPERAND ALLOCATION S<js-1> | NATIVE CODE |
|---|---|---|
| ifge X | REGISTER | bgez S<js-1>, TX |
| | MEMORY | ld r0, @S<js-1><br>bgez r0, TX |

TX IS ADDRESS OF NATIVE CODE GENERATED FOR Java BYTECODE OF ADDRESS X

FIG. 26

| Java BYTECODE | - | NATIVE CODE |
|---|---|---|
| goto X | - | bra TX |

TX IS ADDRESS OF NATIVE CODE GENERATED FOR Java BYTECODE OF ADDRESS X

FIG. 27

| Java BYTECODE | OPERAND ALLOCATION S<js-1> | NATIVE CODE |
|---|---|---|
| ireturn | REGISTER | mv r0, S<js-1> |
|  | MEMORY | ld r0, @S<js-1> |

FIG. 28

| Java BYTECODE | OPERAND ALLOCATION | | NATIVE CODE |
| | S<js-2> | S<js-1> | |
|---|---|---|---|
| intokestatic <int F(int, int)> | REGISTER | REGISTER | push S<js-2><br>push S<js-1><br>ld24 r0, #method_id<br>bl call_java_method<br>addi sp, #8<br>mv S<js-1>, r0 |
|  | REGISTER | MEMORY | push S<js-2><br>ld r0, @S<js-1><br>push r0<br>ld24 r0, #method_id<br>bl call_java_method<br>addi sp, #8<br>mv S<js-1>, r0 |
|  | MEMORY | REGISTER | ld r0, @S<js-2><br>push r0<br>push S<js-1><br>ld24 r0, #method_id<br>bl call_java_method<br>addi sp, #8<br>st r0, @S<js-1> |
|  | MEMORY | MEMORY | ld r0, @S<js-2><br>push r0<br>ld r0, @S<js-1><br>push r0<br>ld24 r0, #method_id<br>bl call_java_method<br>addi sp, #8<br>st r0, @S<js-1> |

FIG. 29

| REGISTER | USAGE |
|---|---|
| r0-r3 | MAY BE USED TEMPORARILY FOR CALCULATION<br>r0 AND r1 ARE USED TO STORE RETURN VALUE IN RETURNING FROM SUBROUTINE<br>VALUES OF THESE REGISTERS ARE NOT PRESERVED ACROSS SUBROUTINE CALL |
| r4-r7 | MAY BE USED TEMPORARILY FOR CALCULATION<br>VALUES OF THESE REGISTERS ARE NOT PRESERVED ACROSS SUBROUTINE CALL |
| r8-r13 | ALLOCATED FOR OPERAND STACK AND LOCAL VARIABLE VALUES<br>OF THESE REGISTERS ARE PRESERVED ACROSS SUBROUTINE CALL |
| r14(lr) | LINK REGISTER<br>USED TO STORE RETURN ADDRESS IN SUBROUTINE CALL<br>VALUE OF THIS REGISTER IS NOT PRESERVED ACROSS SUBROUTINE CALL |
| r15(sp) | STACK POINTER<br>VALUE OF THIS REGISTER IS PRESERVED ACROSS SUBROUTINE CALL |

NATIVE STACK BEFORE EXECUTING
METHOD ENTRY CODE

NATIVE STACK AFTER EXECUTING
METHOD ENTRY CODE

NATIVE STACK AFTER EXECUTING
METHOD ENTRY CODE
nStack=6, nLocal=3, nArg=2

FIG. 34

| SYMBOL | OPERAND | REGISTER ALLOCATION | |
|---|---|---|---|
| | | IMMEDIATELY AFTER CONVERSION START PROCESS | AFTER REGISTER ALLOCATION PROCESS |
| L<0> | LOCAL VARIABLE [0] (FIRST ARGUMENT) | ( 32 , SP ) | R 13 |
| L<1> | LOCAL VARIABLE [1] (SECOND ARGUMENT) | ( 28 , SP ) | ( 56 , SP ) |
| L<2> | LOCAL VARIABLE [2] | ( 24 , SP ) | ( 52 , SP ) |
| S<0> | STACK OPERAND[0] | ( 20 , SP ) | R 9 |
| S<1> | STACK OPERAND[1] | ( 16 , SP ) | R 8 |
| S<2> | STACK OPERAND[2] | ( 12 , SP ) | R 10 |
| S<3> | STACK OPERAND[3] | ( 8 , SP ) | R 11 |
| S<4> | STACK OPERAND[4] | ( 4 , SP ) | R 12 |
| S<5> | STACK OPERAND[5] | ( 0 , SP ) | ( 28 , SP ) |

FIG. 35

| | STATUS | jpc | js | jinst | jinstsize | jpcnext | consume | produce | jsnext | INSTRUCTION ADDRESS AND STACK DEPTH REGISTERED IN STACK DEPTH LIST | RS 0 | RS 1 | RS 2 | RS 3 | RS 4 | RS 5 | RL 0 | RL 1 | RL 2 |
|---|---|---|---|---|---|---|---|---|---|---|---|---|---|---|---|---|---|---|---|
| (1)  |   | 0 | 0 |          |   |    |   |   | 0 | [0,0]           | 0 | 0 | 0 | 0 | 0 | 0 | 0 | 0 | 0 |
| (2)  | 0 | 0 | 0 | iload_0  | 1 | 1  | 0 | 1 | 1 | [1,1]           | 1 | 0 | 0 | 0 | 0 | 0 | 1 | 0 | 0 |
| (3)  | 0 | 1 | 1 | iload_1  | 1 | 2  | 0 | 1 | 2 | [2,2]           | 1 | 1 | 0 | 0 | 0 | 0 | 1 | 1 | 0 |
| (4)  | 0 | 2 | 2 | iadd     | 1 | 3  | 2 | 1 | 1 | [3,1]           | 3 | 2 | 0 | 0 | 0 | 0 | 1 | 1 | 0 |
| (5)  | 0 | 3 | 1 | istore_2 | 1 | 4  | 1 | 0 | 0 | [4,0]           | 4 | 2 | 0 | 0 | 0 | 0 | 1 | 1 | 0 |
| (6)  | 0 | 4 | 0 | iconst_1 | 1 | 5  | 0 | 1 | 1 | [5,1]           | 5 | 2 | 0 | 0 | 0 | 0 | 1 | 1 | 1 |
| (7)  | 0 | 5 | 1 | iload_0  | 1 | 6  | 0 | 1 | 2 | [6,2]           | 5 | 3 | 0 | 0 | 0 | 0 | 1 | 1 | 1 |
| (8)  | 0 | 6 | 2 | ifge 21  | 3 | 9  | 2 | 0 | 1 | [9,1] [21,1]    | 5 | 4 | 0 | 0 | 0 | 0 | 2 | 1 | 1 |
| (9)  | 0 | 9 | 1 | iconst_2 | 1 | 10 | 0 | 1 | 2 | [10,2]          | 5 | 5 | 0 | 0 | 0 | 0 | 2 | 1 | 1 |
| (10) | 0 | 10 | 2 | iload_0 | 1 | 11 | 0 | 1 | 3 | [11,3]          | 5 | 5 | 1 | 0 | 0 | 0 | 3 | 1 | 1 |
| (11) | 0 | 11 | 3 | iload_1 | 1 | 12 | 0 | 1 | 4 | [12,4]          | 5 | 5 | 1 | 1 | 0 | 0 | 3 | 2 | 1 |
| (12) | 0 | 12 | 4 | iconst_3 | 1 | 13 | 0 | 1 | 5 | [13,5]         | 5 | 5 | 1 | 1 | 1 | 0 | 3 | 2 | 1 |
| (13) | 0 | 13 | 5 | iload_2  | 1 | 14 | 0 | 1 | 6 | [14,6]         | 5 | 5 | 1 | 1 | 1 | 1 | 3 | 2 | 2 |
| (14) | 0 | 14 | 6 | iadd     | 1 | 15 | 2 | 1 | 5 | [15,5]         | 5 | 5 | 1 | 1 | 3 | 2 | 3 | 2 | 2 |
| (15) | 0 | 15 | 5 | idiv     | 1 | 16 | 2 | 1 | 4 | [16,4]         | 5 | 5 | 3 | 3 | 4 | 2 | 3 | 2 | 2 |
| (16) | 0 | 16 | 4 | iadd     | 1 | 17 | 2 | 1 | 3 | [17,3]         | 5 | 5 | 4 | 4 | 4 | 2 | 3 | 2 | 2 |
| (17) | 0 | 17 | 3 | imul     | 1 | 18 | 2 | 1 | 2 | [18,2]         | 5 | 7 | 4 | 4 | 4 | 2 | 3 | 2 | 2 |
| (18) | 0 | 18 | 2 | goto 28  | 3 | 21 | 0 | 0 | 2 | [28,2]         | 5 | 7 | 4 | 4 | 4 | 2 | 3 | 2 | 2 |

FIG. 36

| STATUS | jpc | js | jinst | jinstsize | jpcnext | consume | produce | jsnext | INSTRUCTION ADDRESS AND STACK DEPTH REGISTERED IN STACK DEPTH LIST | RS 0 | RS 1 | RS 2 | RS 3 | RS 4 | RS 5 | RL 0 | RL 1 | RL 2 |
|---|---|---|---|---|---|---|---|---|---|---|---|---|---|---|---|---|---|---|
| (19) | 21 | 1 | iload_0 | 1 | 22 | 0 | 1 | 2 | | | | | | | | | | |
| (20) | 22 | 2 | iconst_1 | 1 | 23 | 0 | 1 | 3 | [22,2] | 5 | 8 | 4 | 4 | 4 | 2 | 0 | 1 | 2 |
| (21) | 23 | 3 | isub | 1 | 24 | 2 | 1 | 2 | [23,3] | 5 | 8 | 5 | 4 | 4 | 2 | 2 | 2 | 2 |
| | | | | | | | | | [24,2] | 5 | 10 | 6 | 4 | 4 | 2 | 2 | 2 | 2 |
| (22) | 24 | 2 | iload_2 | 1 | 25 | 0 | 1 | 3 | [25,3] | 5 | 10 | 7 | 4 | 4 | 2 | 2 | 2 | 2 |
| (23) | 25 | 3 | invokestatic c <int> | 3 | 28 | 2 | 1 | 2 | [28,2] | 5 | 12 | 8 | 4 | 4 | 2 | 2 | 2 | 2 |
| (24) | 28 | 2 | fadd, | 1 | 29 | 2 | 1 | 1 | [29,1] | 7 | 13 | 8 | 4 | 4 | 2 | 2 | 2 | 2 |
| (25) | 29 | 1 | ireturn | 1 | 30 | 1 | 0 | 0 | | 8 | 13 | 8 | 4 | 4 | 2 | 2 | 2 | 2 |

FIG. 37

| STATUS | jpc | jinst | jinstsize | jpcnext | js | NATIVE CODE |
|---|---|---|---|---|---|---|
| (1) | | | | | | addi sp, #-(nLocal-nArg+nStack)*4 |
| | | | | | | push r8 |
| | | | | | | push r9 |
| | | | | | | push r10 |
| | | | | | | push r11 |
| | | | | | | push r12 |
| | | | | | | push r13 |
| | | | | | | push lr |
| | | | | | | ld L<0>, @((nLocal+nStack+nSave-1)*4,sp) |
| (2) | 0 | iload_0 | 1 | 1 | 0 | mv S<0>, L<0> |
| (3) | 1 | iload_1 | 1 | 2 | 1 | ld S<1>, @L<1> |
| (4) | 2 | iadd | 1 | 3 | 2 | add S<0>, S<1> |
| (5) | 3 | istore_2 | 1 | 4 | 1 | st S<0>, @L<2> |
| (6) | 4 | iconst_1 | 1 | 5 | 0 | ldi S<0>, #1 |
| (7) | 5 | iload_0 | 1 | 6 | 1 | mv S<1>, L<0> |
| (8) | 6 | ifge 21 | 3 | 9 | 2 | bgez S<1>, T21 |
| (9) | 9 | iconst_2 | 1 | 10 | 1 | ldi S<1>, #2 |
| (10) | 10 | iload_0 | 1 | 11 | 2 | mv S<2>, L<0> |
| (11) | 11 | iload_1 | 1 | 12 | 3 | ld S<3>, @L<1> |
| (12) | 12 | iconst_3 | 1 | 13 | 4 | ldi S<4>, #3 |
| (13) | 13 | iload_2 | 1 | 14 | 5 | ld r0, @L<2> |
| | | | | | | st r0, @S<5> |
| (14) | 14 | iadd | 1 | 15 | 6 | ld r0, @S<5> |
| | | | | | | add S<4>, r0 |
| (15) | 15 | idiv | 1 | 16 | 5 | div S<3>, S<4> |
| (16) | 16 | iadd | 1 | 17 | 4 | add S<2>, S<3> |
| (17) | 17 | imul | 1 | 18 | 3 | mul S<1>, S<2> |
| (18) | 18 | goto 28 | 3 | 21 | 2 | bra T28 |
| (19) | 21 | iload_0 | 1 | 22 | 1 | T21: mv S<1>, L<0> |
| (20) | 22 | iconst_1 | 1 | 23 | 2 | ldi S<2>, #1 |
| (21) | 23 | isub | 1 | 24 | 3 | sub S<1>, S<2> |

FIG. 38

| STATUS | jpc | jinst | jinstsize | jpcnext | js | NATIVE CODE |
|---|---|---|---|---|---|---|
| (22) | 24 | iload_2 | 1 | 25 | 2 | ld S<2>, @L<2> |
| (23) | 25 | invokestatic <int F(int, int)> | 3 | 28 | 3 | push S<2><br>push S<1><br>ld24 r0, #methodId<br>jl callJavaMethod<br>addi sp, #8<br>mv S<1>, r0 |
| (24) | 28 | iadd | 1 | 29 | 2 | T28: add S<0>, S<1> |
| (25) | 29 | ireturn | 1 | 30 | 1 | mv r0, S<0><br>pop lr<br>pop r13<br>pop r12<br>pop r11<br>pop r10<br>pop r9<br>pop r8<br>addi sp, #(nLocal-nArg+nStack)*4<br>jmp lr |

FIG. 43

| REGISTER | USAGE |
|---|---|
| r0-r3 | MAY BE USED TEMPORARILY FOR CALCULATION<br>r0 AND r1 ARE USED TO STORE RETURN VALUE IN RETURNING FROM SUBROUTINE<br>VALUES OF THESE REGISTERS ARE NOT PRESERVED ACROSS SUBORDINATE CALL |
| r4-r7 | MAY BE USED TEMPORARILY FOR CALCULATION<br>VALUES OF THESE REGISTERS ARE NOT PRESERVED ACROSS SUBORDINATE CALL |
| r8-r13 | ALLOCATED FOR OPERAND STACK<br>ALLOCATE OPERAND STACK [4n] TO r8<br>ALLOCATE OPERAND STACK [4n+1] TO r9<br>ALLOCATE OPERAND STACK [4n+2] TO r10<br>ALLOCATE OPERAND STACK [4n+3] TO r11 (n=0,1,2...)<br>VALUES OF THESE REGISTERS ARE PRESERVED ACROSS SUBORDINATE CALL |
| r12-r13 | ALLOCATED FOR LOCAL VARIABLES<br>VALUES OF THESE REGISTERS ARE PRESERVED ACROSS SUBORDINATE CALL |
| r14(lr) | LINK REGISTER<br>USED TO STORE RETURN ADDRESS IN SUBROUTINE CALL<br>VALUE OF THIS REGISTER IS NOT PRESERVED ACROSS SUBORDINATE CALL |
| r15(sp) | STACK POINTER<br>VALUE OF THIS REGISTER IS PRESERVED ACROSS SUBORDINATE CALL |

FIG. 46

| SYMBOL | OPERAND | REGISTER ALLOCATION | |
| --- | --- | --- | --- |
| | | IMMEDIATELY AFTER CONVERSION START PROCESS | AFTER REGISTER ALLOCATION PROCESS |
| L<0> | LOCAL VARIABLE [0] (FIRST ARGUMENT) | ( 60 ,SP) | R12 |
| L<1> | LOCAL VARIABLE [1] (SECOND ARGUMENT) | ( 56 ,SP) | ( 56 ,SP) |
| L<2> | LOCAL VARIABLE [2] | ( 52 ,SP) | R13 |
| S<0> | STACK OPERAND[0] | ( 48 ,SP) | R8 |
| S<1> | STACK OPERAND[1] | ( 44 ,SP) | R9 |
| S<2> | STACK OPERAND[2] | ( 40 ,SP) | R10 |
| S<3> | STACK OPERAND[3] | ( 36 ,SP) | R11 |
| S<4> | STACK OPERAND[4] | ( 32 ,SP) | R8 |
| S<5> | STACK OPERAND[5] | ( 28 ,SP) | R9 |

FIG. 47

| STATUS | jpc | jinst | Jinstsize | jpcnext | js | b | consume | produce | low | high | NATIVE CODE |
|---|---|---|---|---|---|---|---|---|---|---|---|
| (1) | 0 | | | | | 0 | | | | | addi sp, #-(nLocal-nArg+nStack)*4 |
| | | | | | | | | | | | push r8 |
| | | | | | | | | | | | push r9 |
| | | | | | | | | | | | push r10 |
| | | | | | | | | | | | push r11 |
| | | | | | | | | | | | push r12 |
| | | | | | | | | | | | push r13 |
| | | | | | | | | | | | push lr |
| | | | | | | | | | | | ld L<0>, @((nLocal+nStack+nSave-1)*4,sp) |
| | | | | | | | | | | | ld L<1>, @((nLocal+nStack+nSave-2)*4,sp) |
| (2) | 0 | iload_0 | 1 | 1 | 1 | 0 | 0 | 1 | 0 | 1 | mv S<0>, L<0> |
| (3) | 1 | iload_1 | 1 | 2 | 2 | 0 | 0 | 1 | 1 | 2 | mv S<1>, L<1> |
| (4) | 2 | iadd | 1 | 3 | 1 | 0 | 2 | 1 | 0 | 2 | add S<0>, S<1> |
| (5) | 3 | istore_2 | 1 | 4 | 0 | 0 | 1 | 0 | 0 | 1 | st S<0>, @L<2> |
| (6) | 4 | iconst_1 | 1 | 5 | 1 | 0 | 0 | 1 | 0 | 1 | ldi S<0>, #1 |
| (7) | 5 | iload_0 | 1 | 6 | 2 | 0 | 0 | 1 | 1 | 2 | mv S<1>, L<0> |
| (8) | 6 | ifge 21 | 3 | 9 | 0 | 0 | 1 | 0 | 1 | 2 | bgez S<1>, T21 |
| (9) | 9 | iconst_2 | 1 | 10 | 1 | 0 | 0 | 1 | 1 | 2 | ldi S<1>, #2 |
| (10) | 10 | iload_0 | 1 | 11 | 2 | 0 | 0 | 1 | 2 | 3 | mv S<2>, L<0> |
| (11) | 11 | iload_1 | 1 | 12 | 3 | 0 | 0 | 1 | 3 | 4 | ld S<3>, @L<1> |
| (12) | 12 | iconst_3 | 1 | 13 | 4 | 0 | 0 | 1 | 4 | 5 | st S<4>, @SAVE<0> |
| | | | | | | | | | | | #3 |
| (13) | 13 | iload_2 | 1 | 14 | 5 | 1 | 0 | 1 | 5 | 6 | st S<1>, @SAVE<1> |
| | | | | | | | | | | | ld S<5>, @L<2> |
| (14) | 14 | iadd | 1 | 15 | 6 | 2 | 2 | 1 | 4 | 6 | add S<4>, S<5> |
| (15) | 15 | idiv | 1 | 16 | 5 | 2 | 2 | 1 | 3 | 5 | div S<3>, S<4> |
| (16) | 16 | iadd | 1 | 17 | 4 | 2 | 2 | 1 | 2 | 4 | add S<2>, S<3> |
| (17) | 17 | imul | 1 | 18 | 3 | 2 | 2 | 1 | 1 | 3 | ld S<1>, @SAVE<1> |
| | | | | | | | | | | | mul S<1>, S<2> |
| (18) | 18 | goto 28 | 3 | 21 | 2 | 1 | 0 | 0 | 0 | 2 | ld S<0>, @SAVE<0> |
| | | | | | | | | | | | bra T28 |
| (19) | 21 | iload_0 | 1 | 22 | 1 | 0 | 0 | 0 | 1 | 2 | T21: mv S<1>, L<0> |
| (20) | 22 | iconst_1 | 1 | 23 | 2 | 0 | 0 | 0 | 1 | 3 | ldi S<2>, #1 |
| (21) | 23 | isub | 1 | 24 | 1 | 0 | 2 | 1 | 1 | 3 | sub S<1>, S<2> |
| (22) | 24 | iload_2 | 1 | 25 | 2 | 0 | 0 | 1 | 2 | 3 | ld S<2>, @L<2> |

FIG. 48

| STATUS | jpc | jinst | jinstsize | jpcnext | js | b | consume | produce | low | high | NATIVE CODE |
|---|---|---|---|---|---|---|---|---|---|---|---|
| (24) | 28 | iadd | 1 | 29 | 2 | 0 | 2 | 1 | 1 | 2 | T28: add S<0>, S<1> |
| (25) | 29 | ireturn | 1 | 30 | 1 | 0 | 1 | 0 | 0 | 1 | mv r0, S<0><br>pop lr<br>pop r13<br>pop r12<br>pop r11<br>pop r10<br>pop r9<br>pop r8<br>addi sp, #(nLocal-nArg+nStack)*4<br>jmp lr |

FIG. 55

| Java bytecode | Operand Allocation P<js-2> | Operand Allocation P<js-1> | Case No. | Native Code | Other Process |
|---|---|---|---|---|---|
| iadd | Immediate value (below 16-bit signed range) | Immediate value (below 16-bit signed range) | 1 | None | Record immediate value of P<js-2>+P<js-1> in P<js-2> |
| | | S<js-1> | 2 | add3 S<js-2>, S<js-1>, #P<js-2> | Record S<js-2> in P<js-2> |
| | | SAVE<js-1> | 3 | ld r0, @SAVE<js-1><br>add3 S<js-2>, r0, #P<js-2> | |
| | | Local variable L<n> (register) | 4 | add3 S<js-2>, L<n>, #P<js-2> | |
| | | Local variable L<n> (memory) | 5 | ld S<js-2>, @L<n><br>add3 S<js-2>, S<js-2>, #P<js-2> | |
| | Immediate value (above 16-bit signed range) | Immediate value (below 16-bit signed range) | 6 | None | Record immediate value of P<js-2>+P<js-1> in P<js-2> |
| | | S<js-1> | 7 | ldh S<js-2>, #high(P<js-2>)<br>or3 S<js-2>, S<js-2>, #low(P<js-2>)<br>add S<js-2>, S<js-1> | Record S<js-2> in P<js-2> |
| | | SAVE<js-1> | 8 | ld r0, @SAVE<js-1><br>ldh S<js-2>, #high(P<js-2>)<br>or3 S<js-2>, S<js-2>, #low(P<js-2>)<br>add S<js-2>, r0 | |
| | | Local variable L<n> (register) | 9 | ldh S<js-2>, #high(P<js-2>)<br>or3 S<js-2>, S<js-2>, #low(P<js-2>)<br>add S<js-2>, L<n> | |
| | | Local variable L<n> (memory) | 10 | ldh S<js-2>, #high(P<js-2>)<br>or3 S<js-2>, S<js-2>, #low(P<js-2>)<br>ld r0, @L<n><br>add S<js-2>, r0 | |
| | S<js-2> | Immediate value (below 8-bit signed range) | 11 | addi S<js-2>, #P<js-1> | Record S<js-2> in P<js-2> |
| | | Immediate value (below 16-bit signed range) | 12 | add3 S<js-2>, S<js-2>, #P<js-1> | |
| | | Immediate value (above 16-bit signed range) | 13 | ldh r0, #high(P<js-1>)<br>or3 r0, r0, #low(P<js-1>)<br>add S<js-2>, r0 | |
| | | S<js-1> | 14 | add S<js-2>, S<js-1> | |
| | | SAVE<js-1> | 15 | ld r0, @S<js-1><br>add S<js-2>, r0 | |
| | | Local variable L<n> (register) | 16 | add S<js-2>, L<n> | |
| | | Local variable L<n> (memory) | 17 | ld r0, @L<n><br>add S<js-2>, r0 | |
| | SAVE<js-2> | Immediate value (below 8-bit signed range) | 18 | ld S<js-2>, @SAVE<js-2><br>addi S<js-2>, #P<js-1> | Record S<js-2> in P<js-2> |
| | | Immediate value (below 16-bit signed range) | 19 | ld S<js-2>, @SAVE<js-2><br>add3 S<js-2>, S<js-2>, #P<js-1> | |
| | | Immediate value (above 16-bit signed range) | 20 | ld S<js-2>, @SAVE<js-2><br>ldh r0, #high(P<js-1>)<br>or3 r0, r0, #low(P<js-1>)<br>add S<js-2>, r0 | |
| | | S<js-1> | 21 | ld S<js-2>, @SAVE<js-2><br>add S<js-2>, S<js-1> | |
| | | SAVE<js-1> | 22 | ld S<js-2>, @SAVE<js-2><br>ld r0, @S<js-1><br>add S<js-2>, r0 | |
| | | Local variable L<n> (register) | 23 | ld S<js-2>, @SAVE<js-2><br>add S<js-2>, L<n> | |
| | | Local variable L<n> (memory) | 24 | ld S<js-2>, @SAVE<js-2><br>ld r0, @L<n><br>add S<js-2>, r0 | |
| | Local variable L<m> (register) | Immediate value (below 16-bit signed range) | 25 | add3 S<js-2>, L<n>, #P<js-1> | Record S<js-2> in P<js-2> |
| | | Immediate value (above 16-bit signed range) | 26 | mv S<js-2>, L<n><br>ldh r0, #high(P<js-1>)<br>or3 r0, r0, #low(P<js-1>)<br>add S<js-2>, r0 | |
| | | S<js-1> | 27 | mv S<js-2>, L<m><br>add S<js-2>, S<js-1> | |
| | | SAVE<js-1> | 28 | ld r0, @SAVE<js-1><br>mv S<js-2>, L<m><br>add S<js-2>, r0 | |
| | | Local variable L<n> (register) | 29 | mv S<js-2>, L<m><br>add S<js-2>, L<n> | |
| | | Local variable L<n> (memory) | 30 | ld S<js-2>, @L<n><br>add S<js-2>, L<m> | |
| | Local variable L<m> (memory) | Immediate value (below 8-bit signed range) | 31 | ld S<js-2>, @L<n><br>addi S<js-2>, #P<js-1> | Record S<js-2> in P<js-2> |
| | | Immediate value (below 16-bit signed range) | 32 | ld S<js-2>, @L<n><br>add3 S<js-2>, S<js-2>, #P<js-1> | |
| | | Immediate value (above 16-bit signed range) | 33 | ld S<js-2>, @L<n><br>ldh r0, #high(P<js-1>)<br>or3 r0, r0, #low(P<js-1>)<br>add S<js-2>, r0 | |
| | | S<js-1> | 34 | ld S<js-2>, @L<m><br>add S<js-2>, S<js-1> | |
| | | SAVE<js-1> | 35 | ld r0, @SAVE<js-1><br>ld S<js-2>, @L<m><br>add S<js-2>, r0 | |
| | | Local variable L<n> (register) | 36 | ld S<js-2>, @L<m><br>add S<js-2>, L<n> | |
| | | Local variable L<n> (Memory) | 37 | ld S<js-2>, @L<m><br>ld r0, @L<n><br>add S<js-2>, r0 | |

FIG. 63

| STATUS | jpc | jinst | jinstsize | jpcnext | js | P<0> | P<1> | P<2> | P<3> | P<4> | P<5> | NATIVE CODE |
|---|---|---|---|---|---|---|---|---|---|---|---|---|
| (1) | | | | | | | | | | | | addi sp, #-(nLocal-nArg+nStack)*4 |
| | | | | | | | | | | | | push r8 |
| | | | | | | | | | | | | push r9 |
| | | | | | | | | | | | | push r10 |
| | | | | | | | | | | | | push r11 |
| | | | | | | | | | | | | push r12 |
| | | | | | | | | | | | | push r13 |
| | | | | | | | | | | | | push lr |
| | | | | | | | | | | | | ld L<0>, @((nLocal+nStack+nSave-1)*4,sp) |
| | | | | | | | | | | | | ld L<1>, @((nLocal+nStack+nSave-2)*4,sp) |
| (2) | 0 | iload_0 | 1 | 1 | 0 | L<0> | — | | | | — | |
| (3) | 1 | iload_1 | 1 | 2 | 1 | L<0> | L<1> | — | | — | — | mv S<0>, L<0> |
| (4) | 2 | iadd | 1 | 3 | 2 | S<0> | — | | | — | — | add S<0>, L<1> |
| (5) | 3 | istore_2 | 1 | 4 | 1 | — | — | | | — | — | st S<0>, @L<2> |
| (6) | 4 | iconst_1 | 1 | 5 | 0 | 1 | — | | | — | — | |
| (7) | 5 | iload_0 | 1 | 6 | 1 | 1 | L<0> | | | — | — | |
| (8) | 6 | ifge 21 | 3 | 9 | 2 | S<0> | — | | | — | — | ldi S<0>, #1 |
| | | | | | | | | | | | | bgez L<0>, T17 |
| (9) | 9 | iconst_2 | 1 | 10 | 1 | S<0> | 2 | — | | — | — | |
| (10) | 10 | iload_0 | 1 | 11 | 2 | S<0> | 2 | L<0> | — | — | — | |
| (11) | 11 | iload_1 | 1 | 12 | 3 | S<0> | 2 | L<0> | L<1> | — | — | |
| (12) | 12 | iconst_3 | 1 | 13 | 4 | S<0> | 2 | L<0> | L<1> | 3 | — | |
| (13) | 13 | iload_2 | 1 | 14 | 5 | S<0> | 2 | L<0> | L<1> | 3 | L<2> | |
| (14) | 14 | iadd | 1 | 15 | 6 | SAVE<0> | 2 | L<0> | L<1> | S<4> | — | st S<0>, @SAVE<0> |
| | | | | | | | | | | | | ld S<4>, @L<2> |
| | | | | | | | | | | | | add3 S<4>, S<4>, #3 |
| (15) | 15 | idiv | 1 | 16 | 5 | SAVE<0> | 2 | L<0> | S<3> | — | — | mv S<3>, L<1> |
| | | | | | | | | | | | | div S<3>, S<4> |
| (16) | 16 | iadd | 1 | 17 | 4 | SAVE<0> | 2 | S<2> | — | — | — | mv S<2>, L<0> |
| | | | | | | | | | | | | add S<2>, S<3> |
| (17) | 17 | imul | 1 | 18 | 3 | SAVE<0> | S<1> | — | | — | — | sll3 S<1>, S<2>, #1 |
| (18) | 18 | goto 28 | 3 | 21 | 2 | S<0> | S<1> | — | | — | — | ld S<0>, @SAVE<0> |
| | | | | | | | | | | | | bra T28 |
| (18') | | | | | | S<0> | — | | | — | — | |

FIG. 64

| STATUS | jpc | jinst | jinstsize | jpcnext | js | p<0> | p<1> | p<2> | p<3> | p<4> | p<5> | NATIVE CODE |
|---|---|---|---|---|---|---|---|---|---|---|---|---|
| (19) | 21 | iload_0 | 1 | 22 | 1 | | | | | | | 21: |
| (20) | 22 | iconst_1 | 1 | 23 | 2 | S<0> | L<0> | — | | | | |
| (21) | 23 | isub | 1 | 24 | 3 | S<0> | L<0> | -1 | | | | add3 S<1>, L<0>, #-1 |
| (22) | 24 | iload_2 | 1 | 25 | 2 | S<0> | S<1> | — | | | | |
| (23) | 25 | invokestatic<br><int F(int, int)> | 3 | 28 | 3 | | S<1> | L<2> | | | | ld r0, @L<2><br>push r0<br>push S<1><br>ld24 r0, #methodId<br>jl callJavaMethod<br>addi sp, #8<br>mv S<1>, r0 |
| (24) | 28 | iadd | 1 | 29 | 2 | S<0> | S<1> | — | | | | 28: add S<0>, S<1> |
| (25) | 29 | ireturn | 1 | 30 | 1 | S<0> | — | | | | | mv r0, S<0><br>pop lr<br>pop r13<br>pop r12<br>pop r11<br>pop r10<br>pop r9<br>pop r8<br>addi sp, #(nLocal-nArg+nStack)*4<br>jmp lr |

SELECTIVE CONVERSION TO NATIVE CODE USING HARDWARE TRANSLATOR, SOFTWARE TRANSLATOR, AND SOFTWARE INTERPRETER

BACKGROUND OF THE INVENTION

1. Field of the Invention

The present invention relates to data processors, and particularly to a data processor including the function incorporated therein to execute non-native codes in addition to codes native to the processor.

2. Description of the Background Art

Processors are designed and fabricated based on certain architectures. In the architecture, the instruction system, instruction format and the like are specified. The hardware is produced so as to execute instructions of such instruction formats efficiently. The program executed in a data processor is generally written in instruction codes of the mounted processor (referred to as "native code").

However, there is a case where a program written in an instruction code of a processor other than the mounted processor (referred to as "non-native code") is to be executed. For example, there may be the case where a program for an old processor with an old architecture is to be executed on a new processor with a new architecture when the program for that new processor is not yet fully developed. Another example is the case where a program written in the language such as Java™ bytecode ("Java" is a trademark of Sun Microsystems, Incorporation) for a virtual processor (called "Java virtual machine") is to be executed in various different types of apparatuses with different processors.

The conventional practice employed as the means for executing non-native code with a processor includes a software interpreter, a software translator and a hardware translator.

The procedure using a software interpreter is implemented by executing a series of processing steps set forth below with software called a software interpreter on the processor.

(1) Read out non-native code from the memory.

(2) Dispatch a relevant non-native code to the processing routine associated with the readout non-native code.

(3) Execute the processing routine associated with the readout non-native code.

(4) Update the program counter of the non-native code.

This software interpreter per se is written in the code native to the mounted processor.

Software is so flexible that it can actually realize any process if the processing speed is not taken into account. Therefore, the software interpreter can be easily realized. However, there is a problem that the execution speed is degraded since the steps of (1), (2) and (4) are also required in addition to the actual process of step (3).

"Translator" implies a device that converts the program of non-native codes into an equivalent program of native codes. A hardware translator performs this conversion in hardware and a software translator performs this conversion with software.

A hardware translator is disclosed in, for example, U.S. Pat. No. 5,875,336. According to the hardware translator, native codes to realize a process of equal contents to respective non-native codes are generated by hardware in order to simulate the operation of respective instructions of the non-native codes. However, the execution speed of the resultant native code of conversion is inevitably degraded by various reasons set forth in the following.

First, in order to read out the non-native code, the translator must simulate, not only the operation result, but also the PC (Program Counter) value of the non-native code or also the flags, if necessary. Therefore, the operation of one non-native code will be converted into a plurality of native codes.

Secondly, even if there are more registers provided in the processor than the expected number of registers provided in the processor based on the non-native code, the excessive registers cannot be utilized. For example, in the case of the translator, the memory operand of the non-native code is still converted into a memory operand in the native code, and is not allocated to the register.

One solution to the problem that the execution speed of the resultant native code after conversion is degraded is proposed in U.S. Pat. No. 5,898,885. It is premised that the non-native code is a stack machine code such as Java bytecode. According to the proposed procedure, a native code is generated so that, when non-native code that pops data from a stack succeeds non-native code that pushes the data on the stack, these non-native codes will be executed together. Accordingly, the number of accesses to the memory is reduced. As a result, the execution speed can be improved. Similar art is proposed in U.S. Pat. No. 6,026,485.

However, this invention has the disadvantage that the procedure cannot be applied unless there is a data popping step right after the data pushing step due to its constitutional limitation.

The above-described problem of speed degradation is also encountered in the conversion by a software translator. However, the software translator differs from the hardware translator in the flexibility of allowing the conversion process to be implemented in a larger program unit (subroutine unit or class unit) instead of the instruction unit. Since unnecessary memory access and the like can be eliminated in the software translator, speed degradation can be suppressed to a certain level. However, the conversion process will become complicated if a native code that has little speed degradation during execution is to be generated and the conversion processing time will be increased.

In order to suppress such overhead of the conversion processing time, a possible consideration is the usage of the procedure to store in the memory the native codes once converted and generated by the software translator. When the same program portion is to be executed again, the conversion process is not carried out but the resultant native codes of conversion that are stored in the memory are used again. The conversion is skipped when the program portion that has been already converted is encountered at the second time and et seq. Therefore, the execution speed is increased compared to the case where conversion was carried out every time.

However, this procedure requires a great capacity of memory in order to store the resultant native codes after the program of the non-native codes has been converted. As a result, another problem that the memory cost is increased will occur.

In order to suppress increase of the memory capacity for the storage of the resultant native codes of conversion, a possible consideration is to set the size of the RAM (Random Access Memory) that is used to store the resultant native codes of conversion constant. According to this procedure, the RAM is used likewise the so-called cache memory. In the present specification, this RAM is called "software cache".

According to this procedure, the non-native codes are converted into native codes in the subroutine (or method) unit to be additionally stored in the RAM. When this RAM becomes full, the native codes of a subroutine (or method) that has already been executed and has low possibility of being executed thereafter is dismissed from the RAM. The subroutine (or method) formed of new resultant native codes of conversion is stored in that released and available region of the RAM.

By the usage of such a software cache, it is expected that the software translator can have the increase of the memory capacity suppressed to a certain level. However, the number of conversion processes increases in comparison to the case where all the converted instructions are stored in the memory. As a result, the overhead will be increased. If conversion process is simplified to reduce the conversion processing time for example, if each instruction of non-native codes is converted one by one rather than several of them are converted as a group, the execution speed of the resultant native code after conversion will be degraded, as described before.

Thus, the software interpreter has the problem that the execution speed is significantly reduced. It is also difficult to prevent reduction in the execution speed for the hardware translator, though degradation of the execution speed is not as notable as for the software interpreter. There is also the problem that the hardware amount will be increased in order to translate all the non-native codes. Furthermore, it is noted that improving the execution speed and preventing memory increase are rather incompatible.

SUMMARY OF THE INVENTION

In view of the foregoing, an object of the present invention is to provide a data processor including a translator of non-native codes that can execute non-native codes at high speed with a small amount of hardware.

According to an aspect of the present invention, a data processor includes a processor with a predetermined instruction group as a native code, a hardware translator converting a code which is non-native into one or more native codes of a processor, and a memory storing a program formed of a native code that operates on the processor. The program stored in the memory includes a software translator program operating on the processor to convert a code which is non-native to the processor into one or more native codes of the processor, a software interpreter program operating on the processor to sequentially interpret a code which is non-native to the processor and execute the interpreted code using a native code of the processor, and a selection program selecting the execution of a native code output by the hardware translator, or the execution of a native code output by the software translator and stored in the memory, or sequential interpretation and execution of non-native code by the execution of the software interpreter, according to a predetermined criterion to operate the processor.

Preferably, the selection program includes a program to select execution of a native code output by the hardware translator, or execution of a native code output by the software translator, or sequential interpretation and execution of non-native code by execution of the software interpreter, depending upon the type and execution frequency of the non-native code read out and the status of the memory to operate the processor.

Further preferably, the selection program includes a program selecting execution of a native code output by the hardware translator, or execution of a native code output by the software translator, or sequential interpretation and execution of non-native code by execution of the software interpreter, depending upon the type and execution frequency of the non-native code read out and the size of the available empty region in the memory to operate the processor.

Further preferably, the selection program includes a program to select execution of a native code output by the hardware translator, or execution of a native code output by the software translator, or sequential interpretation and execution of non-native code by execution of the software interpreter, depending upon the address in the memory and execution frequency of non-native code read out, and the size of the available and empty region in the memory to operate the processor.

The selection program may include a program selecting execution of a native code output by the hardware translator, or execution of a native code output by the software translator, or sequential interpretation and execution of non-native code by execution of the software interpreter, depending upon the address in the memory and execution frequency of non-native code read out to operate the processor.

The selection program may include a program selecting execution of a native code output by the hardware translator, or execution of a native code output by the software translator, or sequential interpretation and execution of non-native code by execution of the software interpreter every time a method constituted by non-native codes is called to operate the processor.

The software translator may include a code conversion program to convert non-native code into a native code so as to allocate at least a portion of a memory operand included in the non-native code to a register provided in the processor.

According to another aspect of the present invention, an operation method of a data processor including a processor with a predetermined instruction group as a native code, a hardware translator converting a code which is non-native to the processor into one or more native codes of the processor, and a memory storing a program formed of native codes operating on a processor is provided. The program stored in the memory includes a software translator program operating on the processor to convert a code which is non-native to the processor into one or more native codes of the processor and storing the converted code in the memory, and a software interpreter program operating on the processor to sequentially interpret a code which is non-native to the processor and execute the interpreted code using the native code of the processor. The operation method includes the steps of selecting execution of a native code output by the hardware translator, or execution of a native code output by the software translator and stored in the memory, or sequential interpretation and execution of non-native code by execution of the software interpreter according to a predetermined criterion, and applying to the processor for operation a native code output by the hardware translator, or a native code output and stored in the memory by invoking the software translator with the readout non-native code as an argument, or a program code of the software interpreter with the readout non-native code as an argument, according to the selected result in the select step.

According to a further aspect of the present invention, a data processor includes a processor with a predetermined instruction group as a native code, a hardware translator converting non-native code to the processor into one or more native codes of the processor, a software translator operating on the processor to convert a code non-native to the processor into one or more codes native to the processor, a storage device storing a native code output from the software translator, a software interpreter operating on the processor to sequentially interpret codes non-native to the processor and executing the interpreted codes using native codes of the processor, and a select circuit selecting execution of a native code output by the hardware translator, or execution of a native code output by the software translator, or sequential interpretation and execution of non-native code by execution of the software interpreter, according to a predetermined criterion to operate the processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2, 3 and 4 show an instruction set of a functional unit according to the first to third embodiments.

FIG. 6 shows the method written in Java bytecode and the meaning of each Java bytecode. This method is used as the non-native code to be converted in the first to third embodiments.

FIG. 21 shows the native code generated for iconst_<n> according to the first embodiment.

FIG. 22 shows the native code generated for iload_<n> according to the first embodiment.

FIG. 23 shows the native code generated for istore_<n> according to the first embodiment.

FIG. 24 shows the native code generated for iadd according to the first embodiment.

FIG. 25 shows the native code generated for ifge according to the first embodiment.

FIG. 26 shows the native codes generated for goto according to the first embodiment.

FIG. 27 shows the native codes generated for ireturn according to the first embodiment.

FIG. 28 shows the native codes generated for invokestatic according to the first embodiment.

FIG. 29 shows the usage of the M32R register according to the first embodiment.

FIG. 34 shows the status of register allocation with respect to operands according to the first embodiment.

FIGS. 35 and 36 show execution examples of the register allocation process according to the first embodiment.

FIGS. 37 and 38 show execution examples of a method code conversion process according to the first embodiment.

FIG. 43 shows the usage of the M32R register according to the second embodiment.

FIG. 46 shows the register allocation status with respect to operands according to the second embodiment.

FIGS. 47 and 48 show execution examples of a method code conversion process according to the second embodiment.

FIG. 55 shows the native codes generated for iadd according to the third embodiment.

FIGS. 63 and 64 show execution examples of a method code conversion process in the data processor of the third embodiment.

DESCRIPTION OF THE PREFERRED EMBODIMENTS

All the data processors according to respective embodiments of the present invention described hereinafter include a software translator converting Java bytecode into native codes by software, a hardware translator converting Java bytecode into native codes by software, a software interpreter analyzing and simulating Java bytecode in software during execution, and a selector automatically switching these three means depending upon the contents of the Java bytecode of interest. It is understood by a person skilled in the art that the present invention is not limited to these embodiments. For example, although Java bytecode is taken as the non-native code in respective embodiments, a translator can be realized in a similar manner in the case where a code other than the Java bytecode is executed as non-native code.

First Embodiment

Figure 1:
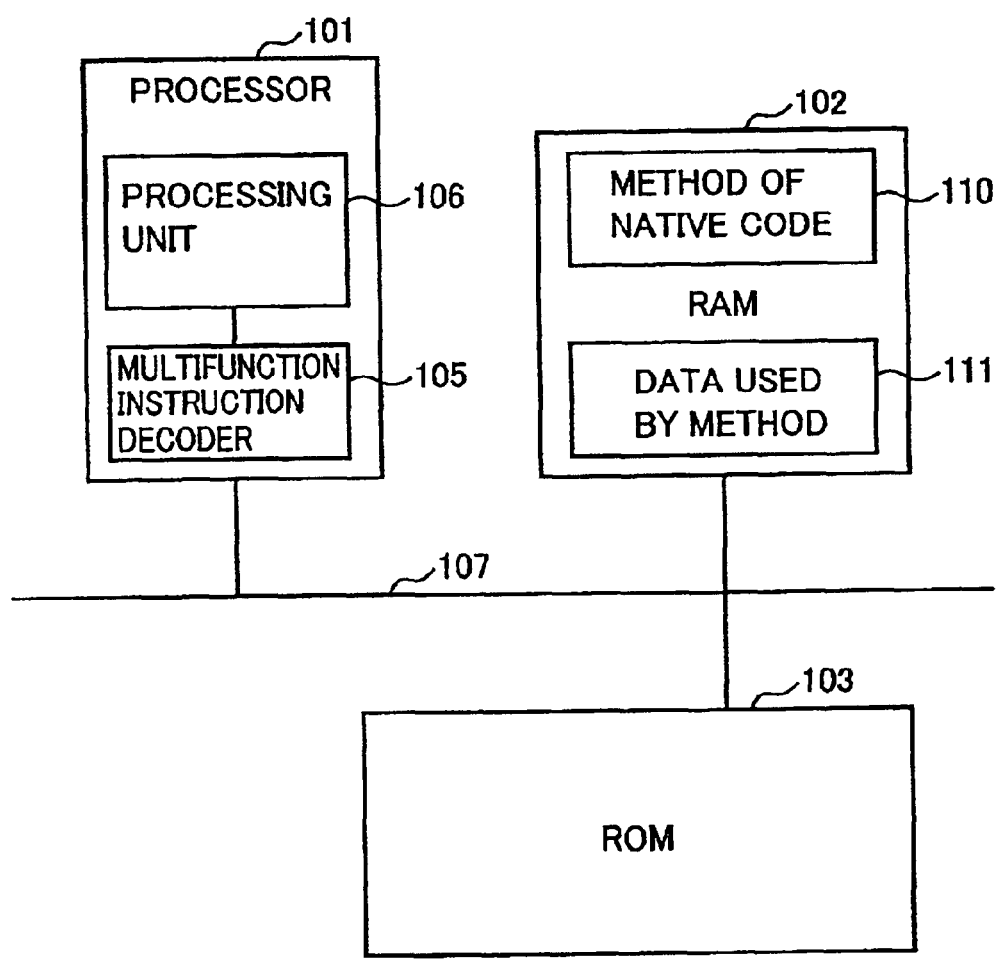
FIG. 1 shows a data processor according to first-third embodiments of the present invention.

Referring to FIG. 1, a data processor according to a first embodiment of the present invention includes a processor 101, a RAM 102, and a ROM (Read Only Memory) 103 storing non-native codes at predetermined addresses, all connected to each other through a bus 107.

Processor 101 formed of a single semiconductor chip includes a processing unit 106 which is the main unit of processor 101 and has the function equal to that of a conventional processor, and a multifunction instruction decoder 105 sits between processing unit 106 and bus 107 to convert the instruction received from bus 107 into the native code of processing unit 106 when the received instruction is non-native code read out from a predetermined address of ROM 103 and provide the converted instruction to processing unit 106, or to directly provide the received instruction to processing unit 106 when the received instruction is not non-native code read out from a predetermined address of ROM 103.

RAM 102 serves to store the method of the native code of processing unit 106 and the data used by the method.

ROM 103 is a computer (processor 101) readable recording medium that stores a program which is executed by processor 101 and implements the procedure of the method call of non-native codes (including a program to make processor 101 operate the software translator, and a program to make processor 101 operate the software interpreter), which procedure will be described afterwards. The apparatus of the present embodiment uses Java bytecode which is the instruction set of the Java virtual machine as the non-native code. The routine itself which implements the procedure of the method call of non-native codes is constituted by native codes.

Processing unit 106 has the function of the functional unit of M32R which is a 32-bit microprocessor made by Mitsubishi Electric Corporation. Instruction set of processing unit 106 are shown in FIGS. 2-4. The details of the M32R processor are described in "Mitsubishi 32 Bit Single Chip Microcomputer M32R Family Software Manual (Rev. 1.1)". It will be understood that, although M32R is used in the present embodiment, the present invention is not limited thereto. One skilled in the art will understand that a data processor including a translator can easily be realized similarly from the following description even if a functional unit of another processor is employed.

Figure 5:
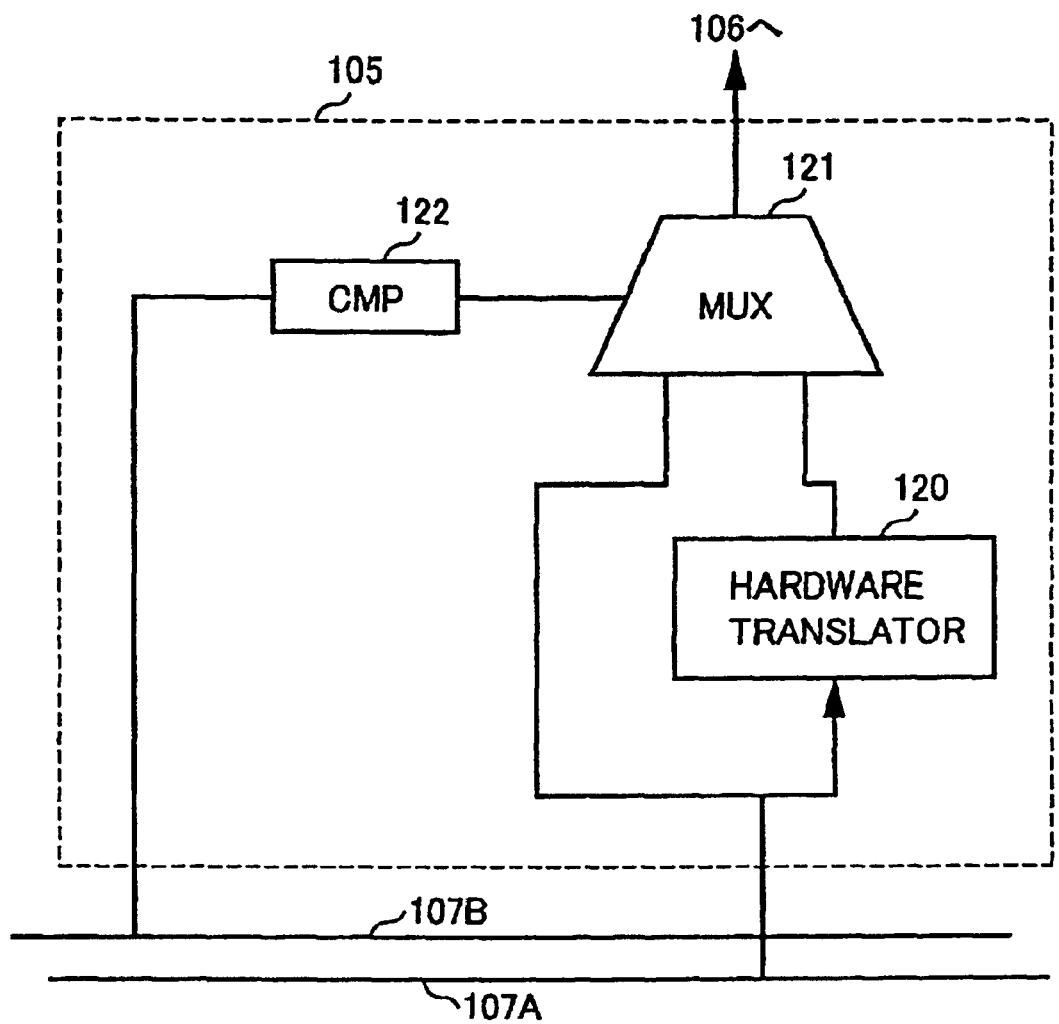
FIG. 5 is a block diagram of a multifunction instruction decoder 105.

Referring to FIG. 5, bus 107 includes a data bus 107A and an address bus 107B. Multifunction instruction decoder 105 includes a hardware translator 120 connected to data bus 107A to convert non-native code applied from data bus 107A into a native code of processing unit 106, a multiplexer 121 having a first input receiving the output of hardware translator 120 and a second input connected to data bus 107A, which selects and provides to processing unit 106 the signal of one of the two inputs according to the value of a control signal, and a comparison circuit 122 connected to address bus 107B to compare the address on address bus 107B with an address that defines the storage region of non-native code and provide a control signal to control multiplexer 121 so that the output of hardware translator 120 is selected when the address on address bus 107B is an address of a storage region of non-native code, and the input from data bus 107A is selected otherwise.

Multifunction instruction decoder 105 converts the instruction, if it is non-native code, which is read out from the address (on address bus 107B) specified by the program counter into a native code of processing unit 106, and provides the result to processing unit 106. This process will be described in detail afterwards with reference to FIG. 10.

FIG. 6 shows Java bytecodes of a method to be converted in the description of a conversion example of the Java bytecode according to the present embodiment. According to Java, an intermediate code for the virtual machine which is the execution environment of Java is generated by compiling the source program. This intermediate code is executed in the virtual machine execution environment prepared for each real machine. This intermediate code is called "Java bytecode" since the length is variable in byte units.

Figure 7:
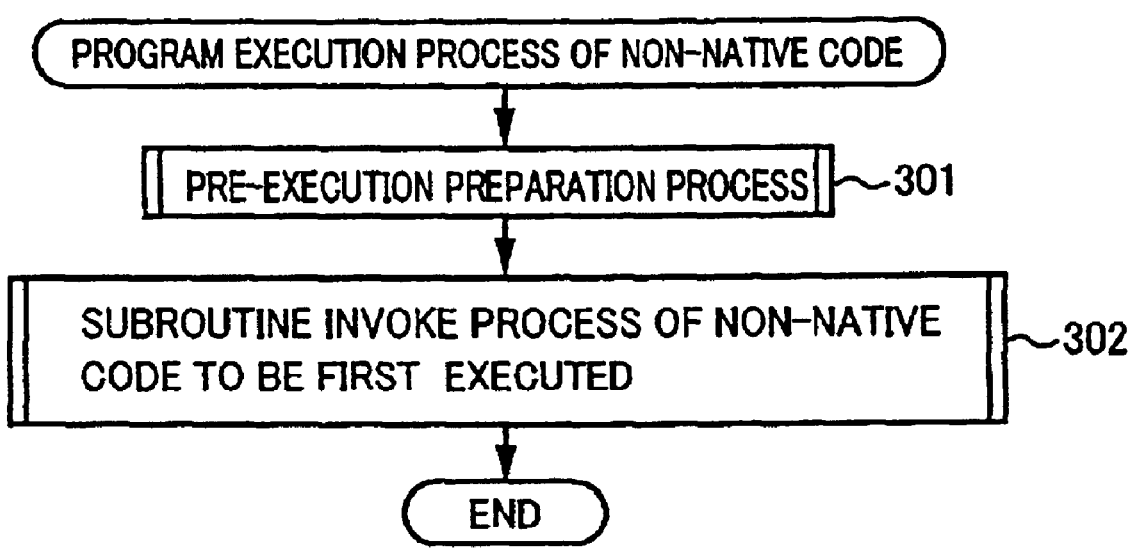
FIG. 7 is a flow chart of the procedure which executes a program of non-native codes according to the first to third embodiments.

FIG. 7 is a flow chart of the program execution procedure of the data processor according to the first embodiment. To execute a program described in the Java bytecode, the method of the Java bytecode that is to be initially executed after a pre-execution preparation process 301 is called and executed (302). Since a subroutine is called a "method" in the Java bytecode, a subroutine in the present invention will be generally termed as "method" in the following description.

Figure 8:
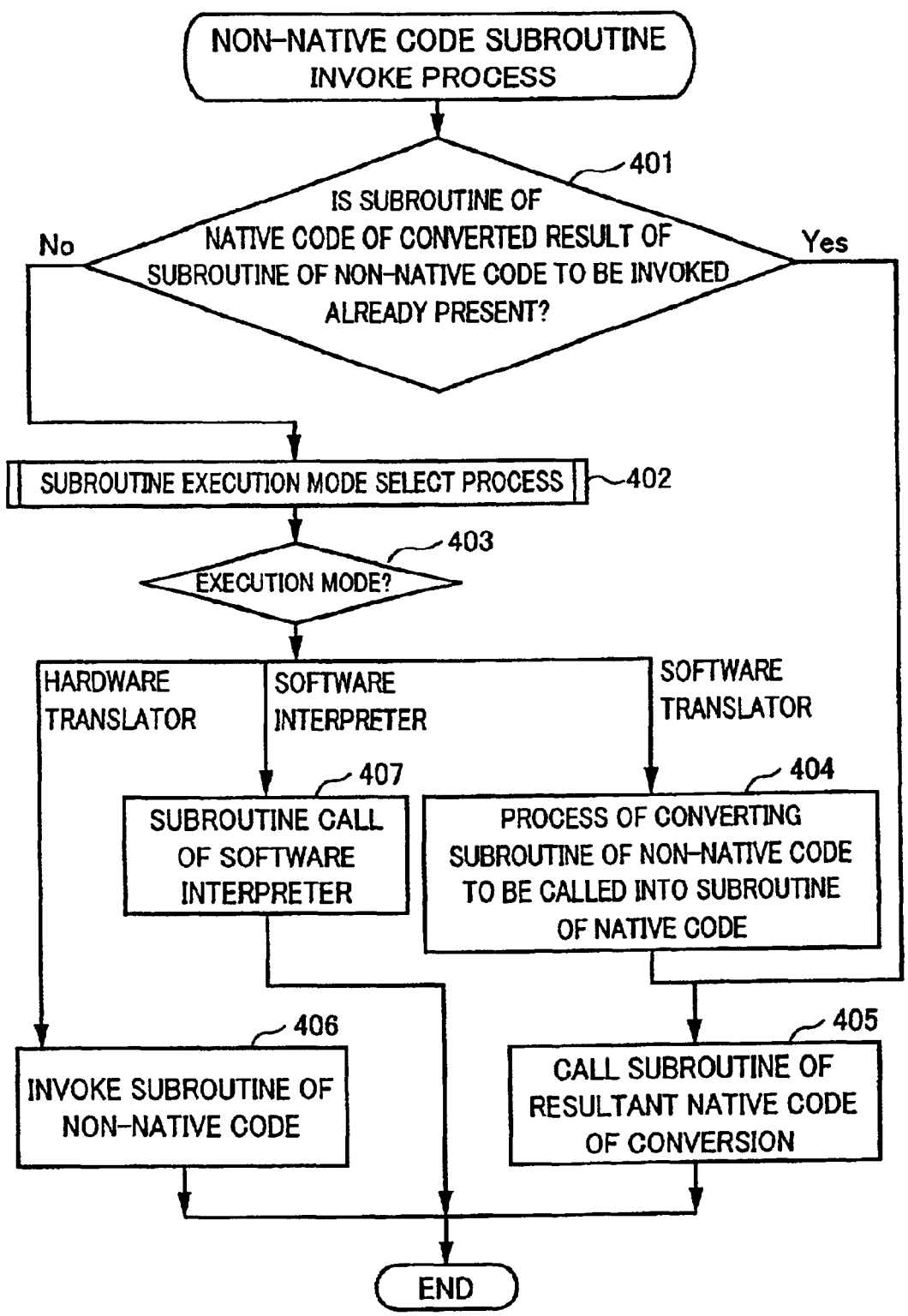
FIG. 8 is a flow chart of the procedure which invokes a subroutine of non-native codes according to the first to third embodiments.

FIG. 8 is a flow chart of the procedure which calls a method of Java bytecode corresponding to step 302 of FIG. 7. It is assumed that, when the method of Java bytecodes is converted into a subroutine of native codes for execution by a software translator, the native code of the converted result is stored in the software cache set in RAM 103. In this case, by reading out the resultant native code of conversion from the software cache for execution when the same non-native code is invoked, the conversion process is bypassed to improve the execution speed.

Therefore, in the procedure which invokes a subroutine of non-native codes, detection is first made whether the converted result generated when this method was called previously remains in RAM 103 or not (401). If the converted result remains in RAM 103, that resultant method of conversion is invoked from RAM 103 to be executed (405).

If the converted result of this method does not remain in RAM 103, a process is carried out to select one of the hardware translator, software translator and software interpreter to be used to execute this method at step 402. The control branches at step 403 to the selected execution mechanism.

Figure 10:
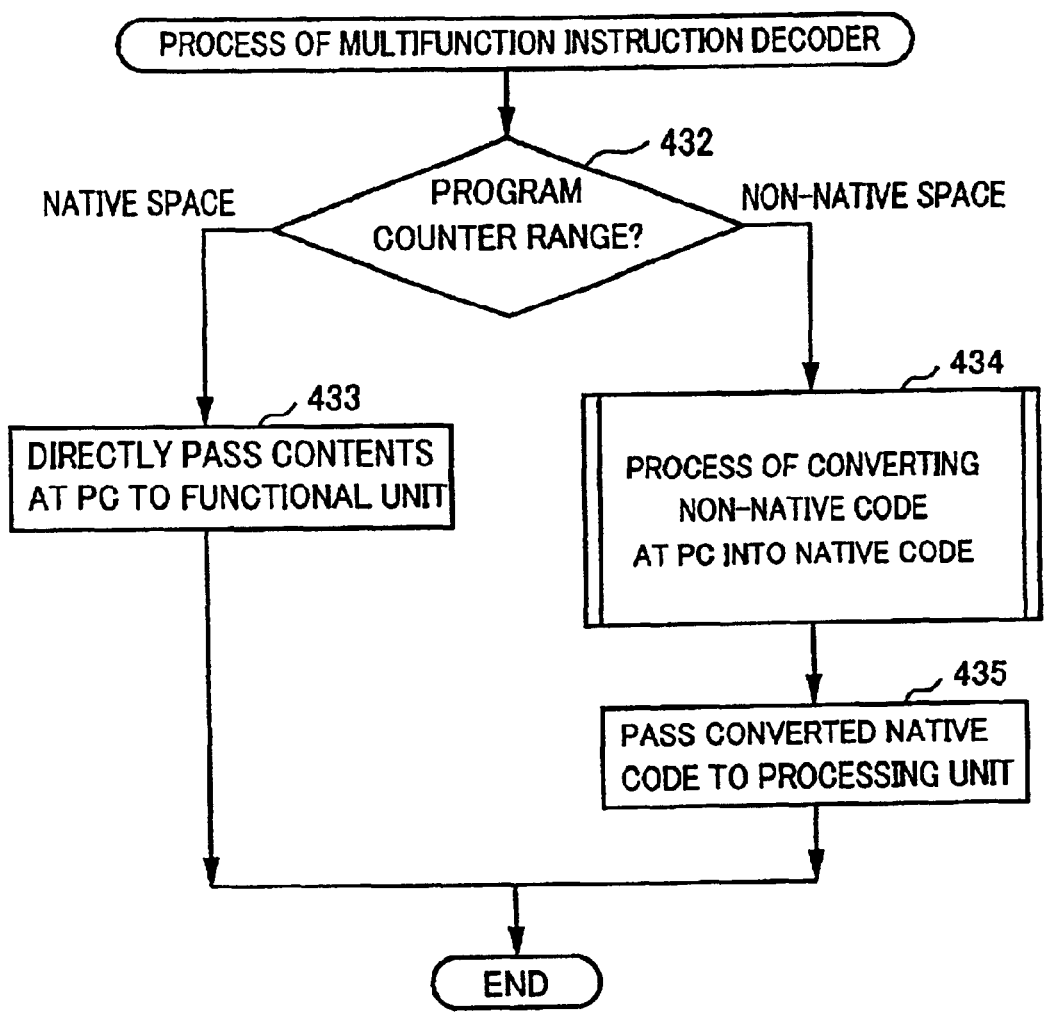
FIG. 10 is a flow chart of the procedure of an execution process of non-native or native code according to the first to third embodiments.

When execution by the hardware translator is selected, the subroutine of non-native codes is called (406). Then, the non-native code read out from the address of the program counter by multifunction instruction decoder 105 is converted into a native code, which is executed by processing unit 106 (FIG. 10).

When execution by the software interpreter is selected, the software interpreter subroutine is called with the read out code as an argument (407). The subroutine interprets the non-native code one code at a time for execution.

When execution by the software translator is selected, control proceeds to step 404 to convert the subroutine of the non-native code that is to be called into the subroutine of native codes. The converted result is first stored in RAM 103. Then, the process of invoking the subroutine of the converted native code by accessing RAM 103 is executed (405).

Figure 9:
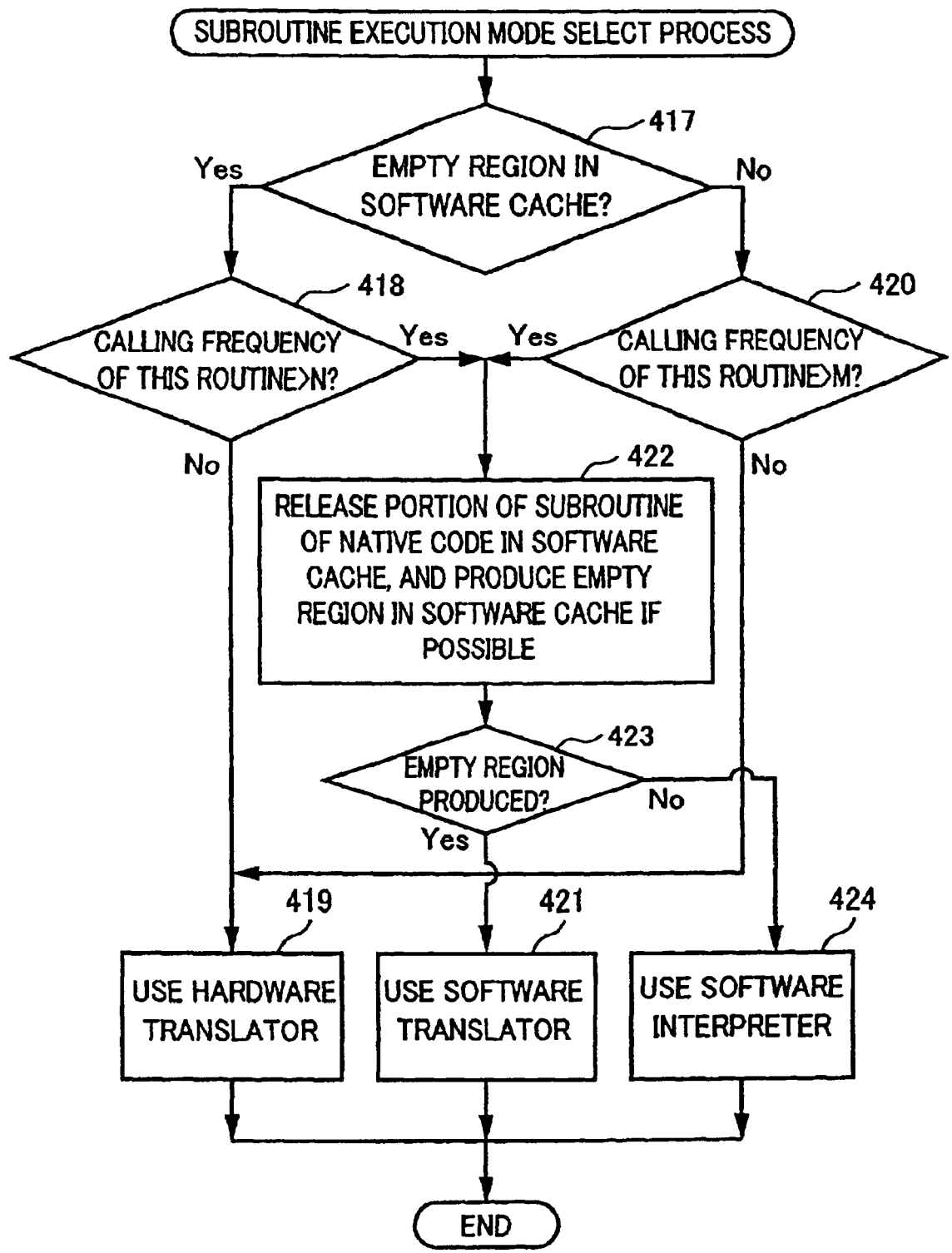
FIG. 9 is a flow chart of the procedure which selects an execution mode according to the first to third embodiments.

FIG. 9 is a flow chart of the procedure which selects the subroutine execution mode corresponding to step 402 of FIG. 8. Either execution with the hardware translator or execution with the software translator is selected depending upon the status of the software cache and the execution frequency of the subroutine that is to be executed. More specifically, when the invokation counts of the subroutine to be executed exceeds a predetermined number of times, execution with the software translator is selected, otherwise with the hardware translator is selected. In the present embodiment, this number of times is classified depending on whether there is an available region in the software cache in which the resultant native code of conversion is stored (this case the number is called "N") or not (this case the number is called "M"). Naturally, only an instruction that can be translated by the hardware translator is taken as the subject of translation by the hardware.

Referring to the routine of FIG. 9, determination is first made whether there is an empty region in the software cache (417). When there is an available region, control proceeds to step 418, otherwise to step 420.

At step 418, determination is made whether the number of invokation counts of the routine that is to be invoked is greater than the aforementioned N or not. When the number of invokation counts is greater than N, control proceeds to step 422, otherwise to step 419.

At step 419, determination is made to use the hardware translator. A flag for branching control not shown is set, and the process ends.

When there is no available region in the software cache, determination is made at step 420 whether the number of invokation counts of the subroutine that is to be invoked is larger than the aforementioned M or not. When the number of invokation counts is larger than M, control proceeds to step 422, otherwise to step 419.

In the case where there is an empty region in the software cache and the number of invokation counts of the subroutine is greater than N, or in the case where there is no available region in the software cache and the number of invokation counts of the subroutine is greater than M, control proceeds to step 422 to release a portion of the subroutine of the native code in the software cache to make an empty region available in the software cache.

Then at step 423, determination is made whether an empty region for the processed result has been made available at step 422 or not. When an empty region has been made available, determination to use the software translator is made (421). When an empty region could not be made available, determination to use the software interpreter is made (424). In either case, a flag to branch the process not shown has an appropriate value set, and the process ends.

FIG. 10 is a flow chart of the process of multifunction instruction decoder 105. Referring to FIGS. 5 and 10, determination is made through comparison circuit 122 whether the address range of the program counter output on address bus 107B is within the predetermined space where non-native codes are stored (432). If the result is YES, the code read out from the address specified by the program counter is regarded as non-native code to be converted into a native code by hardware translator 120 (434). The resultant native code is provided to processing unit 106 (435). In the example of FIG. 5, the code on data bus 107A is converted into a native code by hardware translator 120, and the result is selected by multiplexer 121 to be provided to processing unit 106.

When determination is made that the address range of the program counter are not within the space where the non-native code is stored at step 432, the code read out from the program counter is directly provided to processing unit 106 since it is a native code (433). In the example of FIG. 5, multiplexer 121 selects the code on data bus 107B, not the output of hardware translator 120, and provides the selected code to processing unit 106.

Conversion of non-native code into a native code at step 434 of FIG. 10 is schematically set forth below. In the case of a general non-native code, one or a plurality of native codes that are sequentially executed are set in correspondence to one non-native code in advance. Furthermore, the corresponding relationship between the operand of non-native code and the operand in a native code is preset. In the case where the non-native code is for a virtual machine such as Java, the stack is to be assigned to the stack region of the memory or the register. Then, the value of the program counter is incremented with an appropriate number according to the number of native codes required to carry out a process corresponding to the execution of one instruction of non-native code. This is the basic conversion process.

Figure 11:
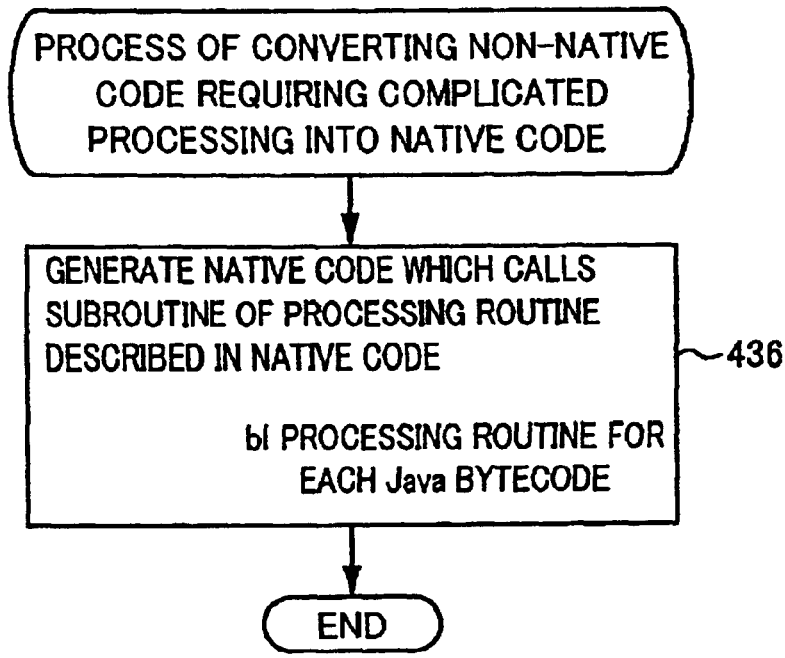
FIG. 11 is a flow chart of the procedure which converts non-native code that requires complicated processing into a native code according to the first to third embodiments.
Figure 12:
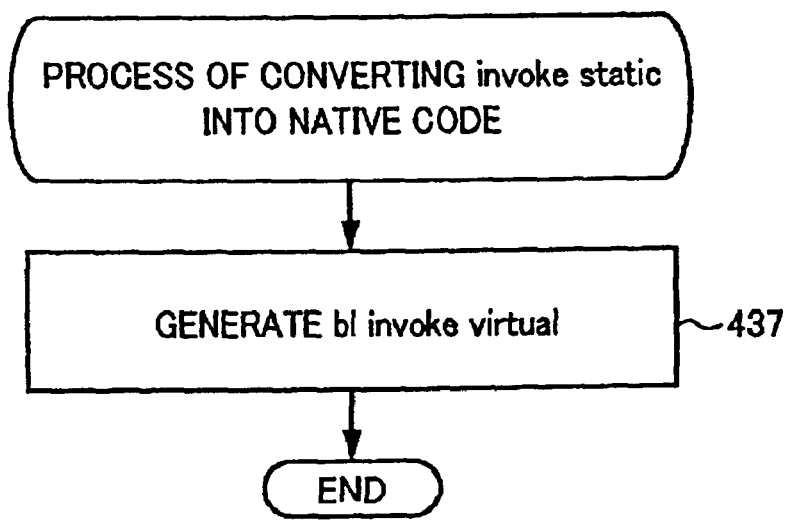
FIG. 12 is a flow chart of the procedure which converts invokestatic into a native code according to the first to third embodiments.

FIGS. 11 and 12 show a conversion process for non-native code that requires a complicated process (i.e., the size of the native code after conversion is large), and a conversion process for invokestatic, which is non-native code for method invokation, as exceptional examples. Refer to FIG. 6 as to non-native codes (Java bytecode) such as invokestatic.

Conversion is carried out according to the process as shown in FIG. 11 for a complicated non-native code (such as fadd). More specifically, a native code is generated that invokes a software routine (prestored in ROM 103) to execute the process of the non-native code that is to be converted (436). As to the non-native code of invokestatic, a processing routine thereof is similarly invoked as shown in FIG. 12. It is to be noted that this processing routine further carries out the procedure which calls a method of the non-native code shown in FIG. 8. This means that, during execution of the process of FIG. 12, the process of FIG. 8 is repeatedly executed, whereby the program of the non-native code is executed. Thus, the processing routine shown in FIG. 8 is executed every time a method is invoked in the present embodiment, including the case where an instruction that calls another method of non-native code is present in one method. Particularly, selection of the hardware translator, software translator and software interpreter is effected.

Similarly in the case of using the software translator, the native code generated by conversion corresponding to Java bytecode for method invokation will carry out the procedure which calls a method of the non-native code shown in FIG. 8. The program of the non-native code is executed by the repetitive execution of FIG. 8.

Similarly in the case of using the software interpreter, the procedure which calls a method of the non-native code shown in FIG. 8 is carried out corresponding to the Java bytecode for method invokation. By executing the process of FIG. 8 repeatedly, the program of the non-native code is executed.

The procedure which calls a method of non-native code shown in FIG. 8 is prestored in ROM 103.

Figure 13:
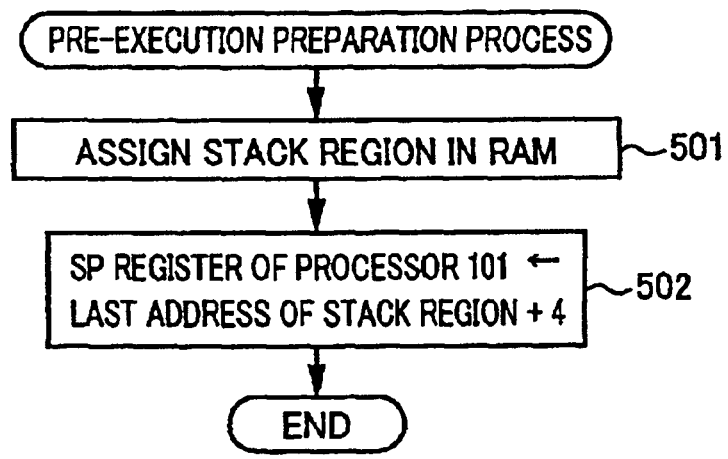
FIG. 13 is a flow chart of the procedure of a pre-execution preparation process according to the first to third embodiments.

FIG. 13 is a flow chart of the procedure of a pre-execution process corresponding to step 301 of FIG. 7. The contents of the execution preparation process includes a step to allocate the stack region used by the program in RAM 102 (501), and the step of setting a stack pointer in a register (502). The value of the last address in the stack region plus 4 is set at the SP register of processing unit 106 in processor 10.

Figure 14:
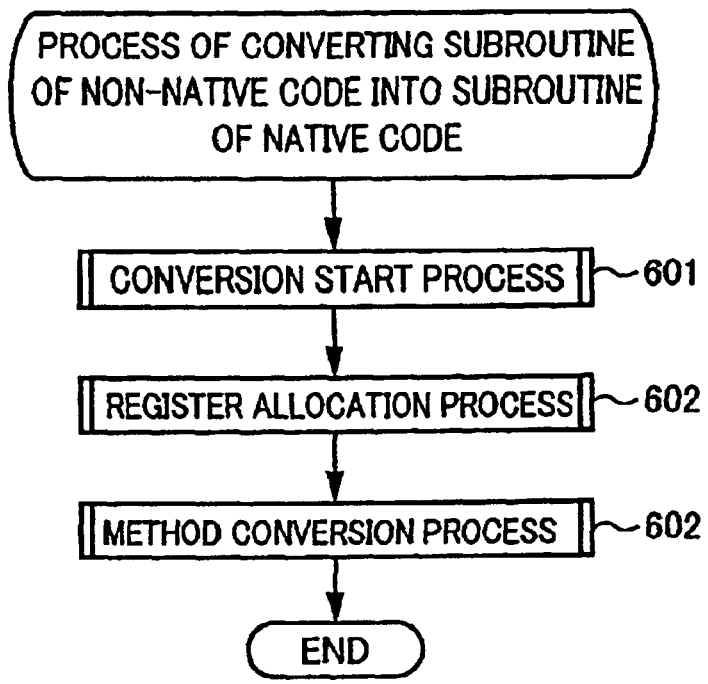
FIG. 14 is a flow chart of the procedure which converts a subroutine of non-native codes into a subroutine of native codes according to the first to third embodiments.

FIG. 14 is a flow chart of the procedure which converts a method of the Java bytecode into a subroutine of native codes (step 404 of FIG. 8). Referring to FIG. 14, a conversion starting step is effected (601), followed by the step of register allocation (602), and the step of method conversion (603). Each of these steps will be described hereinafter with reference to FIGS. 15-20.

Figure 15:
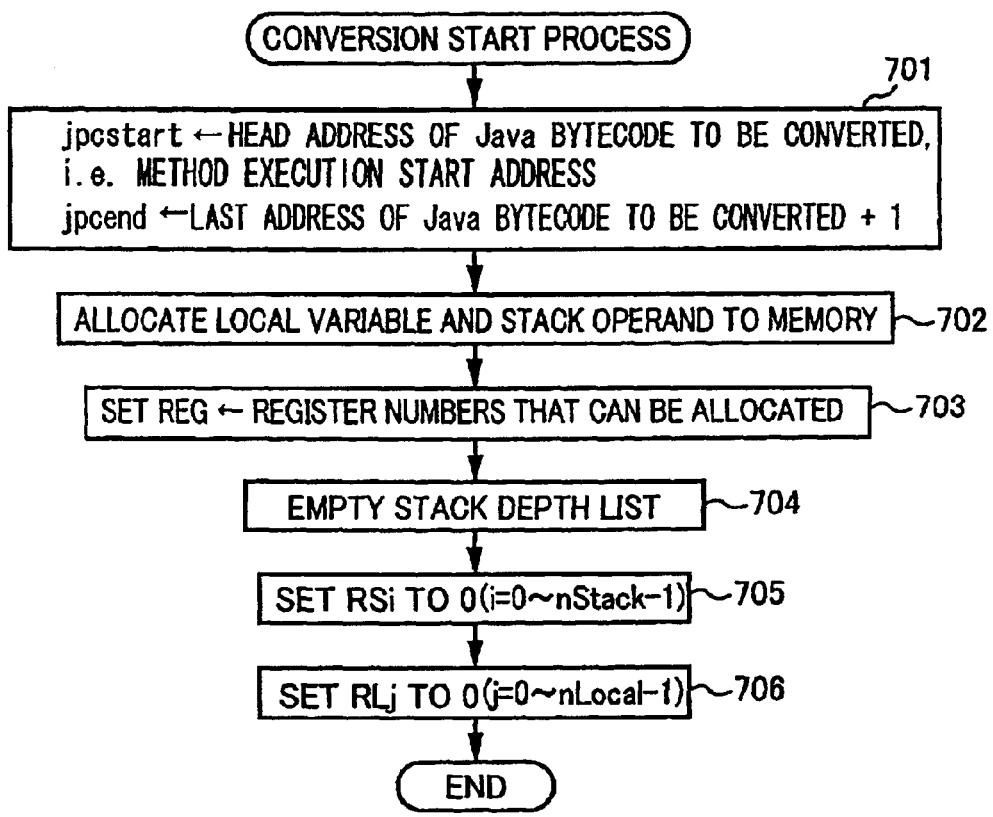
FIG. 15 is a flow chart of the procedure of a conversion start process according to the first to third embodiments.

FIG. 15 is a flow chart of the procedure of a conversion starting step 601. At step 701, the head address of the Java bytecode which is to be converted, i.e., the start address of the method, is assigned to variable jpcstart, and the last address +1 is assigned to variable jpcend.

Then, the memory for the local variable and the stack operand (702) is allocated. The number of the registers that can be allocated is assigned to set "REG" (703). The stack depth list is cleared (704). Variable RSi is set to 0 with respect to iteration control variable i (i=0 to nStack−1) (705). Similarly, variable RLj is set to 0 for iteration control variable j (j=0 to nLocal−1) (706). Here, nStack is the number of stack operands and nLocal is the number of local variables.

Figure 16:
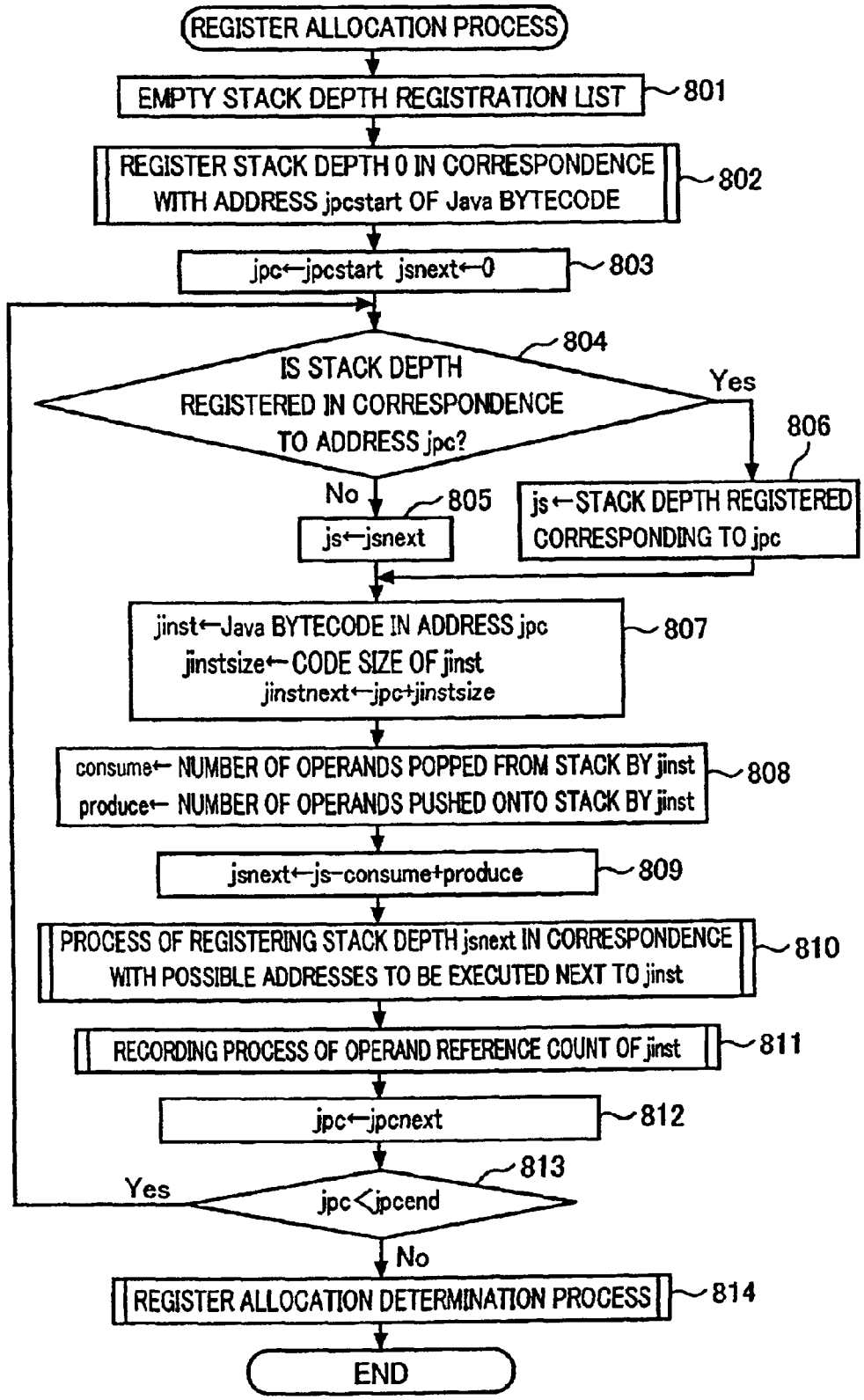
FIG. 16 is a flow chart of the procedure of a register allocation process according to the first to third embodiments.

FIG. 16 is a flow chart of the procedure of register allocation step 602 of FIG. 14. In the process of FIG. 16, steps 804–812 are repeatedly processed for the Java bytecode in the method with address jpc altered from jpcstart to jpcend.

At step 801, the stack depth registration list is cleared. Since the stack depth is 0 at jpc=jpcstart, i.e., at the start of the method execution, a set of the address jpcstart of the Java bytecode and its corresponding stack depth at that address, or [0, 0] in this case, is registered in the stack depth list (not shown). The contents of this process will be described afterwards. At step 803, jpc is initialized to jpcstart.

Steps 804–813 are iterated with address jpc altered from jpcstart to jpcend.

At steps 804–806, the stack depth js at the execution of jpc (the position of the stack indicating the stack pointer when execution of the Java bytecode of address jpc ends) is computed. At step 804, determination is made whether address jpc and its corresponding stack depth at jpc is already registered. If there is not, jsnext is assigned to js at step 805, and control proceeds to step 807. If there is a registered stack depth, the stack depth registered in correspondence with jpc is assigned to js at step 806. Then, control proceeds to 807.

At step 807, the next address jpcnext is computed. More specifically, at step 807, the Java bytecode at address jpc is assigned to jinst, the code size of jinst is assigned to variable jinstsize, and jpc+jinstsize is assigned to jpcnext. The jinst and jinstsize obtained at step 807 are the Java bytecode at jpc and the size (byte unit) of that Java bytecode, respectively.

When the stack depth at jpc is js, the stack depth after execution of jinst is computed by:

js−"the number of operands popped from the stack by jinst"+"the number of operands pushed on the stack by jinst".

Therefore, at step 808, the number of operands to be popped from the stack by jinst and the number of operands to be pushed on the stack by jinst are assigned to variable consume and variable produce, respectively. At step 809, js−consume+produce is assigned to variable jsnext.

At step 810, the computed jsnext is registered as the stack depth which corresponds to the address that has possibility of being executed succeeding jinst (the address of the next Java bytecode and address of branch target). At step 811, the reference count of the operand referred to by jinst is recorded. At step 812, jpc is updated to the next address obtained. At step 813, determination is made whether jpc<jpcend. The process from step 804 to step 812 is repeated until jpc becomes jpcend.

Register allocation is effected at step 814, based on the reference count information obtained at step 811.

Figure 17:
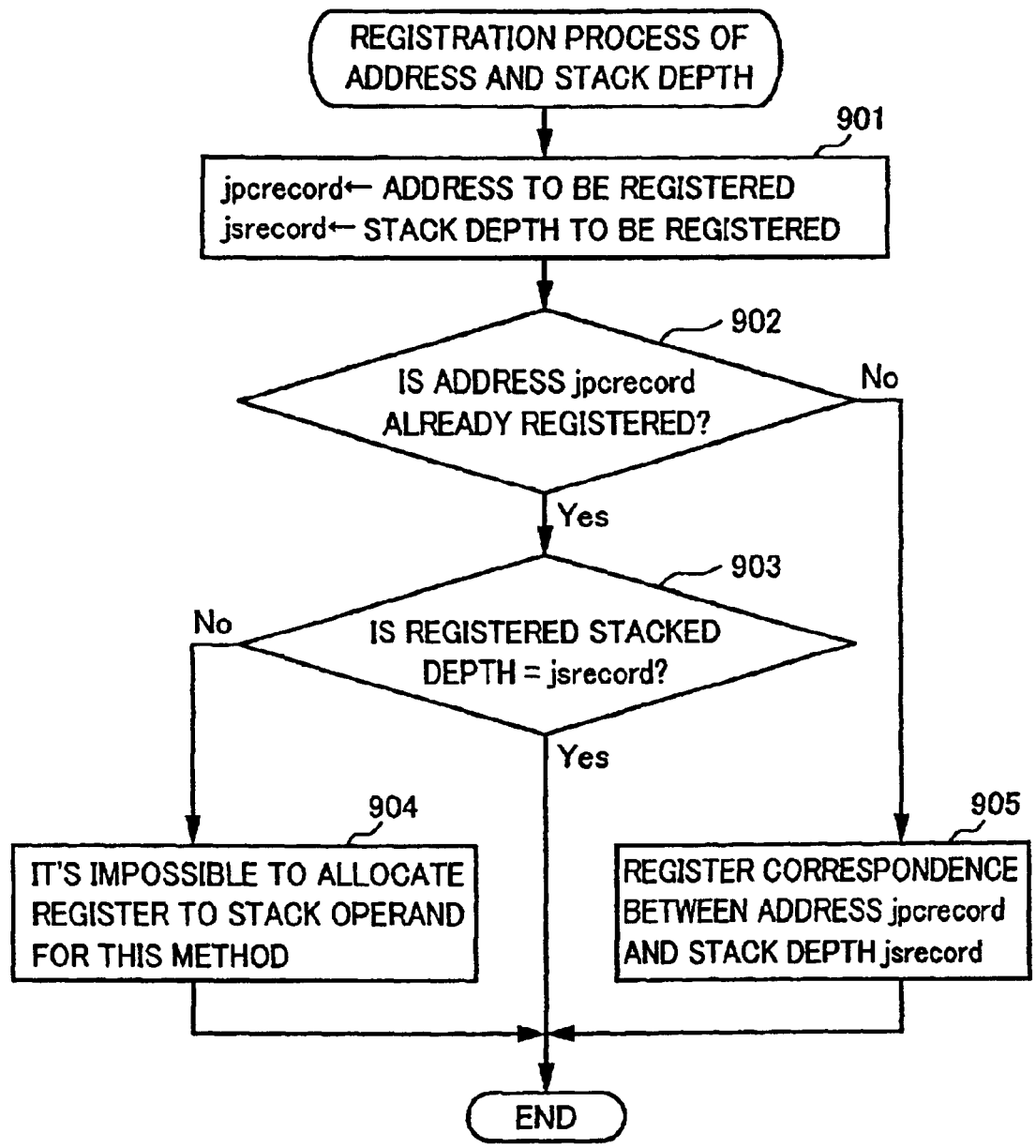
FIG. 17 is a flow chart of the procedure of a registration process of the address and stack depth according to the first to third embodiments.

FIG. 17 is a flow chart of the procedure which registers the address and stack depth corresponding to steps 802 and 810 of FIG. 16. First, the address to be registered is assigned to variable jpcrecord, and the stack depth to be registered is assigned to variable jsrecord. Then, determination is made whether a stack depth corresponding to address jpcrecord is already registered (902). If a stack depth is not registered, the correspondence between address jpcrecord and stack depth jsrecord is registered (905). If a stack depth is already registered, the registered value is compared with the current value jsrecord to be recorded (903). If the two values match, the process ends. If the two values do not match, the stack operand cannot be allocated to the register since the stack depth differs depending upon the path to be executed (904). In this case, a flag not shown is set, which indicates register allocation is impossible for this method.

Figure 18:
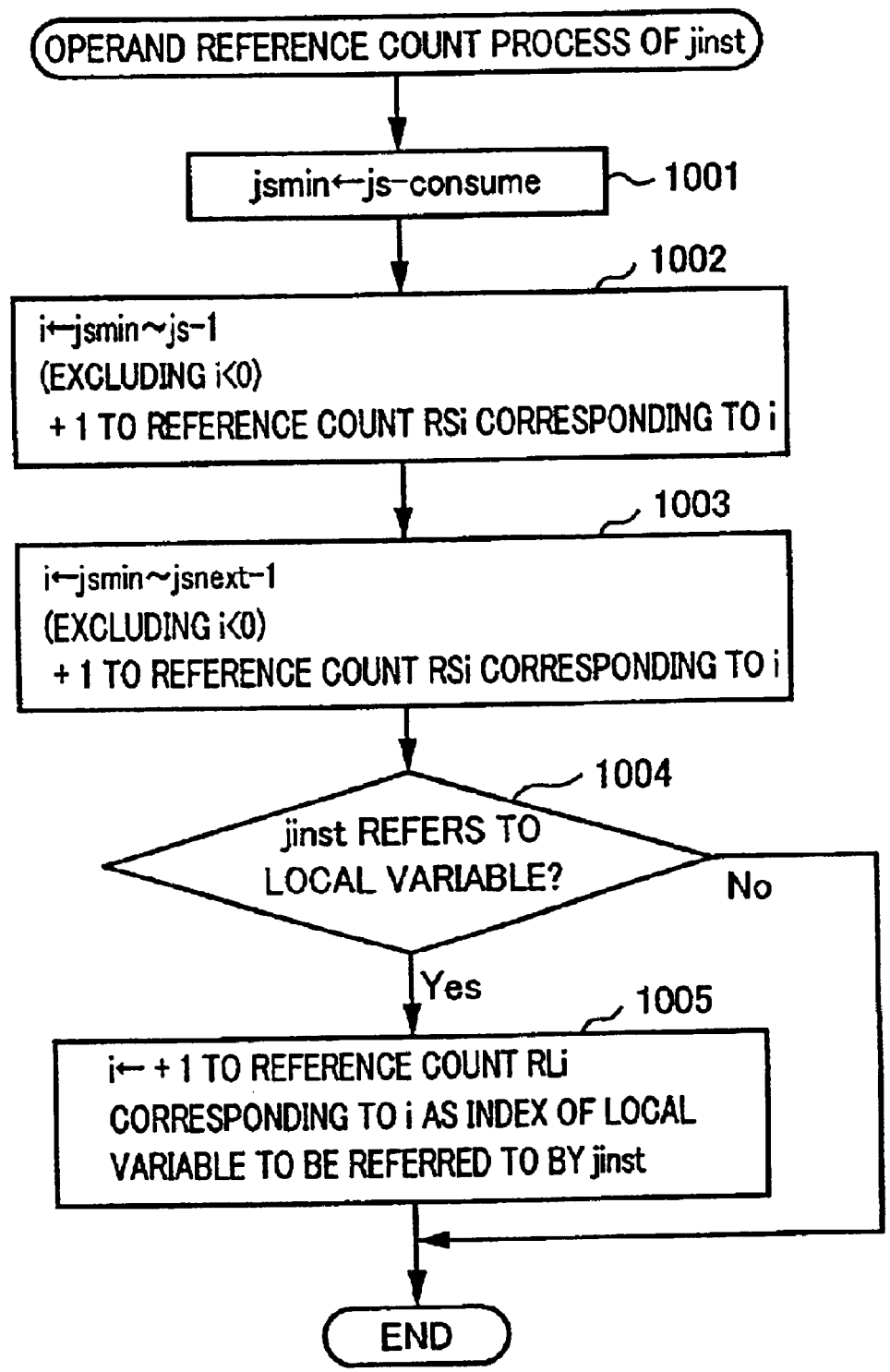
FIG. 18 is a flow chart of the procedure of a reference counting process with respect to an operand of jinst according to the first to third embodiments.

FIG. 18 is a flow chart of the procedure which records an operand reference count corresponding to step 811 of FIG. 16. First, the value of js–consume is assigned to variable jsmin (1001). Reference count RSi is incremented by one for the stack operand to be popped (1002). Reference count RSi is incremented by one for the stack operand to be pushed (1003). Determination is made whether the local variable is to be referred to or not (1004). If the local variable is to be referred to (YES of 1004), reference count RLi of that local variable is incremented by one (1005).

Figure 19:
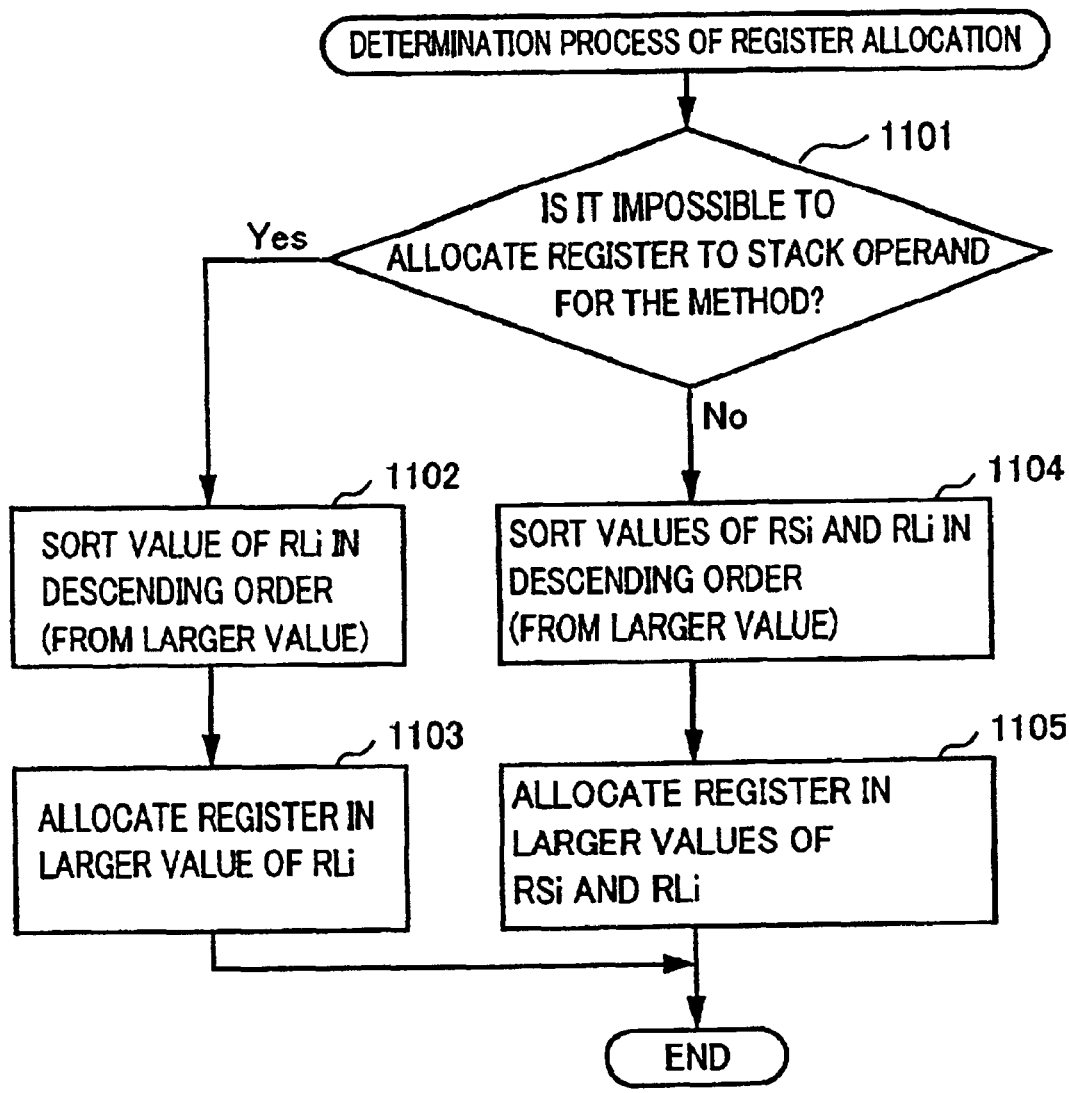
FIG. 19 is a flow chart of the procedure of a register allocation determination process according to the first embodiment.

FIG. 19 is a flow chart of the procedure of the register allocation determination process corresponding to step 814 of FIG. 16. First, determination is made whether the flag which may be set in step 904 in FIG. 17 indicates register allocation is impossible or not for this method. If register allocation is possible for this method, reference counts RSi and RLi are sorted (1104), registers are allocated in the descending order (1005). If register allocation is impossible for this method (YES at 1101), a register is allocated similarly but only for the local variable (1102, 1103).

Figure 20:
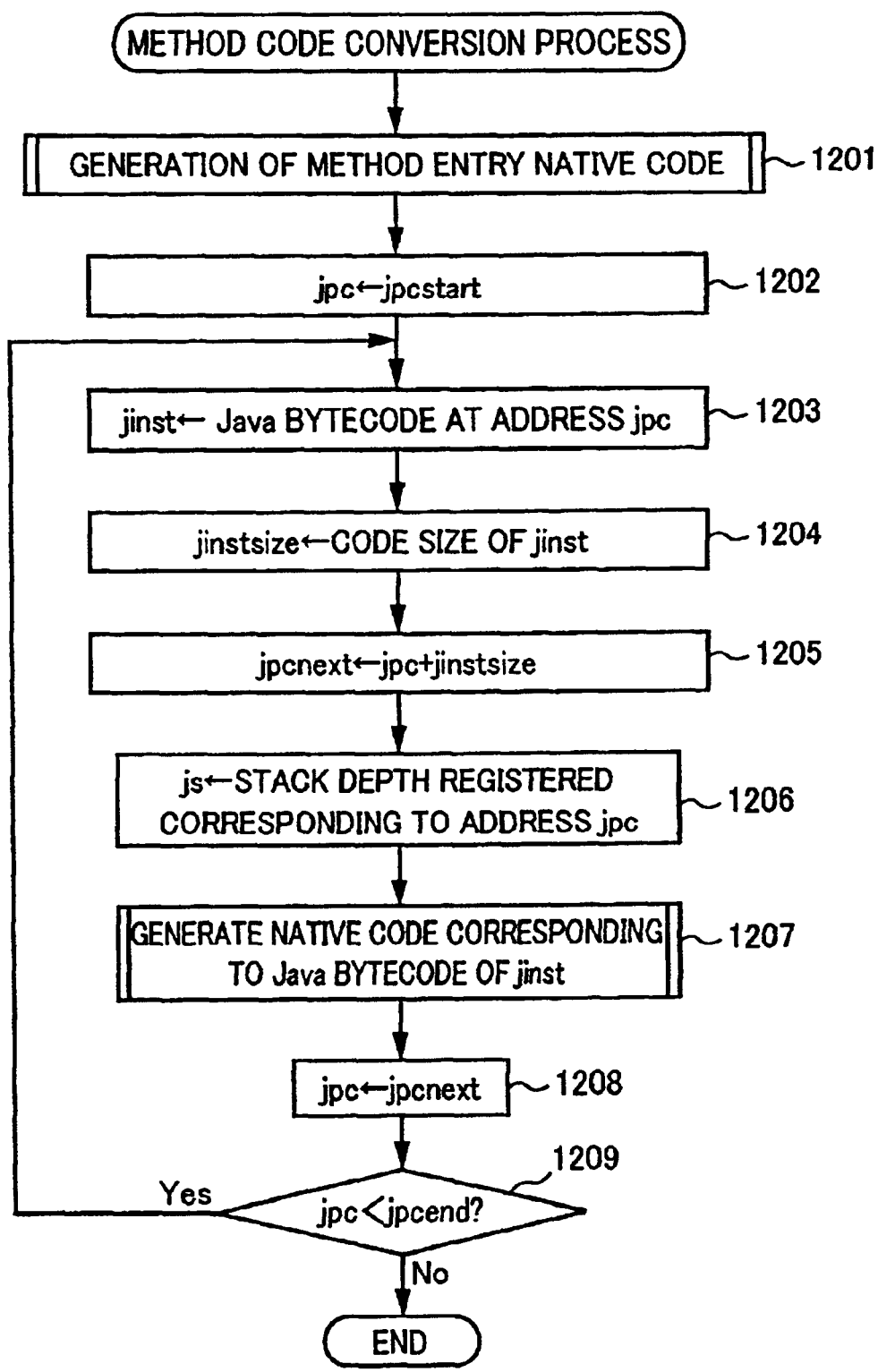
FIG. 20 is a flow chart of the procedure of a method code conversion process according to the first to third embodiments.

FIG. 20 is a flow chart of the procedure of a method conversion process corresponding to step 603 of FIG. 14. First, a native code is generated at the entry of the method. The details are shown in (1) of FIG. 37 (1201), and will be described afterwards. Then, the value of jpcstart is initialized with the value of variable jpc (1202).

The process of steps 1203–1207 is repeated sequentially for all the Java bytecodes in the method. More specifically, the Java bytecode at address jpc is assigned to jinst (1203). The code size of jinst is assigned to variable jinstsize (1204). Then, the address of the next code is computed by adding jpc and jinstsize and assigning the result to jpcnext (1205). Then, the stack depth, that is already registered corresponding to address jpc by the procedure of FIG. 16, is obtained and is assigned to variable js (1206). A native code is generated based on these obtained jpc, jinst and js (1207). At step 1208, jpcnext is assigned to variable jpc. At step 1209, the value of jpc is compared with the value of jpcend. If the value of jpc is smaller than jpcend, control proceeds to step 1203 to repeat the above-described process. If the value of jpcend is larger than jpc, the process ends.

Native codes as shown in FIGS. 21-28 are generated according to the type of the Java bytecode at step 1207. In these figures and all figures thereafter, "TX" is the address of the native code generated with respect to the Java bytecode at address X. The native code generated changes depending upon whether the operands of each Java bytecode is allocated to the register or the memory.

"Epilogue code" in FIG. 27 will be described in detail in relation to the description of an actual conversion example. Also, the codes that push arguments shown in FIG. 28 will be described in detail in the section of the description of an actual conversion example. In FIG. 28, methodId is the address of the region where the character string representing the method to be called is stored. callJavaMethod is the routine that carries out the process of calling the method specified by the character string stored in the region specified by register R0 according to the procedure of FIG. 8.

FIG. 29 shows the usage of the register of the M32R in the subroutine of a native code. Although the arguments of a subroutines are stored in a stack and delivered, some of the arguments can be stored in, for example, registers r0–r3 and delivered.

Figure 30:
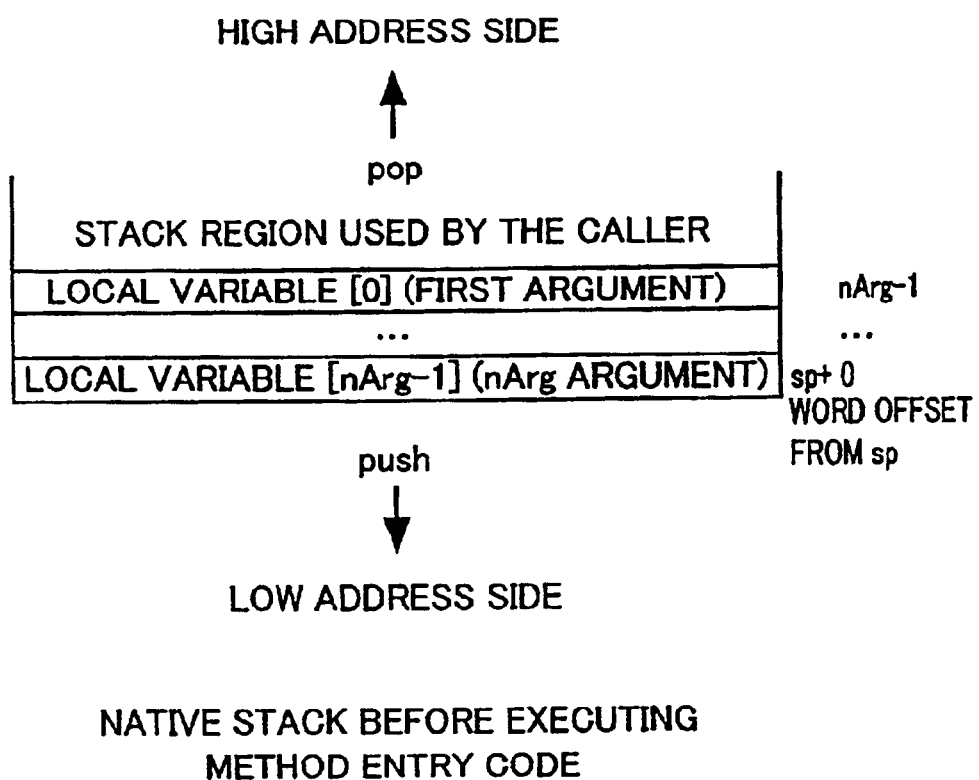
FIGS. 30-33 show the stack layout according to the first to third embodiments.
Figure 31:
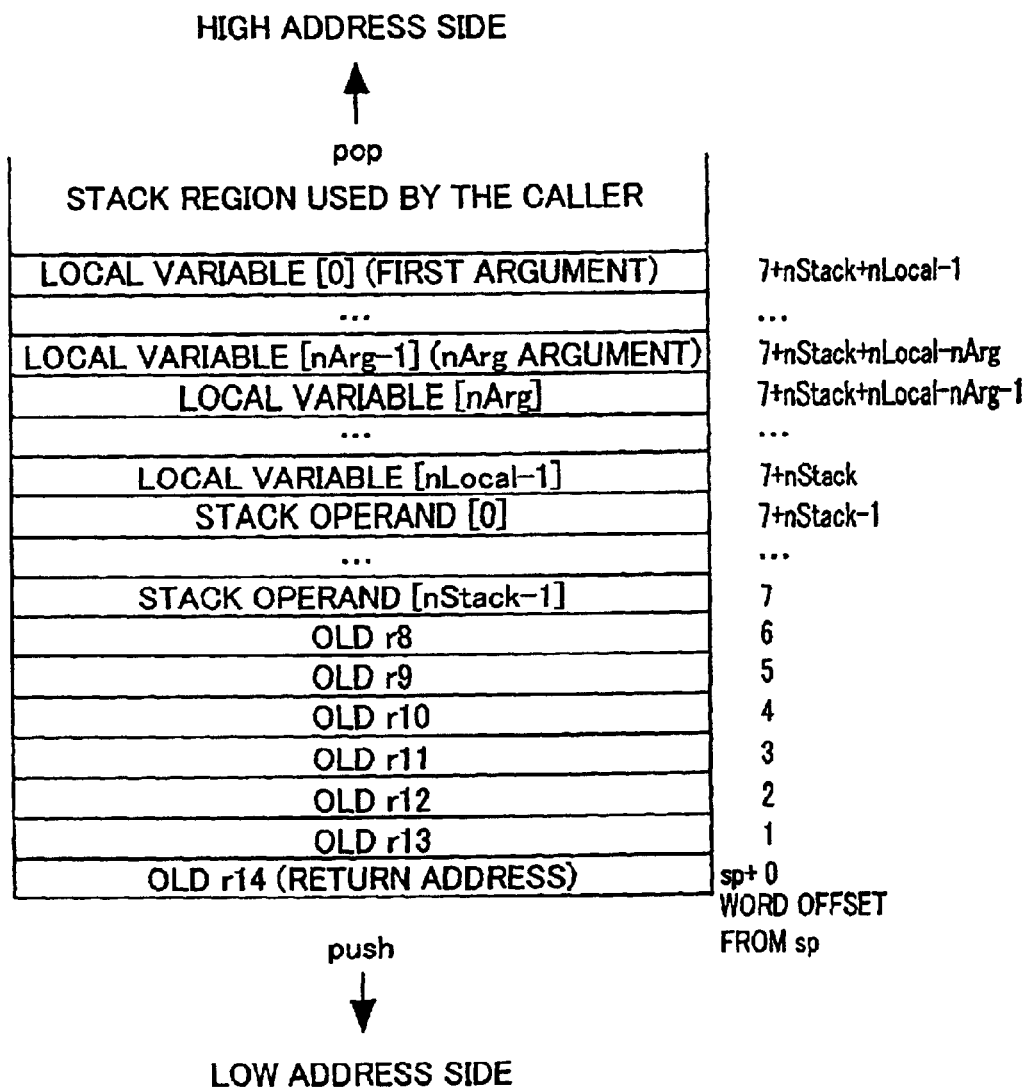
Figure 32:
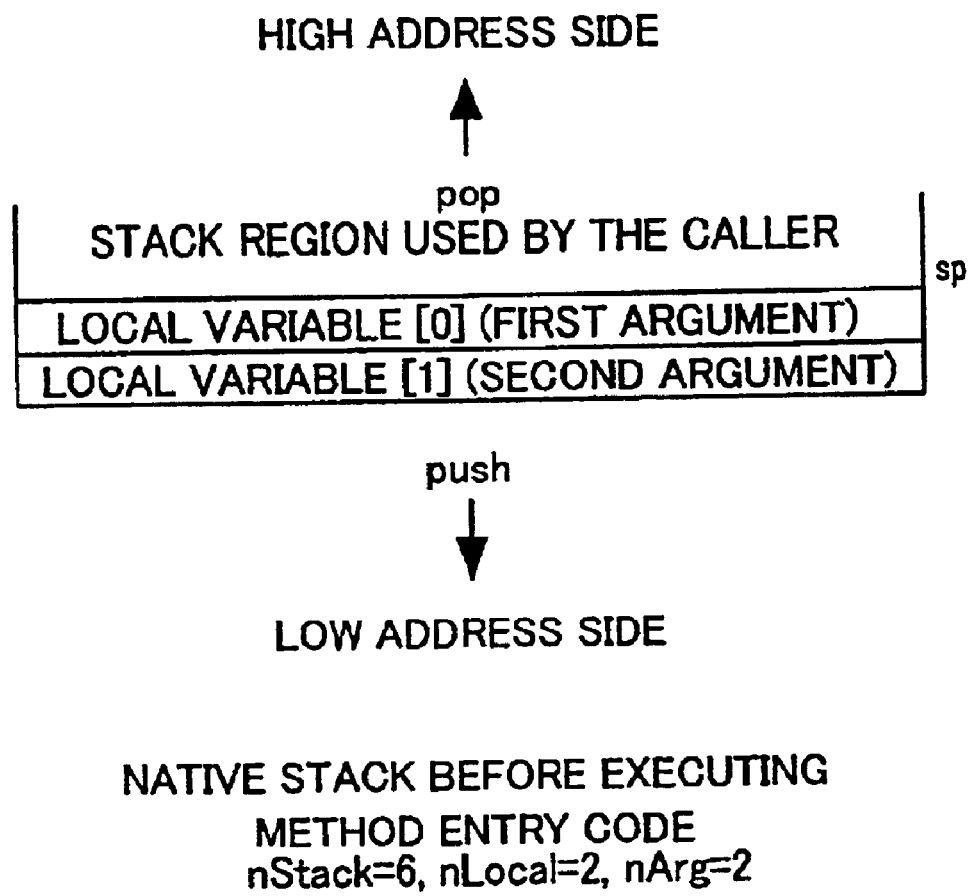
Figure 33:
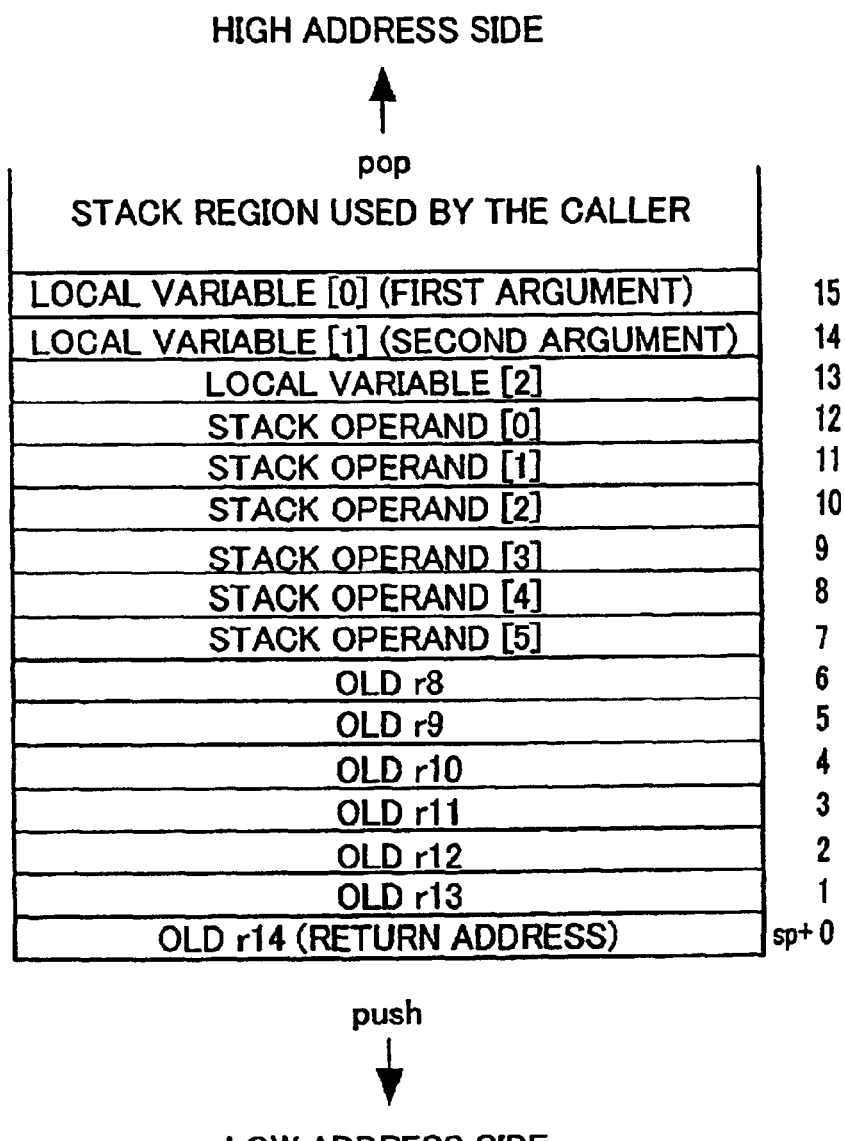

FIGS. 30-33 show the usage of the stack in the subroutine of native codes. FIG. 30 represents the stack layout when a subroutine is invoked. Arguments are stored on the stack. FIG. 31 represents the stack layout after the first entry code in the subroutine is executed. From the status of FIG. 30, the region for local variables and the region for stack operands are reserved, and the values of the registers (r8–r14) that must be preserved before and after subroutine execution are pushed. In the figure, nStack is the number of stack operands, nLocal is the number of local variables, and nArg is the number of arguments. It is to be noted that the number of arguments is included in nLocal. For the example method shown in FIG. 6, nStack=6, nLocal=3, and nArg=2. The stack status is shown in FIGS. 32 and 33.

The process of converting the method of the Java bytecode shown in FIG. 6 into the subroutine of native codes according to the processing procedure of FIG. 14 will be described hereinafter.

Following the execution of step 601, all operands are allocated to the memory region shown in FIG. 33. FIG. 34 represents the allocated status. For example, local variable [0] (first argument) is allocated to a memory region of 4 bytes that is offset from the stack pointer by 60 bytes.

At step 602, the process of FIG. 16 is executed. FIGS. 35 and 36 show the way how the executing goes during the processes.

Immediately before the start of step 801, operand reference counts RS0–RS5 and RL0–RL2 are all set to 0. RS0–RS5 are the reference counts of stack operands [0]–[5]. RL0–RL2 are the reference counts of local variables [0]–[2]. At steps 801 and 802, [address 0, stack depth 0] is registered in the stack depth list. Although the stack depth list not shown, it can easily be implemented, for example, with an array of addresses indexed by the registered order, and an array of the stack depths indexed by the registered order. At step 803, jpc=0, jsnext=0 are set. This stage is shown in status (1).

Status (2) shows the stage when it comes to YES of step 813 after executing steps 804–813. It is noted that jpc succeeds the previous value 0 of status (1). Since [address 0, stacked depth 0] is registered in the stack depth list, steps 804 and 806 or executed, whereby js=0. The values of jinst, jinstsize and jpcnext computed at step 807 are iload_0, 1 and 1, respectively. Since instruction iload_0 pushes the value of local variable [0] on the stack, the values of consume and produce obtained at step 808 are 0 and 1, respectively. Therefore, jsnext computed at step 806 is js–consume+produce=0–0+1=1. At step 810, [address 1, stack depth 1] is registered since the Java bytecode of the next address jpcnext(=1) is the only Java bytecode that has the possibility of being executed subsequent to iload_0. Since iload_0 refers to local variable [0] (read) and stack operand [0] (write), corresponding reference counts RL0 and RS0 are respectively incremented by 1 to become 1 and 1, respectively, at step 811.

Similarly, by repeating steps 804–813 and arriving at the YES of step 813, the stages shown in status (3) (4) . . . are achieved.

At status (8), [address 9, stack depth 1] and [address 21, stack depth 1] are registered in the stack depth list since the next execution of instruction ifge 21 may possibly be either address 9 which is the next address (jpcnext) or address 21 which is the branch target address.

At status (18), [address 28, stack depth 2] is registered since the next execution of instruction goto 28 corresponds to address 28 which is the branch target address.

At status (23), an attempt is made to register [address 28, stack depth 2] since the next execution of instruction invokestatic is the next address 28. However, since the stack depth for address 28 is already registered at status (18), the stack depth already registered and the stack depth to be registered are compared (step 902). Since the stack depths are same in this case, step 904 is skipped, and the registration process of the address and stack depth ends.

At status (25), nothing is registered in the stack depth list since the next possible address of instruction ireturn is determined only at the time of execution and not yet definite at this time point.

In this way, the reference counts of operands as shown in RS0–RS5 and RL0–RL2 of the last status (25) are obtained. Also, the stack depth indicated in the column of "instruction address and stack depth that are registered" of statuses (1)–(25) will be registered in the stack depth list.

At step 814, the process shown in FIG. 19 is carried out. From step 1101, control proceeds to step 1104. At step 1104, operand reference counts RS0–RS5 and RL0–RL2 obtained by that time are sorted in the descending order. In the present example, the order of RS1, RS0, RS2, RS3, RS4, RL0, RL2, RS5, RL1 is obtained. By allocating registers R8–R13 to the first six operands in this order at step 1105, the register allocation as shown in FIG. 34 is achieved. More specifically, register R8 is allocated to stack operand [1]. Register R9 is allocated to stack operand [0]. Register R10 is allocated to stack operand [2]. Register R11 is allocated to stack operand [3]. Register R12 is allocated to stack operand [4]. Register R13 is allocated to local variable [0].

Thus, step 602 ends, and control proceeds to step 603. At step 603, the process of FIG. 20 is implemented. FIGS. 37 and 38 show native codes generated as the process is executed. In FIGS. 37 and 38, the characters of S<0> to S<5>, L<0> to L<2> indicate the operands of FIG. 34. For example, "ldi S<0>, #1" corresponds to "ldi R9, #1", and "ld S<3>, @L<1>" corresponds to "ld R10, @(56, sp)".

At step 1201, the native code as shown in status (1) is generated. The contents of this native code correspond to the code which changes the stack layout from that of FIG. 32 to FIG. 33, and the code to load values from the memory into the registers for all the local variables that are arguments and one allocated to registers (here, L<0>). The meaning of nLocal, nStack and nArg are same as those employed in FIGS. 30-33.

At step 1202, jpc=0. At step 1203, the Java bytecode jinst at the obtained address 0 is iload_0. At step 1204, the computed jinstsize is 1. At step 1205, the computed jpcnext is 1. Since stack depth 0 at address 0 is registered as shown in (1) of FIG. 35, the obtained js is 0 at step 1202. At step 1207, native codes as shown in FIGS. 21-28 are generated according to Java bytecode jinst that is to be converted. In the present example, the native code as shown in FIG. 22 is generated since jinst is iload_0. Since the operands at stack depth js=0 are S<0> and L<0>, and operands S<0> and L<0> are allocated registers R9 and R13, respectively, as shown in FIG. 34, the native code of mv S<0>, L<0> (i.e., mv R9, R13) indicated at the first line in FIG. 22 is generated. In this way, the native code shown at (2) in FIG. 37 is generated.

Thus, in a similar manner, the native codes of (3)–(25) in FIGS. 37-38 are generated. Here, the epilogue codes of (25) which is generated for ireturn will bring back the stack layout from that of FIG. 33 to FIG. 32.

According to the program execution system of non-native code of the first embodiment of the present invention, by allocating registers to local variables and operand stacks, not only the number of resultant native codes after conversion is reduced but also the memory access frequency is reduced compared to the conventional case where memory is allocated. As a result, the execution speed is improved.

Second Embodiment

Many components of the structure of the data processor according to a second embodiment of the present invention are common to those of the first embodiment. According to the program execution system of the non-native code of the second embodiment, a register is allotted to the local variable and operand stack. The number of resultant native codes of conversion as well as the memory access frequency are reduced than in the case where the same are allotted a memory.

Figure 39:
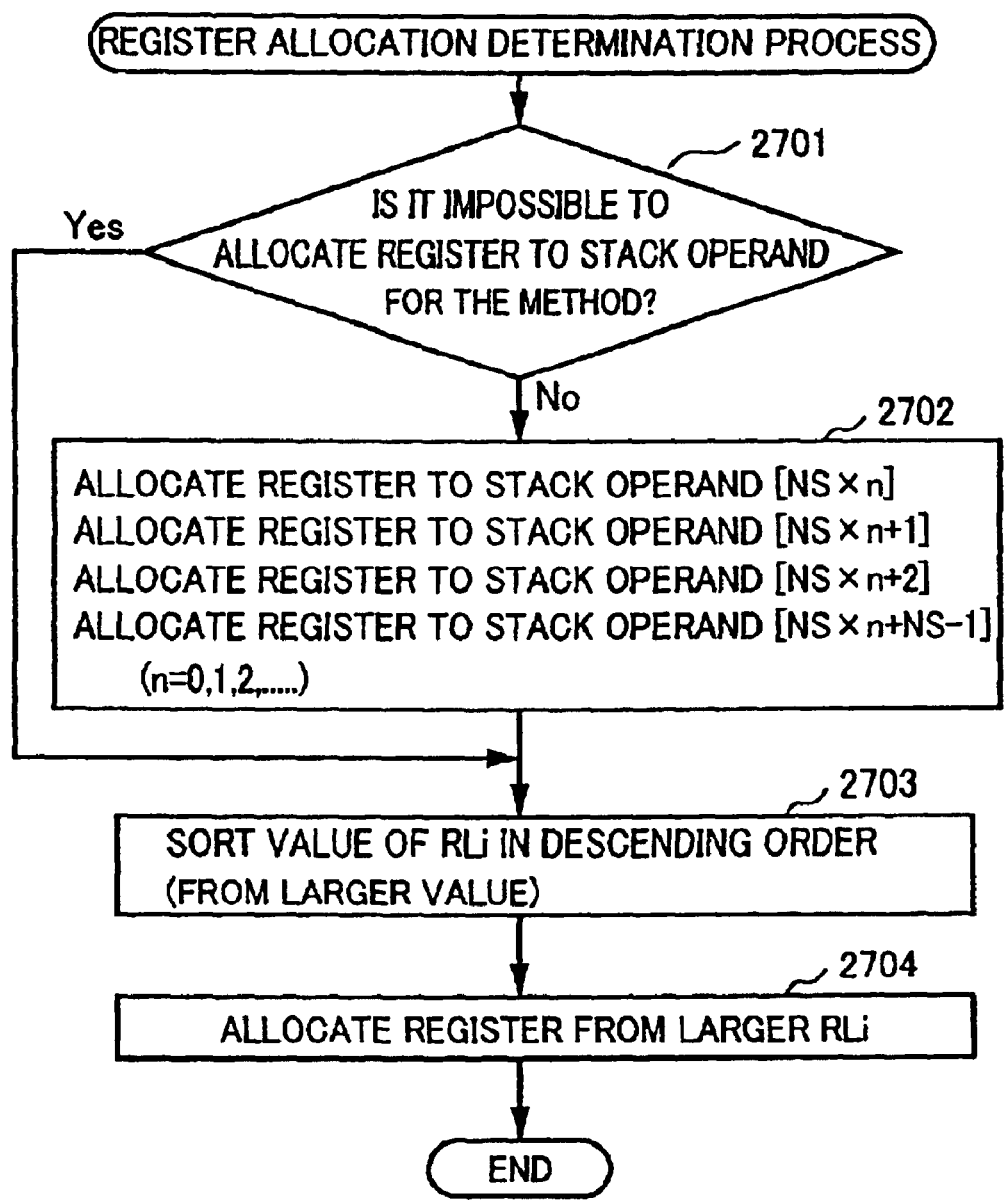
FIG. 39 is a flow chart of the procedure of a register allocation determination process according to the second embodiment.

The contents from FIGS. 1 to 18 are identical for both the first and second embodiments, except that the register determination process of step 814 in FIG. 12 is carried out according to the procedure of the flow chart of FIG. 39, not FIG. 19, in the apparatus of the second embodiment.

NS registers are allocated to the stack operands. In the present example, the four registers of R8–R11 are allocated, so that NS=4. For example, register R8 is allocated to stack operand [4n] (n=0, 1, ... ). During execution, a native code is generated so that stack operands at from [b] to [js–1] are stored in the registers, where js is the stack depth. More specifically, register R8 holds stack operand [4n], where n is the maximum n which satisfies 4n<js during execution. Any stack operands allocated to register R8 but not held are temporarily stored in the memory. As for local variables, allocation similar to that of the first embodiment is implemented. More specifically, the reference counts of the local variables are sorted (2701), and registers are allocated in the descending order (2704).

Figure 40:
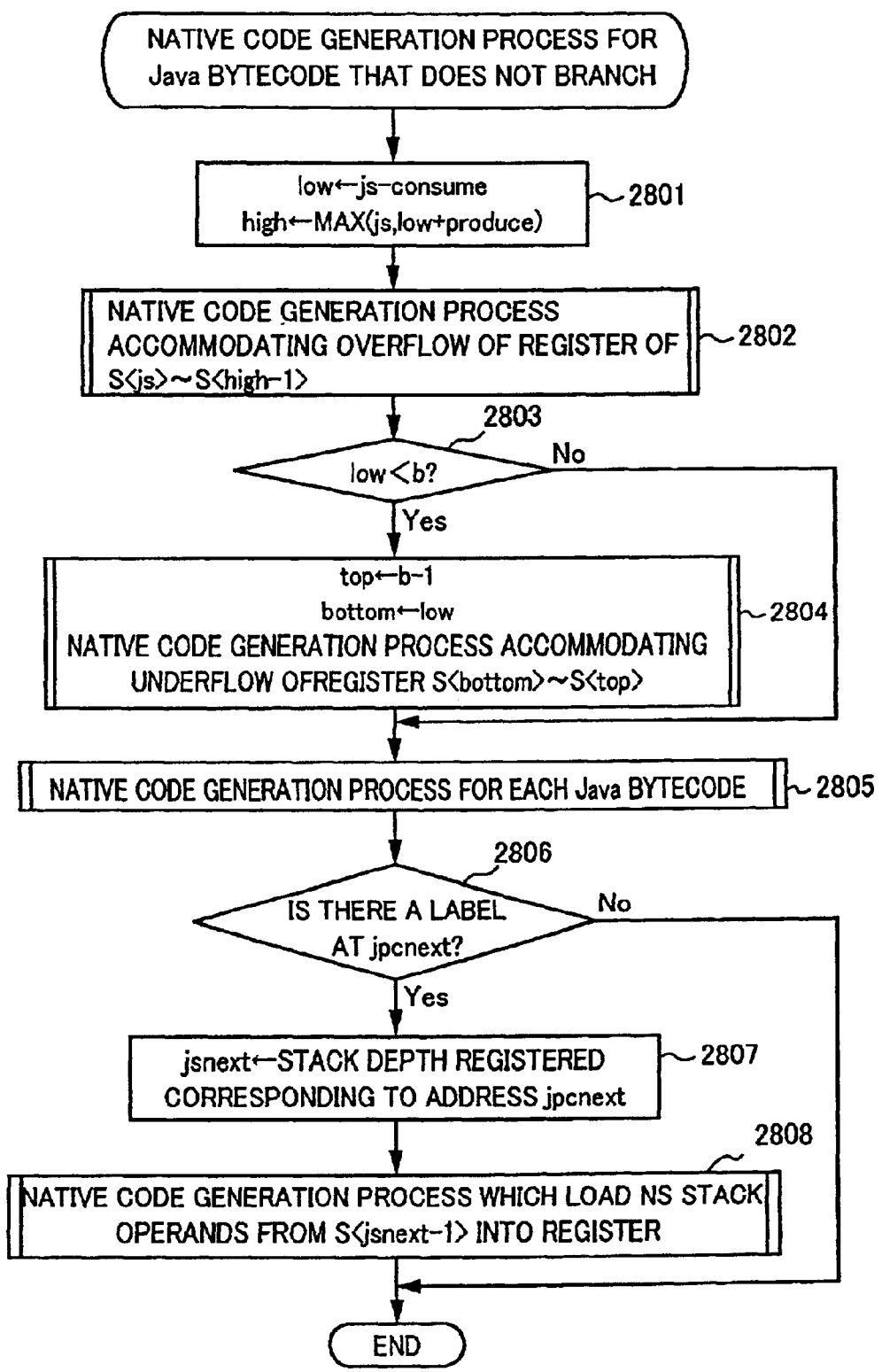
FIG. 40 is a flow chart of the procedure of a native code generation process with respect to Java bytecode that does not branch according to the second embodiment.
Figure 41:
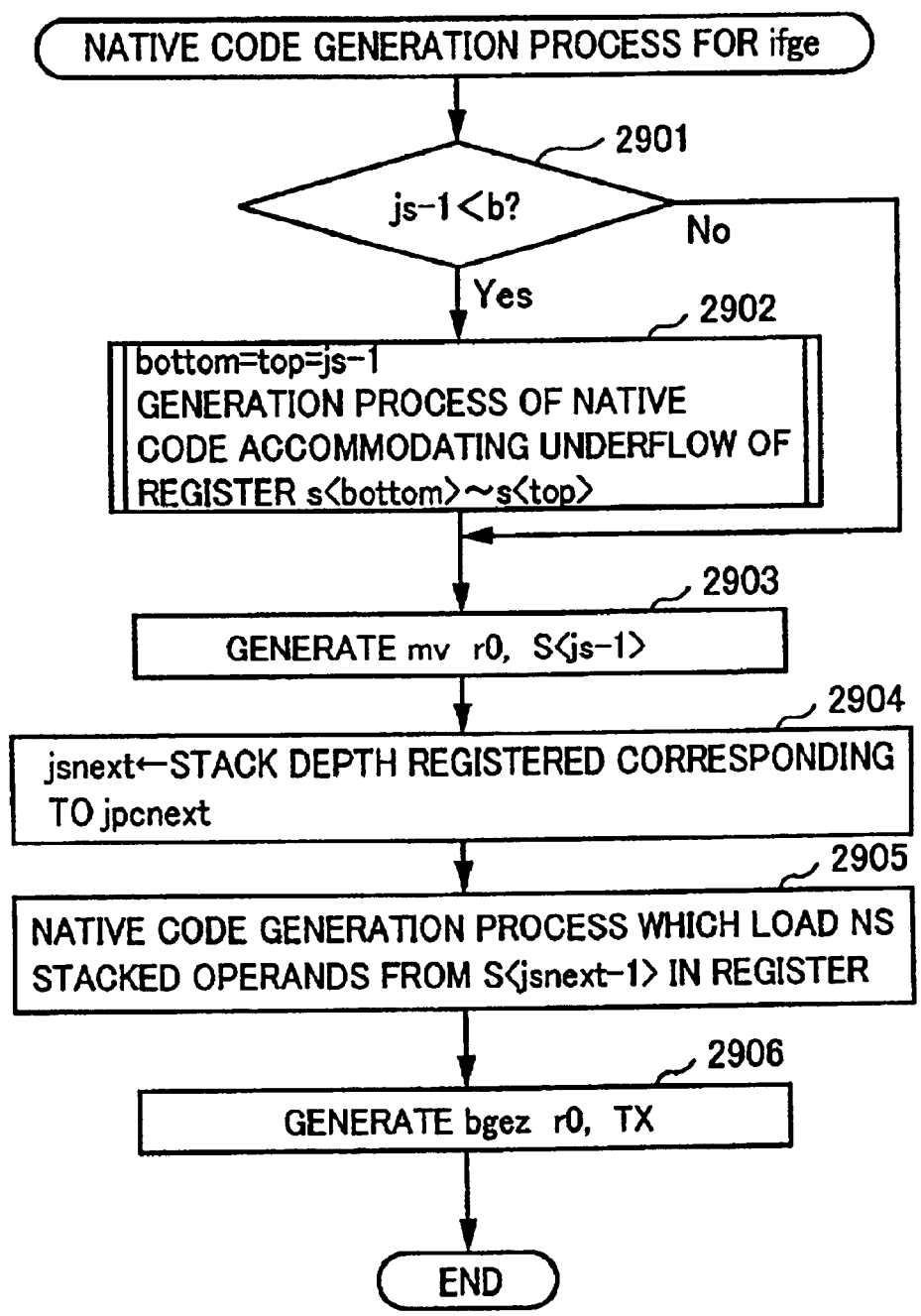
FIG. 41 is a flow chart of the procedure of a native code generation process for ifge according to the second embodiment.
Figure 42:
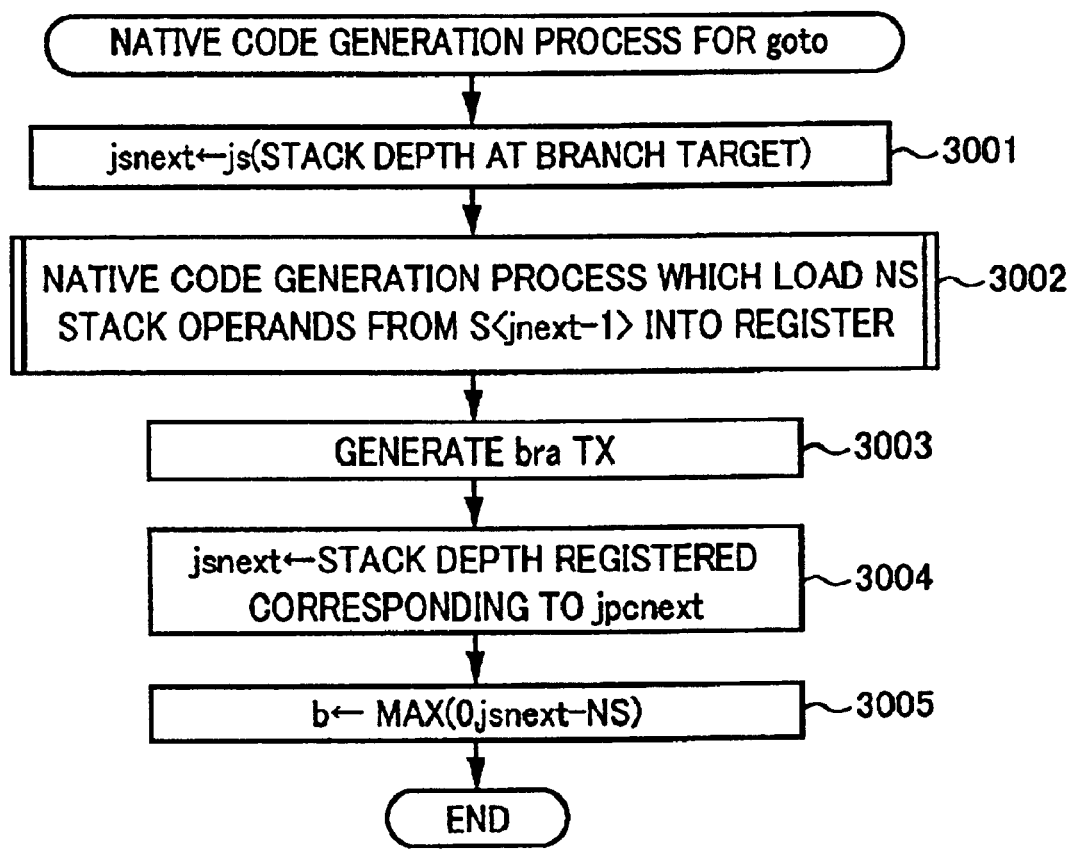
FIG. 42 is a flow chart of the procedure of a native code generation process for goto according to the second embodiment.

Although the process flow itself of FIG. 20 is identical to that of the first embodiment, it is to be noted that the native code generation process for the Java bytecode of jinst at step 1207 is carried out according to the procedure of the flow charts of FIGS. 40-42 depending upon the type of jinst, instead of the flow charts of FIGS. 21-28.

Also, the usage of M32R register is as shown in FIG. 43 instead of FIG. 29.

FIG. 40 represents the native code generation process carried out for the Java bytecode that does not branch at step 1207 of FIG. 20. At step 2801, the stack operand to be used is obtained. The operands from [low] to [high–1] are used. At step 2802, the process of reserving the allocated registers for the operands from S<js> to S<high–1> is carried out. Since operands from [b] to [js–1] are stored in the registers, in the case that generates registers other than these are to be used, the process of loading operands deeper than [b–1] from the memory to the register (2803, 2804) and the process of reserving the registers for operands shallower than [js] are carried out.

At step 2805, native codes shown in FIGS. 21-28 (when stack operand corresponds to register) of the first embodiment are generated. The process of steps 2806, 2807 and 2809 makes the registers allocated for NS(4) stack operands at the stack top hold their values at the junction of the execution path (i.e. the address labeled as branching target). The register allocated to the stack operand does not always hold a correct value (although stack top to stack operand [b] are held in the registers, there is a possibility that the value of b differs for each execution path to the junction). If no measures are taken, the value in the register may be incorrect at the junction point of execution paths, so that the register can no longer be used at subsequent generation of the native codes. Therefore, native codes are generated at the junction of execution paths so that topmost NS stack operands are always held in corresponding registers.

FIG. 41 is the native code generation process carried out for ifge at step 1207 of FIG. 20. Refer to (8) of FIG. 23 as for ifge. Since ifge refers to S<js−1>, this is loaded into the register (2902) if not yet held in the register (2901). Although the codes for conditional branching are to be eventually generated (2906), the native codes for junction must be inserted at 2904 and 2905. Since register S<js−1> may hold stack operand [js−5] by this native codes for junction, S<js−1> is moved into register r0 in advance (2903). At step 2904, the stack depth registered in correspondence with address jpcnext is assigned to variable jpnext. At step 2905, native codes are generated to make the NS stack operands from S<jsnext−1> below held in registers. At step 2906, a conditional branch instruction whose condition is based on register r0 is generated.

FIG. 42 is the native code generation process carried out for code goto at step 1207. Refer to (18) of FIG. 63 as for code goto. First, the native codes for junction is generated (3001, 3002). More specifically, in the present invention, js representing the stack depth of the branching destination is assigned to jsnext (3001). Then, the native codes to make the NS stack operands from S<jsnext−1> below held in registers are generated (3002).

Then, the branch instruction (here, "bra TX") is generated (3003). Since NS stack operands at the top of the stack are held in the registers at the next address, the value of b is changed (3004, 3005). More specifically, the stack depth registered corresponding to jpcnext is assigned to variable jsnext (3004). Then, the larger of the values of 0 and jsnext-NS is assigned to b (3005).

Figure 44:
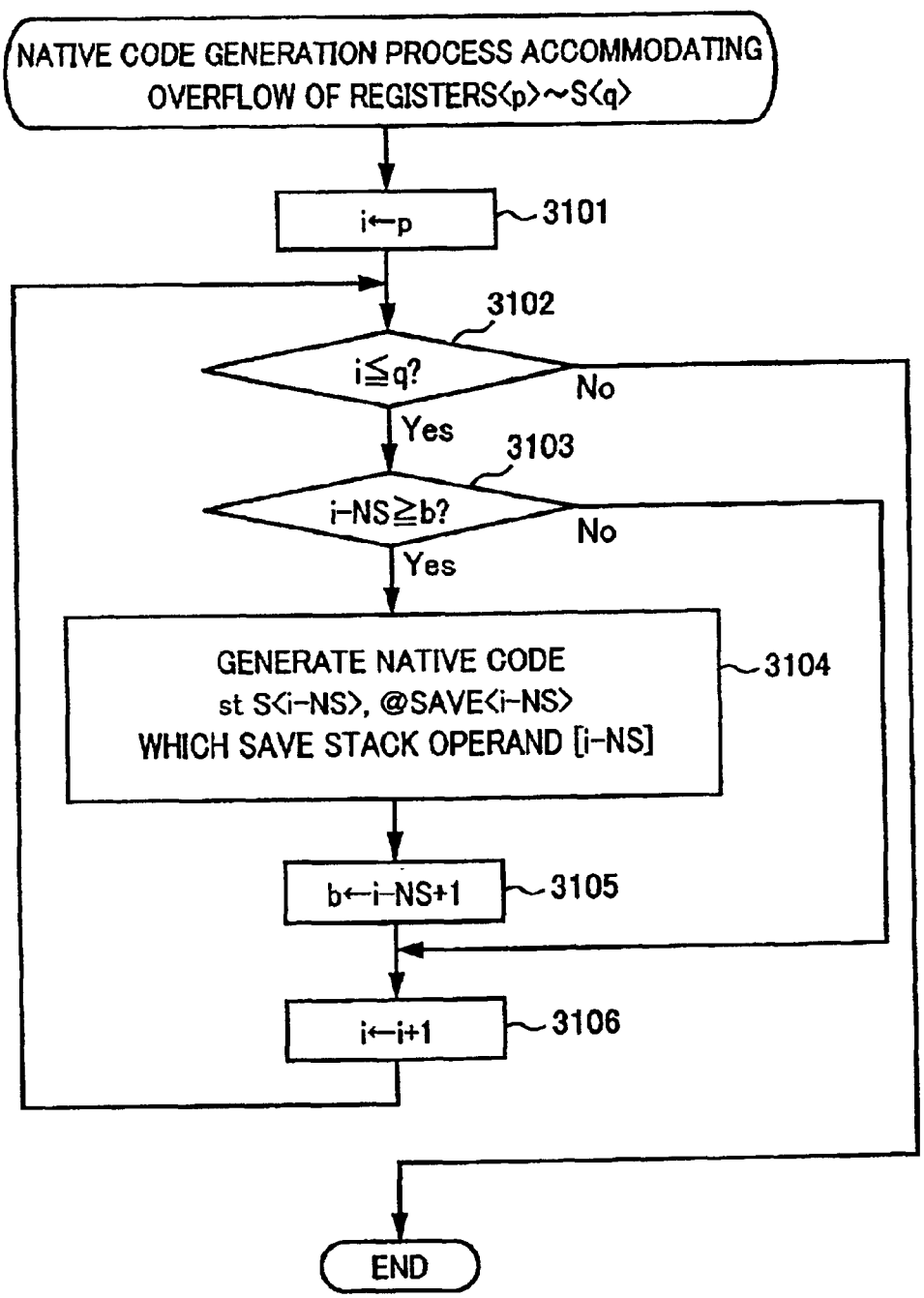
FIG. 44 is a flow chart of the procedure of a native code generation process accommodating overflow of registers S<p>–S<q> according to the second embodiment.

FIG. 44 shows the process of step 2802 of FIG. 40. In this process, a native code is generated to accommodate overflow of registers S<p> to S<q>. For this purpose, steps 3102-3105 is repeated for i=p to q.

First, the value of p is assigned to iteration control variable i (3101).

At the iteration portion, determination is made whether the value of stack operand [i−NS] is held in register S<i>. Since [b] to [js−1] are stored in corresponding registers, the value of the stack operand will be retained if i−NS is between b and js−1. This determination is made at steps 3102 and 3103. At step 3102, determination is made whether i is equal to, or less than q. The process ends if i is greater than q. If i is equal to or less than q, control proceeds to steps 3103 to determine whether i−NS is less than b or not. If i−NS is less than b, control proceeds to step 3104, otherwise control proceeds to step 3102, skipping steps 3104 and 3105.

If i−NS is held in the register, the native code of "st S<i−NS>, @SAVE<i−NS>" is generated to store that value in the memory (3104). Then, b is modified to i−NS+1 in order to indicate that i−NS is no longer stored in the register (3105).

Figure 45:
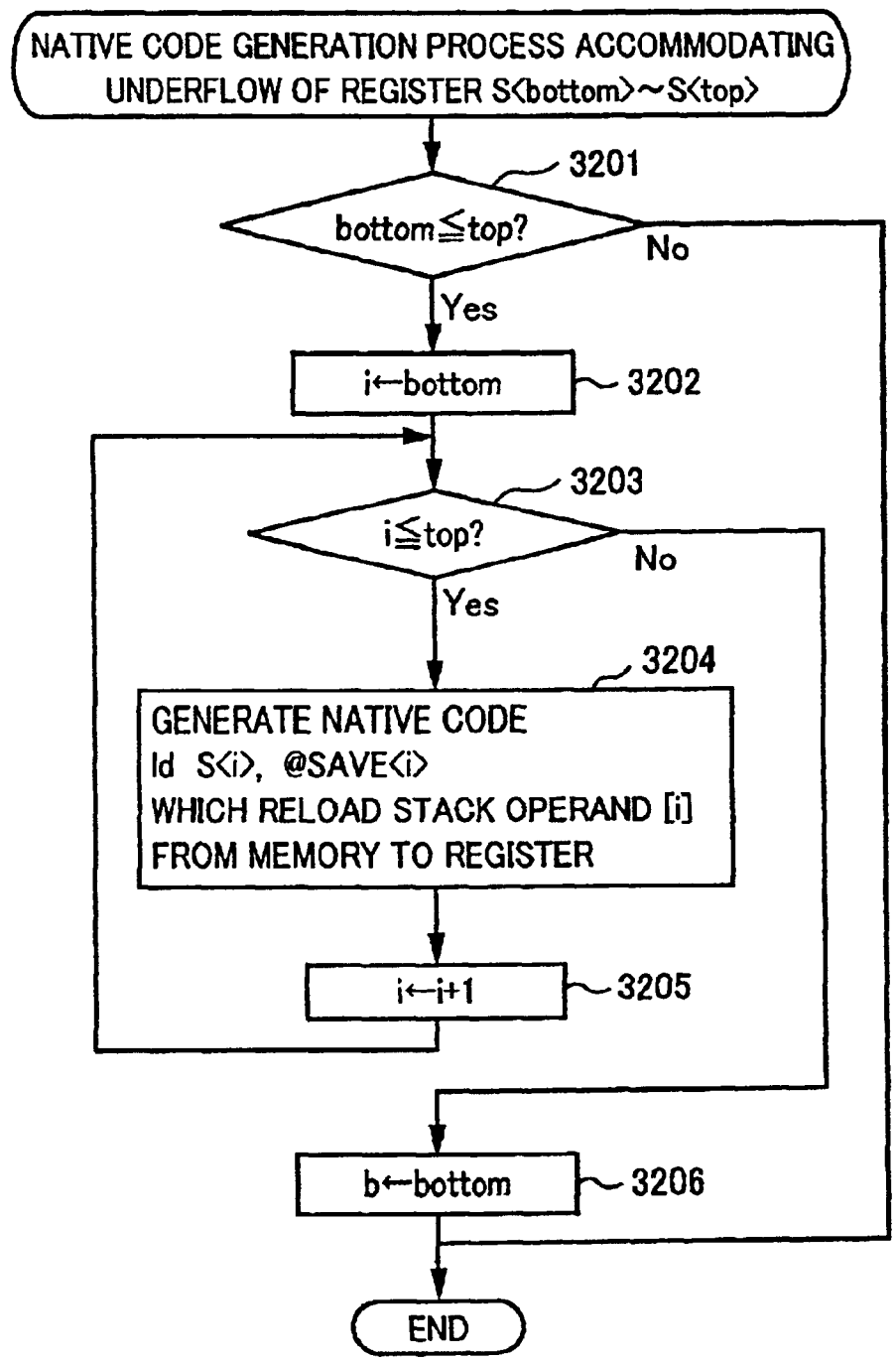
FIG. 45 is a flow chart of the procedure of a native code generation process accommodating underflow of registers S<bottom>–S<top> according to the second embodiment.

FIG. 45 shows the process of step 2804 of FIG. 40. Step 3204 is repeated for i=bottom to top. The process of steps 3201, 3203 and 3205 controls the iteration.

More specifically, determination is made whether bottom is equal to or less than top. If bottom is equal to or less than top, control proceeds to step 3202. If bottom is larger than top, the process ends.

At step 3202, he value of bottom is assigned to i. At step 3203, determination is made whether i is equal to or less than top. If i is equal to or less than top, control proceeds to step 3204, otherwise to step 3206. At step 3206, the value of bottom is assigned to b in order to indicate that the values up to bottom are held in the registers.

At step 3204, the native code of "ld S<i>, @SAVE<i>" to restore S<i> is generated. At step 3205, 1 is added to i, and control returns to step 3203. By the above-described process, native codes to accommodate underflow of registers S<bottom> to S<top> is generated.

The description follows which show how the method of Java bytecode of FIG. 6 is converted into a subroutine of native codes according to the procedure of FIG. 14 of the second embodiment.

The processes up to register determination process 814 are identical to those of the first embodiment. More specifically, following execution of step 601, all operands are allocated to the memory as shown in the column immediately preceding the conversion start process of FIG. 46. This is similar to FIG. 34 of the first embodiment. At step 602, the process as shown in FIG. 35 is carried out according to the process of FIG. 16, as in the first embodiment. The reference counts of operands as indicated by RS0–RS5 and RL0–RL2 of the last status (25) are obtained, and the stack depth as indicated in the column of "instruction address and stack depth to be registered" of statuses (1)–(25) is registered.

At step 814, the process of FIG. 39 is implemented. At step 2701, control proceeds to step 2702 where the stack operands are allocated to four registers R8–R11. In the present example, stack operands [0] and [4] are allocated to register R8. Stack operands [1] and [5] are allocated to register R9. Stack operand [2] is allocated to register R1. Stack operand [3] is allocated to register R11. At step 2703, reference counts RL0–RL2 of the local variables are sorted in the descending order. In the present example, the order of RL0, RL2 and RL1 is achieved. At step 2704, the register allocation result as shown in FIG. 46 is obtained by allocating the first two local variables in this order to registers R12 and R13.

Thus, step 602 is completed, and control proceeds to step 603. The process of FIG. 20 is implemented at step 602. FIGS. 47 and 48 show native codes generated during the execution of this process. In FIG. 47, the characters of S<0> to S<5>, L<0> to L<2> indicate the operands of FIG. 46. For example, ldi S<0>, #1 corresponds to ldi R8, #1 whereas ld S<3>, @L<1> corresponds to ld R10, @(56,sp).

At step 1201, the native code as shown in status (1) is generated. The contents of this code include the code to modify the stack layout from that of FIG. 32 to FIG. 33, and the code to load the value from the memory into the registers for any local variables that are arguments and that are allocated to registers (in the present example, L<0> and L<2>).

At step 1202, jpc=0. At step 1203, the Java bytecode jinst at address 0 obtained is iload_0. At step 1204, the obtained jinstsize is 1. At step 1205, the obtained jpcnext is 1. Since stack depth 0 corresponding to address 0 is registered as shown in (1) of FIG. 35, the js obtained at step 1206 is 0. At step 1207, the process as shown in FIGS. 40-42 is carried out corresponding to the Java bytecode jinst that is to be converted. In the present example, the process of FIG. 40 is carried out since jinst is iload_0.

The values of low and high obtained at step 2801 of FIG. 40 are 0 and 1, respectively. At step 2802, the process of FIG. 44 is carried out. Here, control proceeds through steps 3101, 3102 (Yes), 3103, 3104 (No), 3107, 3102 (No) since js=0, b=0, low=0, high=1. Therefore, the process ends without generating a native code. Then, determination is made at step 2803, and control proceeds to the NO side. The process of step 2805 is similar to that of the first embodiment, and shown in FIGS. 21-28. In the present example, native codes as shown in FIG. 22 are generated. Since the operands at stack depth js=0 are S<0> and L<0>, and operand S<0> is allocated register R8 and operand L<0> is allocated register R12, the native code of "mv S<0>, L<0>" (i.e., mv R8, R12) shown at the first line in FIG. 22 is generated. At step 2806, determination is made whether there is a label in jpcnext (=1). Here, there is no label. Therefore, control proceeds to NO, and the process of FIG. 40 ends. In this way, the native codes at (2) in FIG. 47 are generated.

In a similar manner, the native codes of (3)–(7) of FIG. 47 are generated.

Figure 49:
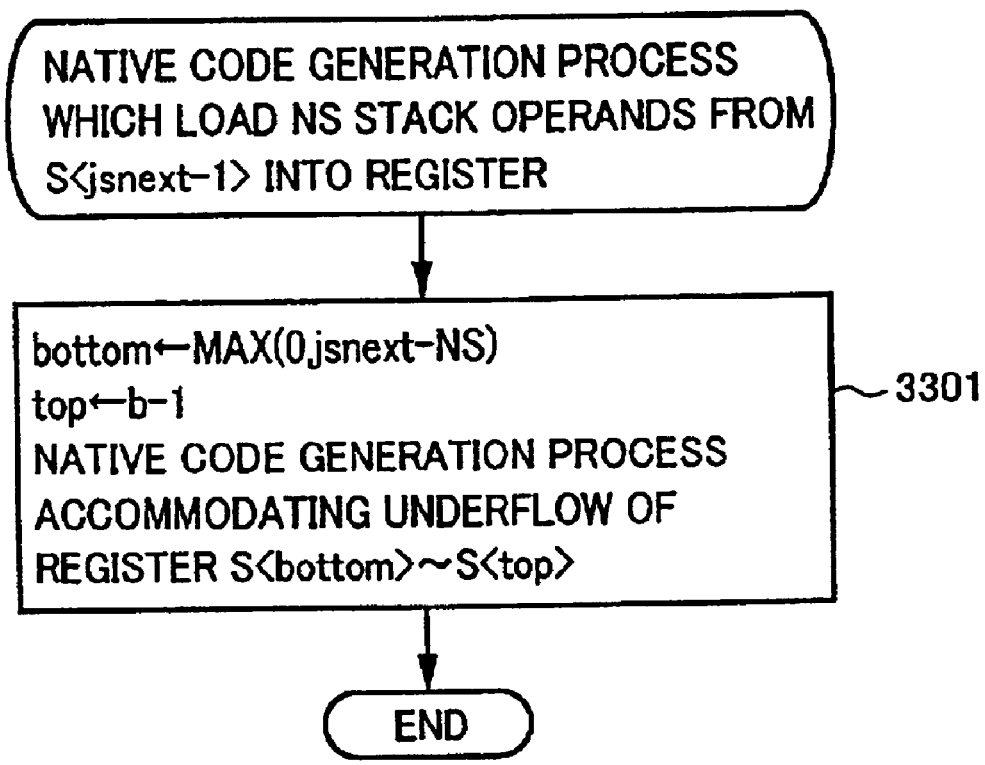
FIG. 49 is a flow chart of the procedure of a native code generation process to store NS stack operands from S<jnext−1> in the register according to the second embodiment.

In the conversion process of (8) in FIG. 47, the process of FIG. 41 is carried out at step 1207. Since js=2 and b=0, control proceeds to NO of step 2901. At step 2903, the native code of "mv r0, S<1>" is generated. Since stack depth 1 is registered for address 9 as shown in (8) of FIG. 35, the value of jsnext obtained at step 2904 is 1. At step 2905, the process of FIG. 49 is implemented. At step 3301, the process of FIG. 45 (bottom=MAX (0, jsnext−NS)=0, top=b−1=−1) is executed. Since the determination result at step 3201 is NO, the process ends. At step 2906, the native code of "bge r0, T21" is generated. In this way, the native codes at (8) are generated.

As to (9)–(11) of FIG. 47, the native codes shown in FIG. 47 are generated by a process similar to the process of (2).

In the conversion process of (12) in FIG. 47, the process of FIG. 40 is implemented at step 1207. At step 2801, the obtained values of low and high are 4 and 5, respectively. At step 2802, the process of FIG. 44 is carried out. Since p=4, q=4, b=0, low=4, high=5 here, i−NS=0 is achieved at step 3103, and the step of 3104 is executed. More specifically, a native code to store stack operand [0] in the memory is generated. In the present example, the native code of "st S<0>, @SAVE<0>" is generated. Here, SAVE<0> represents the memory region allocated to S<0> at the beginning of the register allocation process. In the present example, it is (40, sp). After the native code is generated, control proceeds to step 3106, where b is updated to 1. At step 3107, determination at 3102 results in NO, and the process of FIG. 44 ends.

Returning to FIG. 40, control proceeds to the NO side from step 2803. Although the process of step 2805 is similar to that of the first embodiment, the native codes shown in FIG. 21 are generated since the current Java bytecode is iconst_3. Since the operand at stack depth js=4 is S<4> here, and S<4> is allocated to register R8, a native code "ldi S<3>, #3" is generated, which is shown in FIG. 21, as the one for the case that the operand is allocated to a register. Thus, the process of generating the native codes of (12) in FIG. 47 is completed.

In the conversion process of (13) in FIG. 47, native codes are generated similar to (12). Here, the value of b is updated to 2 at step 3106.

At (14)–(16) in FIG. 47, native codes as shown are generated similar to (2).

In the conversion process of (17) of FIG. 47, the process of FIG. 40 is carried out at step 1207. The values of low and high obtained at step 2801 are 1 and 3, respectively. Although the process of FIG. 44 is implemented at step 2802, the determination result of step 3102 is NO, since p=3, q=2, low=1, high=3. Therefore, the process of FIG. 44 ends. At step 2803, control proceeds to step 2804. At step 2804, the process of FIG. 45 is implemented (top=b−1=1, bottom= low=1). From steps 3201, 3202 and 3203, i=1 is achieved, and step 3204 is executed. More specifically, a native code to reload stack operand [1] from the memory to the register is generated. In the present example, the native code of "ld S<1>, SAVE<1>" is generated. Here, SAVE<1> indicates the memory region (44, sp) allocated to S<1> at the beginning of register allocation.

Then, control proceeds through steps 3205 and 3203 (NO) to step 3206 where the value of b is updated to 1. The process of FIG. 45 ends. Since the process of step 2805 is similar to that of the first embodiment, except that the current Java bytecode is imul, the native code of FIG. 24 is generated. Here, the operands at stack depth js=3 are S<2> and S<3>, that are allocated to registers R10 and R11, respectively. Therefore, the native code for registers allocated to both operands of FIG. 24, i.e. the native code of "mul S<2>, S<3>" is generated. Thus, the process of generating the native code of (17) of FIG. 47 is completed.

At the conversion process of (18) of FIG. 47, the process of FIG. 42 is carried out at step 1207. At step 3001, the obtained value of jsnext is 2. At step 3002, the process of FIG. 49 is carried out. At step 3301, the process of FIG. 45 is carried out (top=b−1=0, bottom=MAX(0, jsnext−NS)=0). From steps 3201, 3202 and 3203, i=0 is achieved, and step 3204 is executed. More specifically, the native code to reload stack operand [0] to the register from the memory is generated. In the present example, the native code of "ld S<0>, @SAVE<0>" is generated.

Control further proceeds through steps 3205 and 3203 (NO) to step 3206 where the value of b is modified to 0. The process of FIG. 45 ends. At step 3003, the native code of "bra T28" is generated. Since stack depth 1 is registered for address 21 as shown in (8) of FIG. 35, the obtained value of jsnext at step 3004 is 1. At step 3005, the value is modified as b=MAX(0, jsnext−NS)=0. The foregoing corresponds to the process of generating the native code of (18) in FIG. 47.

In a similar manner, the native codes shown in FIGS. 47 and 48 are generated.

According to the program execution system of non-native code according to the second embodiment of the present invention, registers are allocated to the local variables and operand stacks. Accordingly, the number of resultant native codes of conversion as well as the memory access frequency are reduced in comparison to the case where memories are allocated to the local variables and operand stack. As a result, the execution rate is also improved.

Third Embodiment

In the data processor according to a third embodiment of the present invention, a native code is not generated for the Java bytecode that only transfers data. The operand of a transfer destination is recorded in correspondence with the transfer source. When an operand that has the transfer source already recorded is to be used in the conversion of java bytecode that carries out an operation, a native code is generated that carried out an operation using the recorded transfer source. Therefore, the number of resultant native codes of conversion is reduced, whereby the execution speed is also improved.

The structure of the data processor according to the third embodiment has many elements common to those of the second embodiment.

As to FIGS. 1-18 and 39, the process carried out by the data processor of the third embodiment is identical to the process carried out by the data processor of the second embodiment.

The usage of the M32R register is identical to that of FIG. 43.

Although the process flow of FIG. 20 per se is identical, the native code generation process for the Java bytecode of jinst at step 1207 is carried out by the procedure of the flow charts of FIGS. 50-62 corresponding to each type of the Java bytecode instead of the flow chart of FIGS. 40-42.

Figure 50:
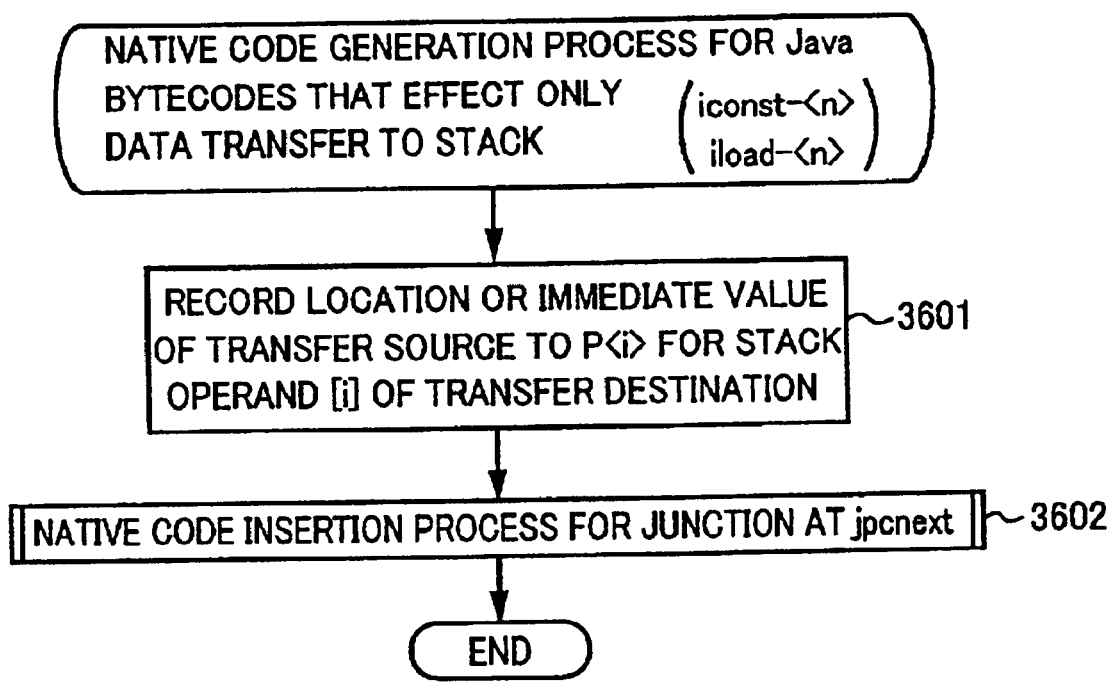
FIG. 50 is a flow chart of the procedure of a native code generation process for Java bytecode that effects only data transfer to a stack according to the third embodiment.

FIG. 50 represents the conversion process for Java bytecodes that only transfers data to a stack. These include, for example, the Java bytecodes of iconst_<n> and iload_<n>. Here, the location of the transfer source (or, the immediate value when the transfer source is an immediate value) is recorded into P<i> at step 3601 instead of generating a native code which actually executes the transfer. Here, P<i> (i=0 to nStack-1) is a data structure in which an immediate value or the location of a transfer source can be recorded. P<i> holds any of the values in the following Table 1. In the following description and drawings, the relationship between respective values and the meaning of P<i> are as follows.

TABLE 1

| Character | Meaning |
| --- | --- |
| x (immediate value) | Indicates that the native code that loads immediate value x into stack operand [i] is pending. |
| L<n> | Indicates that the native code that loads the value of local variable [n] into stack operand [i] is pending. |
| S<i> | Indicates that a valid value is held in the register allocated to stack operand [i]. |
| SAVE<i> | Indicates that the valid value held in stack operand [i] is stored in the memory, not in the allocated register. |
| — | Indicates that no recording of particular meaning is effected. |

Step 3602 is the process to store the value in the registers allocated to the NS(4) entries at the stack top side of stack operands in the execution junction (i.e. the address labeled as branching destination). The register allocated to the stack operand does not always hold a correct value. If no measures are taken, the value in the register may be incorrect at the junction of execution paths, so that registers can no longer be used in the subsequent generation of native codes. To avoid this situation, native codes are generated at the junction of execution paths so that topmost NS stack operands are always held in corresponding registers. The native code for this purpose is inserted in the following cases.

Figure 56:
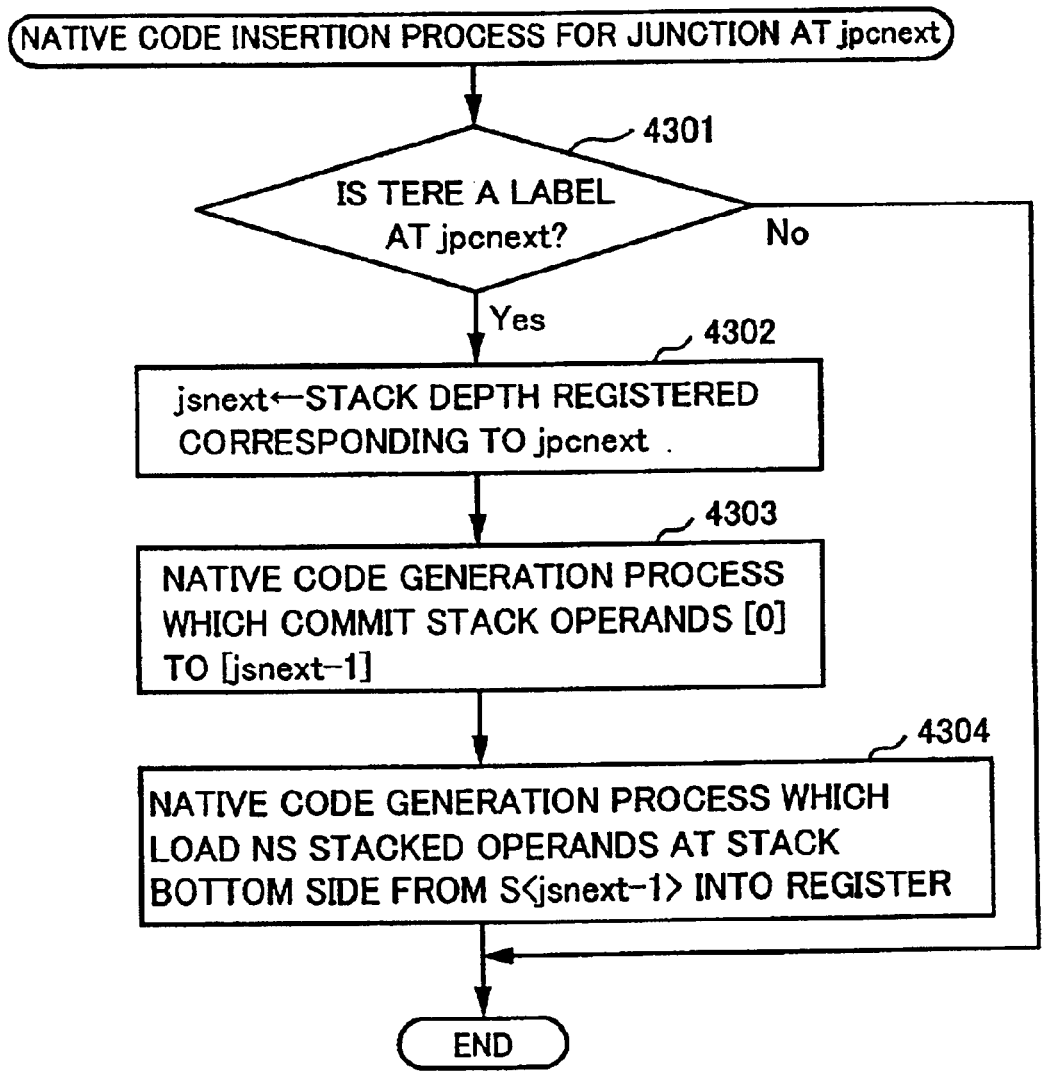
FIG. 56 shows a native code generation process for junction at jpcnext according to the third embodiment.

When Java bytecode that causes execution to be succeeded to the next address is present immediately proceeding the label (i.e. when the label is present at the next address), the native code is inserted (by steps 3602, 3702, 3806 an 4003) immediately after (before the label) the native code with respect to that Java bytecode. The process of inserting this native code is as shown in FIG. 56.

In Java bytecode that effects branching, the native code is inserted immediately before generating the branch native code (by steps 4101–4102, 4203–4205, 4208–4210, and 4215–4217).

Figure 51:
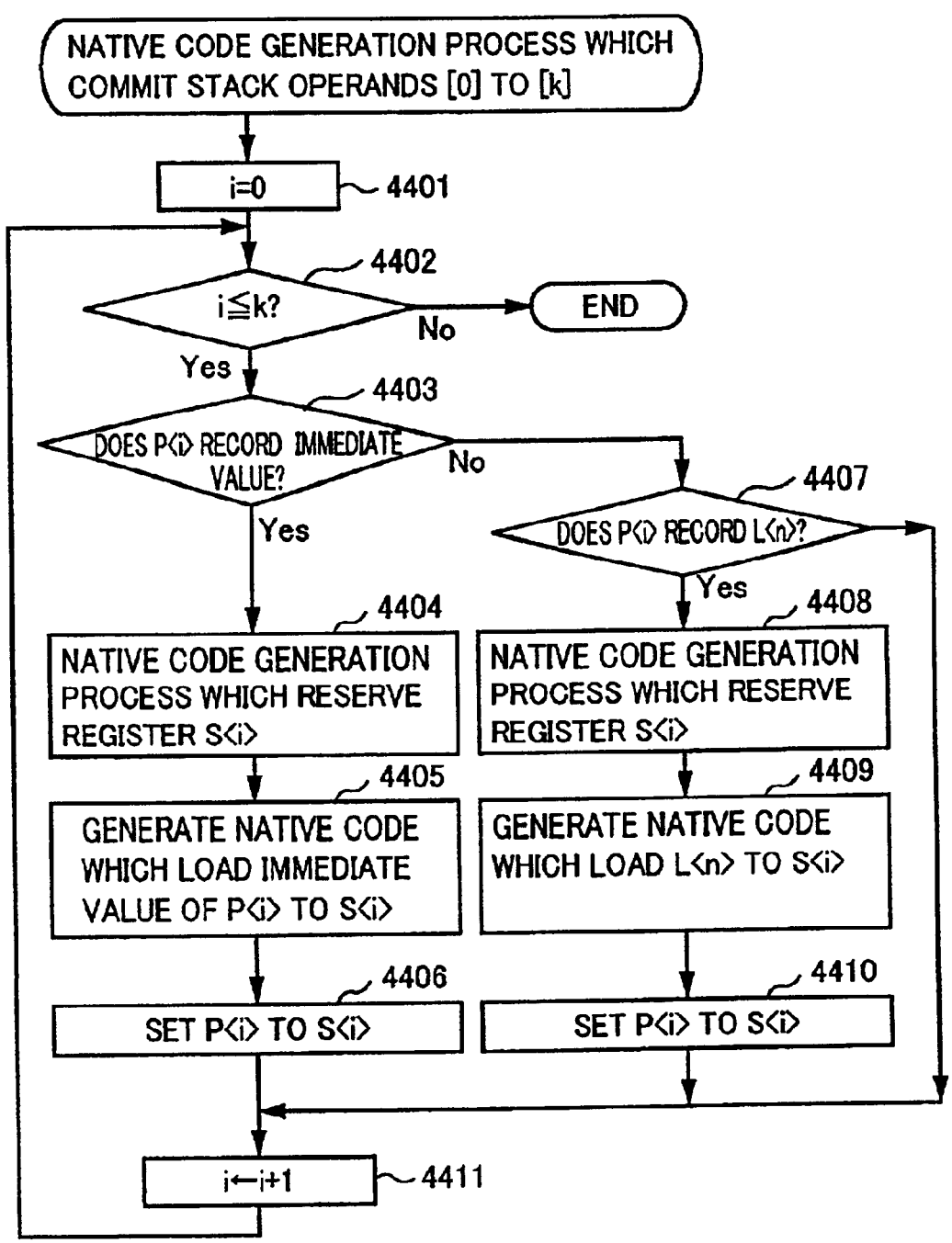
FIG. 51 is a flow chart of the procedure of a native code generation process to render P<i> valid according to the third embodiment.
Figure 53:
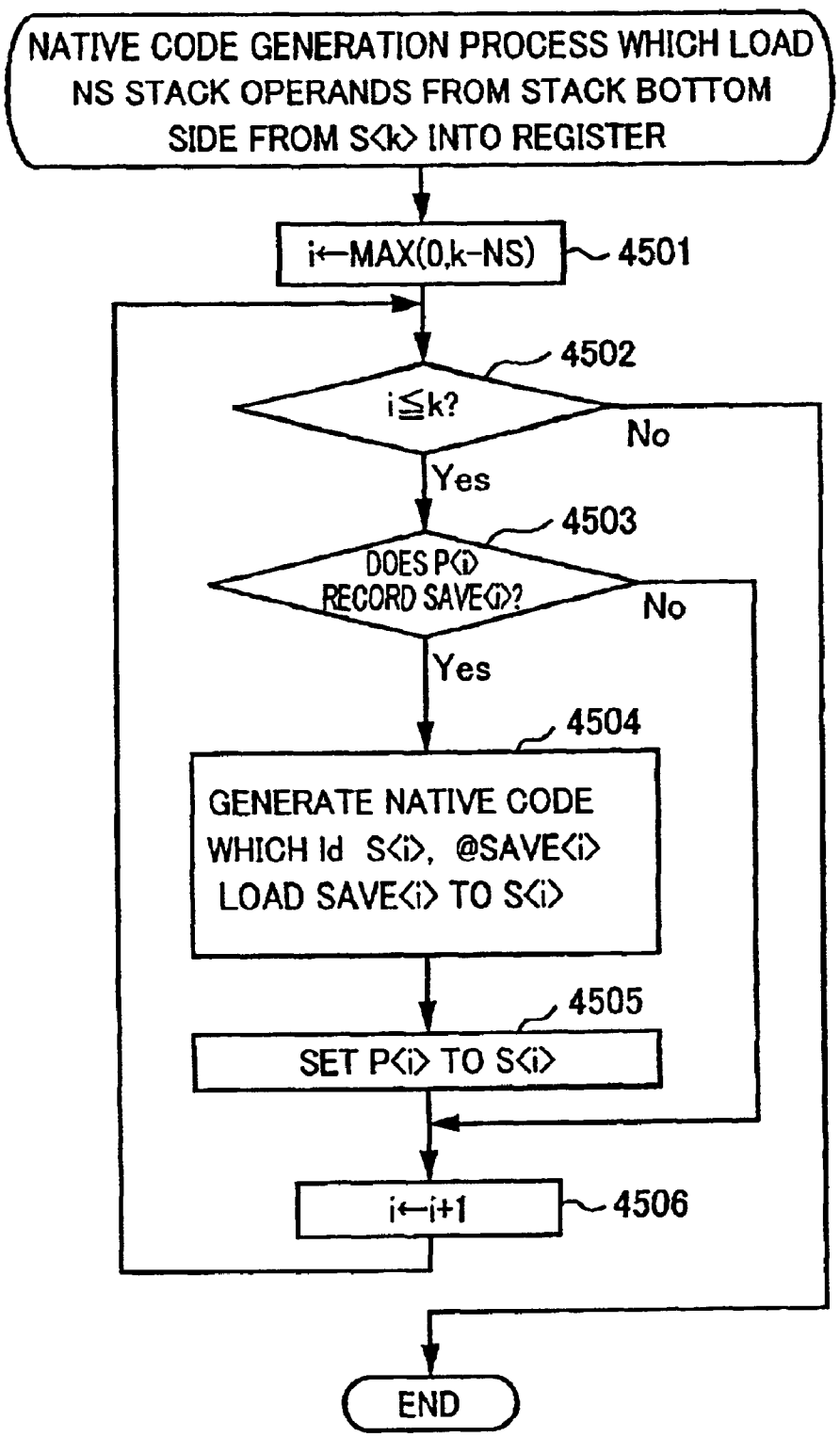
FIG. 53 is a flow chart of the procedure of a native code generation process to store NS stack operands from S<k> in a register according to the third embodiment.

This native code insertion process is shown in FIGS. 51 and 53.

FIG. 51 shows the process of generating a native code that actually effect transfer when the transfer of the immediate value or local variable to the stack operand is pending. By the control of steps 4401, 4402 and 4411, the process of steps 4403–4410 is repeated for i=0 to k. More specifically, the process to reserve register S<i> is carried out (steps 4404 and 4408) for P<i> corresponding to an immediate value or L<n>. Then, the native code to load the immediate value or the value of L<n> to register S<i> is generated (4405, 4409). Then, the value of P<i> is modified to S<i> to indicate that a valid value is held in register S<i> (4406, 4410).

Figure 52:
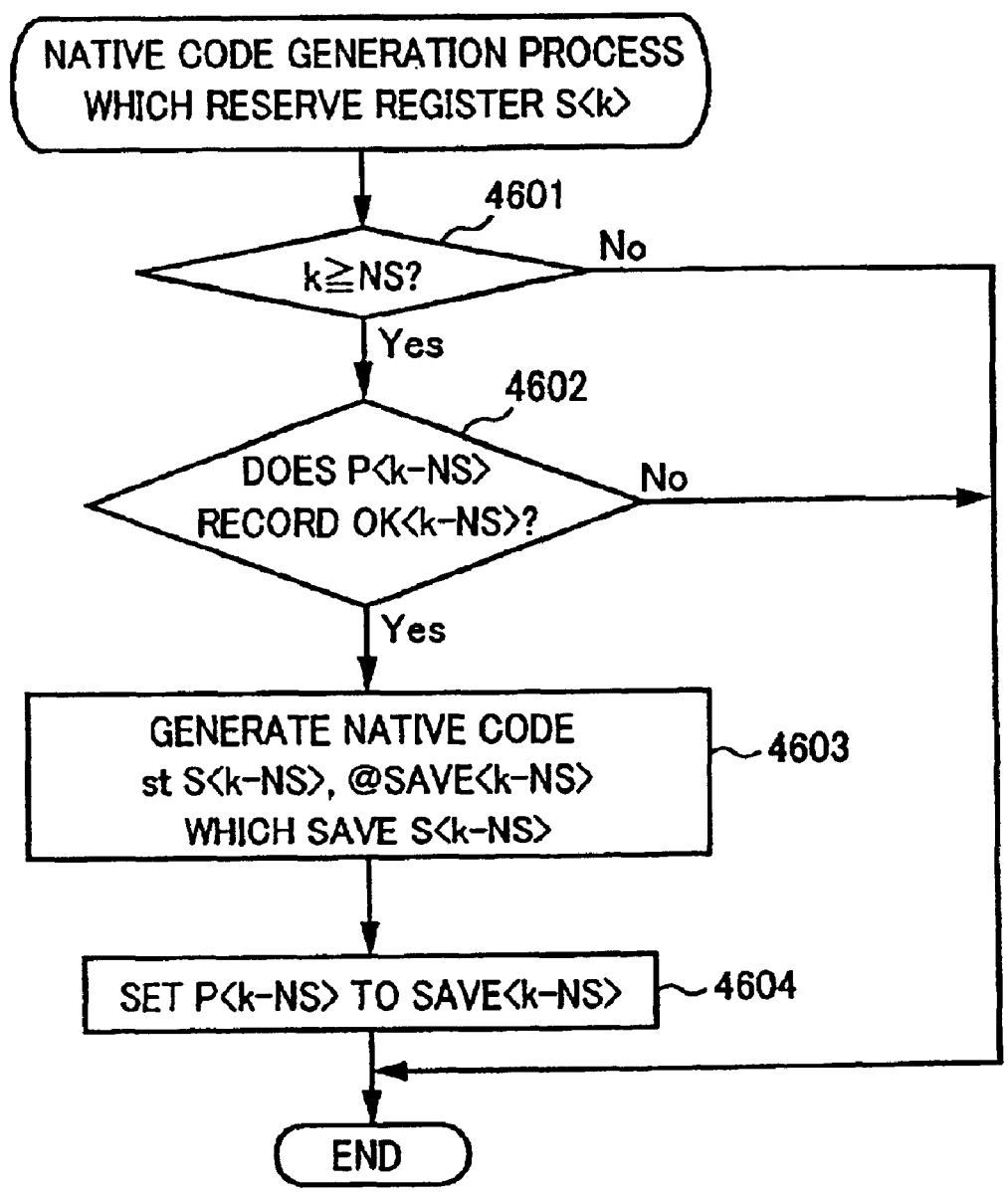
FIG. 52 is a flow chart of the procedure of a native code generation process to reserve register S<k> according to the third embodiment.

The process to generate native codes which reserves register S<k> (steps 3504 and 3704) is carried out according to the flow chart of FIG. 52. First, determination is made whether register S<k> is holding the value of stack operand [k-NS] (4602). If the value is not held, register S<k> is empty. If the value is held, the native code of "st S<k-NS>, @SAVE<k-NS>" is generated to save the value of register S<k> (identical to register S<k-NS>) (4603). Then, the value of P<k-NS> is modified to SAVE<k-NS> in order to indicate that value of register S<k-NS> is saved (4604).

FIG. 53 shows the process of generating native codes that load the operand that are saved in SAVE<i> and that are any of the NS operands at the stack bottom side from stack operand [k] into respective allocated registers. The process of steps 4503–4505 is repeated for i=k-NS (provided that 0 for k<NS) to k. More specifically, when P<i> is SAVE<i> (4504), the native code of "ld S<i>, @SAVE<i>" is generated (4504). The value of P<i> is modified to S<i> to indicate that a valid value is held in register S<i> (4505).

Figure 54:
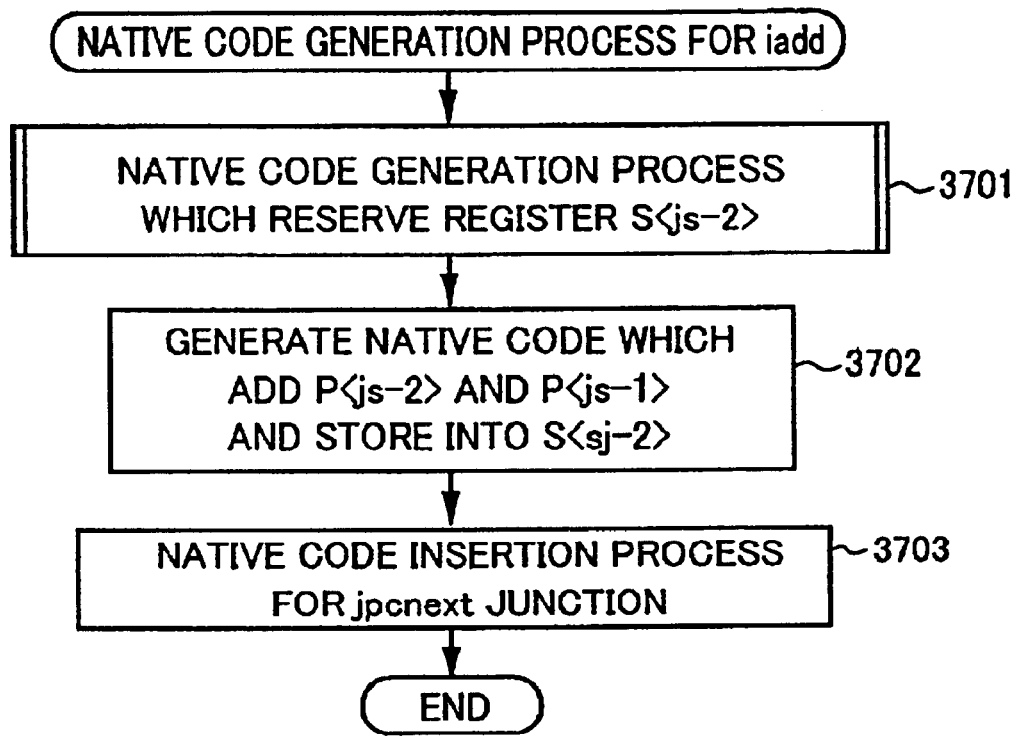
FIG. 54 is a flow chart of the procedure of a native code generation process for iadd according to the third embodiment.

FIG. 54 is the generation process of a native code for iadd. Since iadd writes to writing into stack operand [js-2] (js is the stack depth before executing the iadd), the generation process of a native code to reserve the corresponding allocated register S<js-2> is carried out (3701). At step 3702, a native code is generated which adds the data of the transfer sources recorded in P<js-2> and P<js-1> and stores the added result into register S<js-2>. The particular native code generated here will be different as shown in FIG. 55 according to the combination of the values of P<js-2> and P<js-1>. There are special cases in which no native code is generated as in cases 1 and 6. In these two cases, the immediate value is recorded in P<js-2>. In other cases, P<js-2> is modified to S<js-2> in order to indicate that a valid value is stored in S<js-2>. The process following step 3703 is as shown in FIG. 56 (identical to step 3602 of FIG. 50).

FIG. 56 shows the native code insertion process for junction at jpcnext. When there is a label at jpcnext, i.e., when the program execution path is merged at jpcnext, the process of steps 4302–4304 is carried out.

At step 4302, the registered value of the stack depth at jpcnext is obtained and set to jpcnext. At step 4303, the native code generation process to commit the stack operands of [0] to [jsnext-1] is carried out (this process is as shown in FIG. 51). At step 4304, the native code generation process to load the NS stack operands from S<jsnext-1> into the registers is carried out. The process of this step is shown in FIG. 53.

A similar operation to iadd is carried out for isub, imul, and idiv except that the addition for iadd is replaced with subtraction, multiplication and division, respectively.

Figure 57:
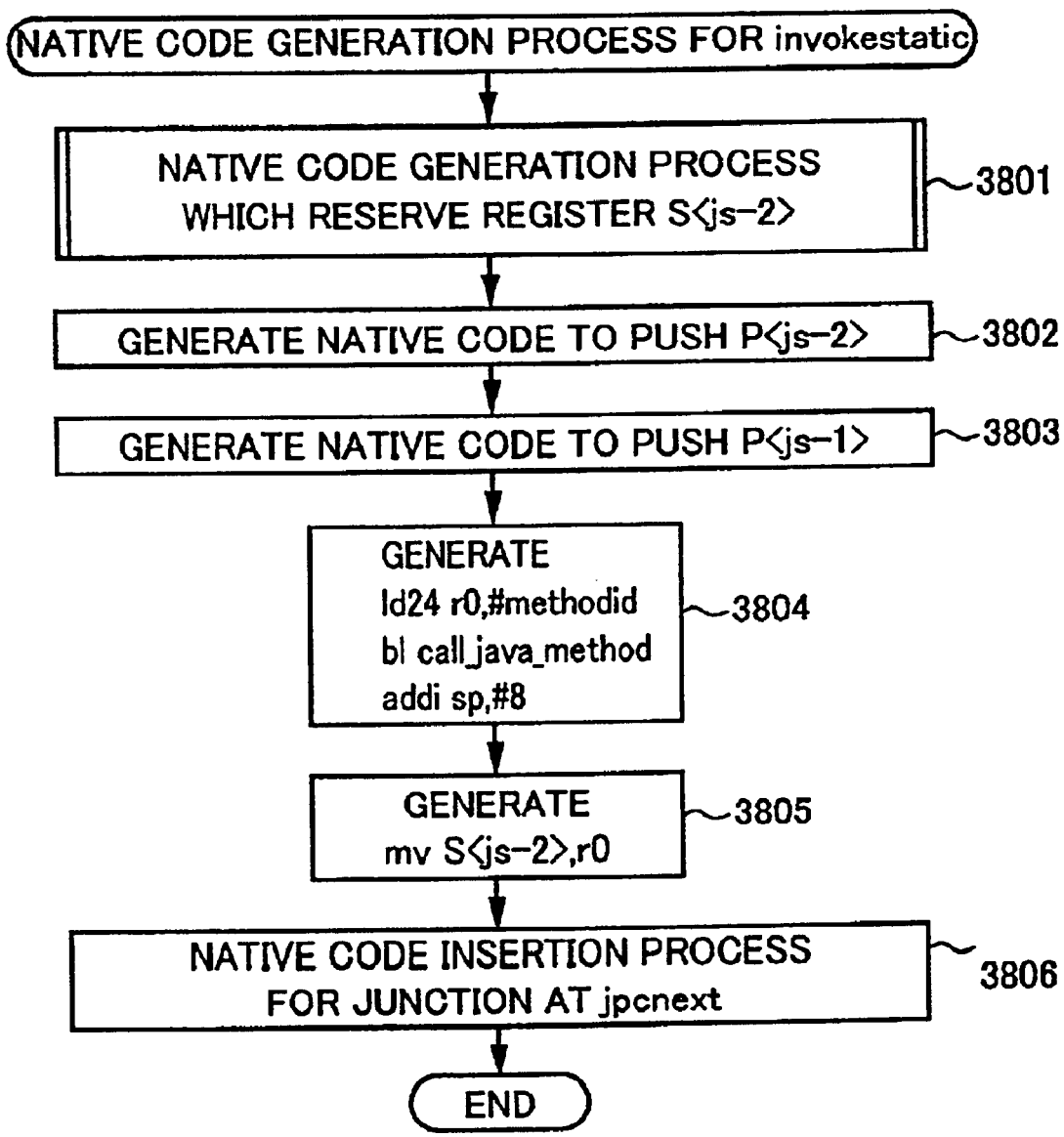
FIG. 57 is a flow chart of the procedure of a native code generation process for invokestatic according to the third embodiment.

FIG. 57 is the native code generation process for invokestatic<int (int, int)>. Since invokestatic<int (int, int)> writes into stack operand [js-2] as iadd to store a return value, a native code generation process to reserve the allocated register S<js-2> as in iadd is carried out (3801). Then, the native code to push the data of the transfer source recorded in P<js-2> and P<js-1> on the stack as the argument is generated (3802, 3803). The particular native code generated will be different according to the values of P<js-2> and P<js-1>. The codes are not illustrated here but they are the same as iadd. The native code to be generated subsequently (3804, 3805) is similar to that of the first embodiment. The process of steps after step 3806 is shown in FIG. 56.

Figure 58:
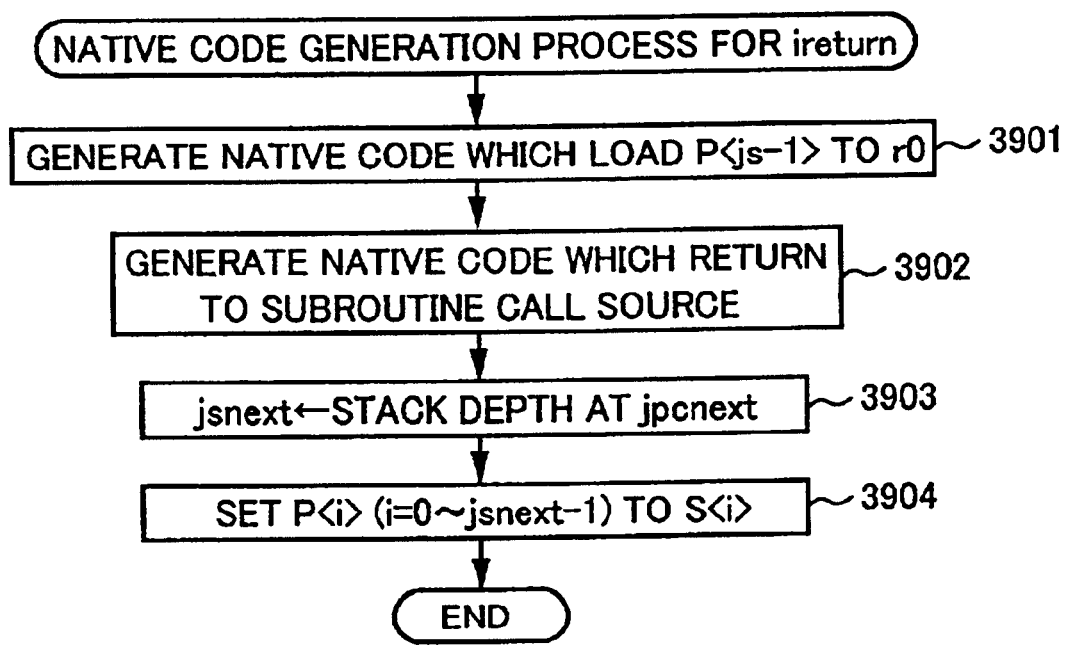
FIG. 58 is a flow chart of the procedure of a native code generation process for ireturn according to the third embodiment.

FIG. 58 is the native code generation process for ireturn. First, a native code to transfer the data of the transfer source recorded in P<js−1> to register r0 is generated (3901). The native code generated here varies according to the value of P<js−1>. Respective native codes thereof are not shown here. Native code 3902 that is generated subsequently is similar to that of the first embodiment. Finally, P<i> is set to be ready for the generation of a native code for the next addresses (3903, 3904).

Figure 59:
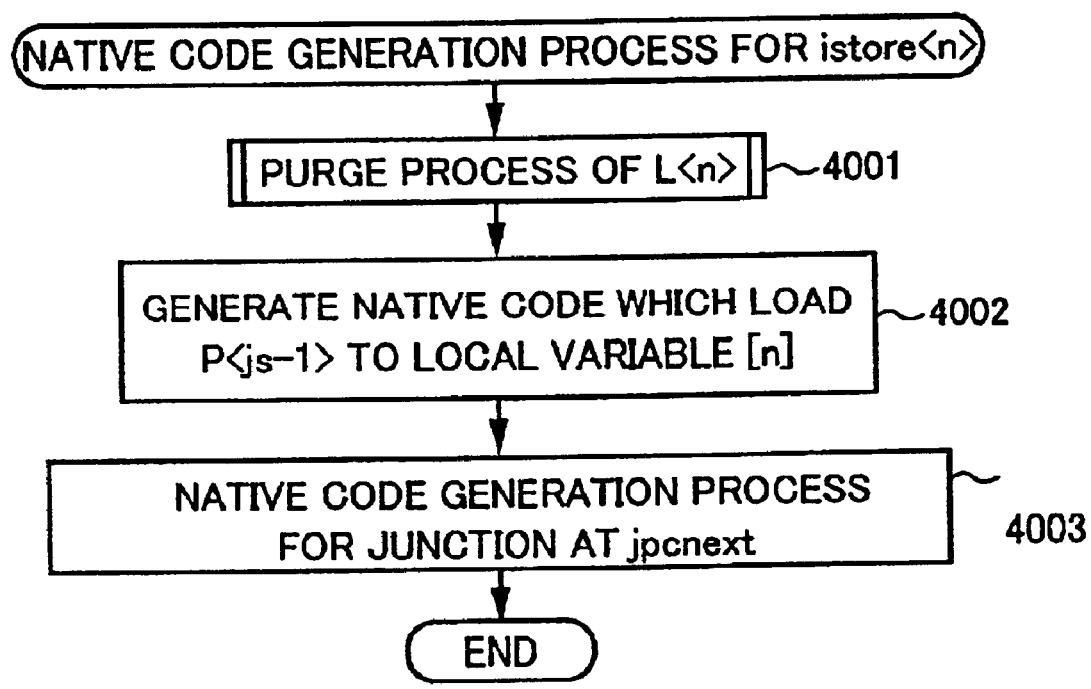
FIG. 59 is a flow chart of the procedure of a native code generation process for istore_<n> according to the third embodiment.

FIG. 59 is the native code generation process for istore_<n>. It is to be noted that istore$_{13}$ <n> writes into local variable [n]. Prior to writing into the local variable, the data transfer to the operand stack that has this local variable as the transfer source, when pending, must first be effected. For this purpose, a native code thereof is first generated (4001). Then, the native code to transfer the data of the transfer source recorded in P<js−1> to local variable [n] is generated. The native code generated here (not shown) varies depending whether the value of P<js−1> and whether L<n> corresponds to a memory or a register. The process of steps after step 4003 are shown in FIG. 56.

Figure 60:
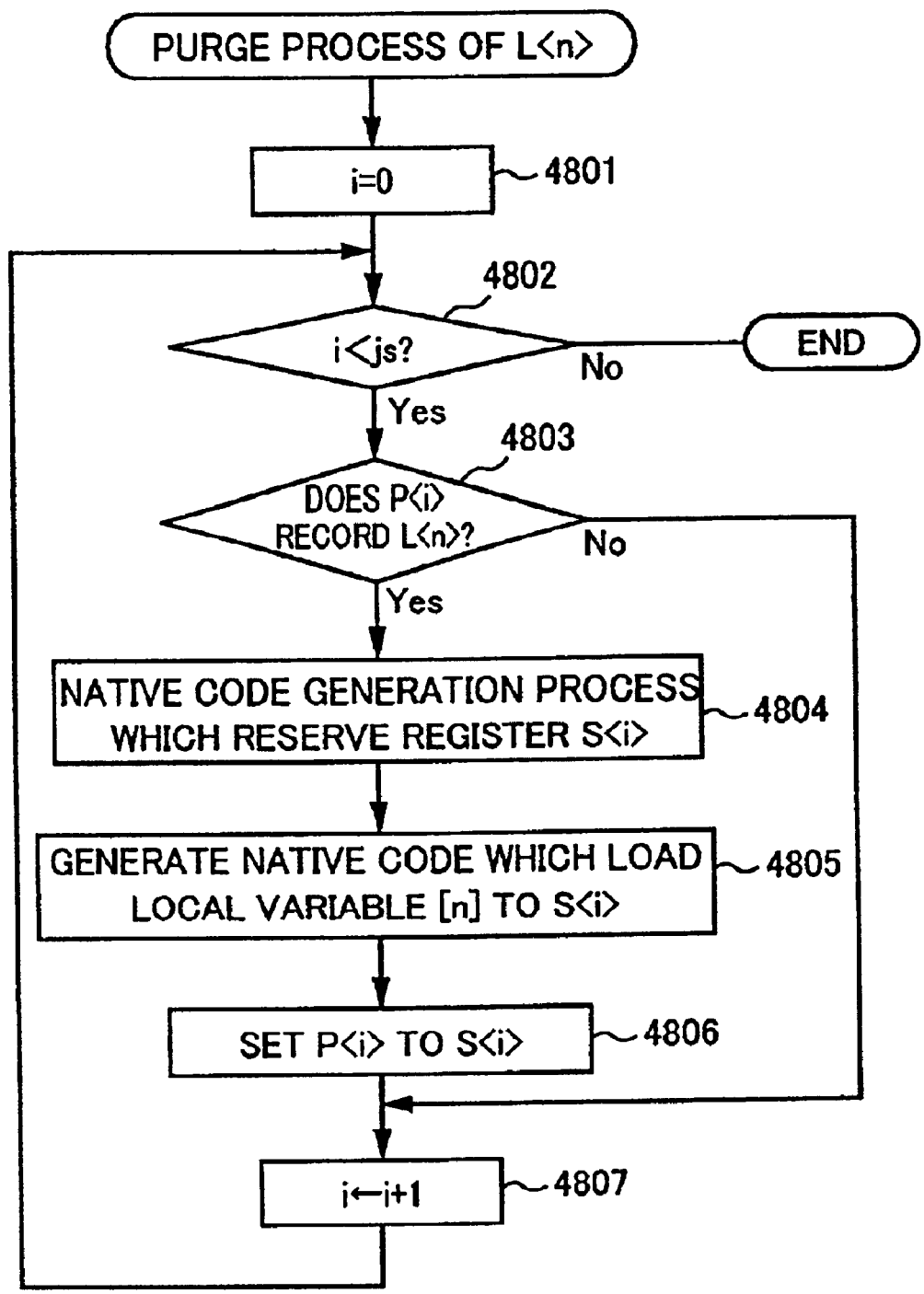
FIG. 60 shows the purge process of L<n> according to the third embodiment.

The process of step 4001 is shown in FIG. 60. By the control through steps 4801, 4802 and 4807, the process of steps 4803–4806 is repeated for i=0 to js−1. More specifically, if L<n> is recorded in P<i> (4803), register S<i> is reserved (4804). The native code which loads L<n> to register S<i> is generated (4804). P<i> is modified to S<i> in order to indicate that a valid value is stored in S<i> (4806).

Figure 61:
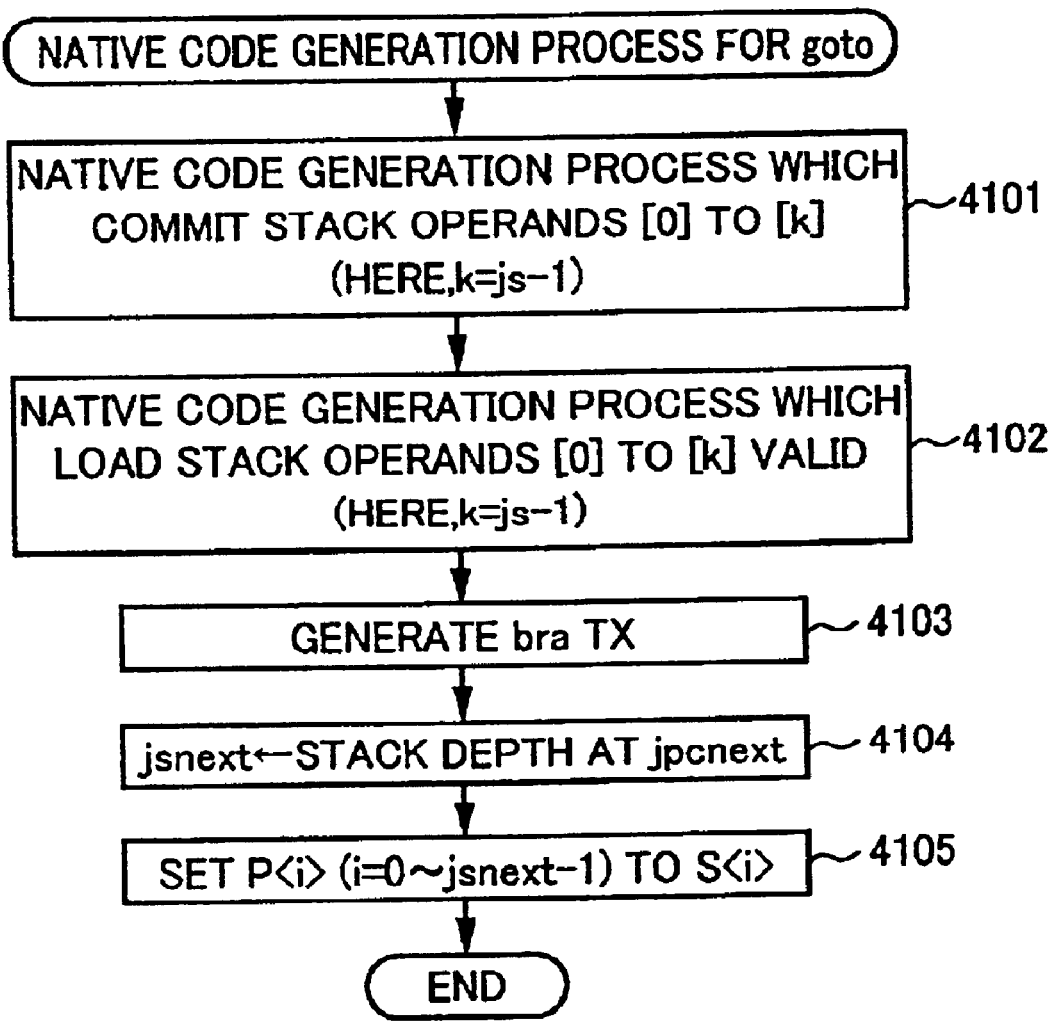
FIG. 61 is a flow chart of the procedure of a native code generation process for goto according to the third embodiment.

FIG. 61 is the native code generation process for goto. Prior to the generation of the branching native code (bra) (4103), the native code which stores the value into registers allocated to the NS operands at the stack top side from stack operand [js−1] is generated (4101, 4102). The process of these steps is shown in FIG. 52.

Figure 62:
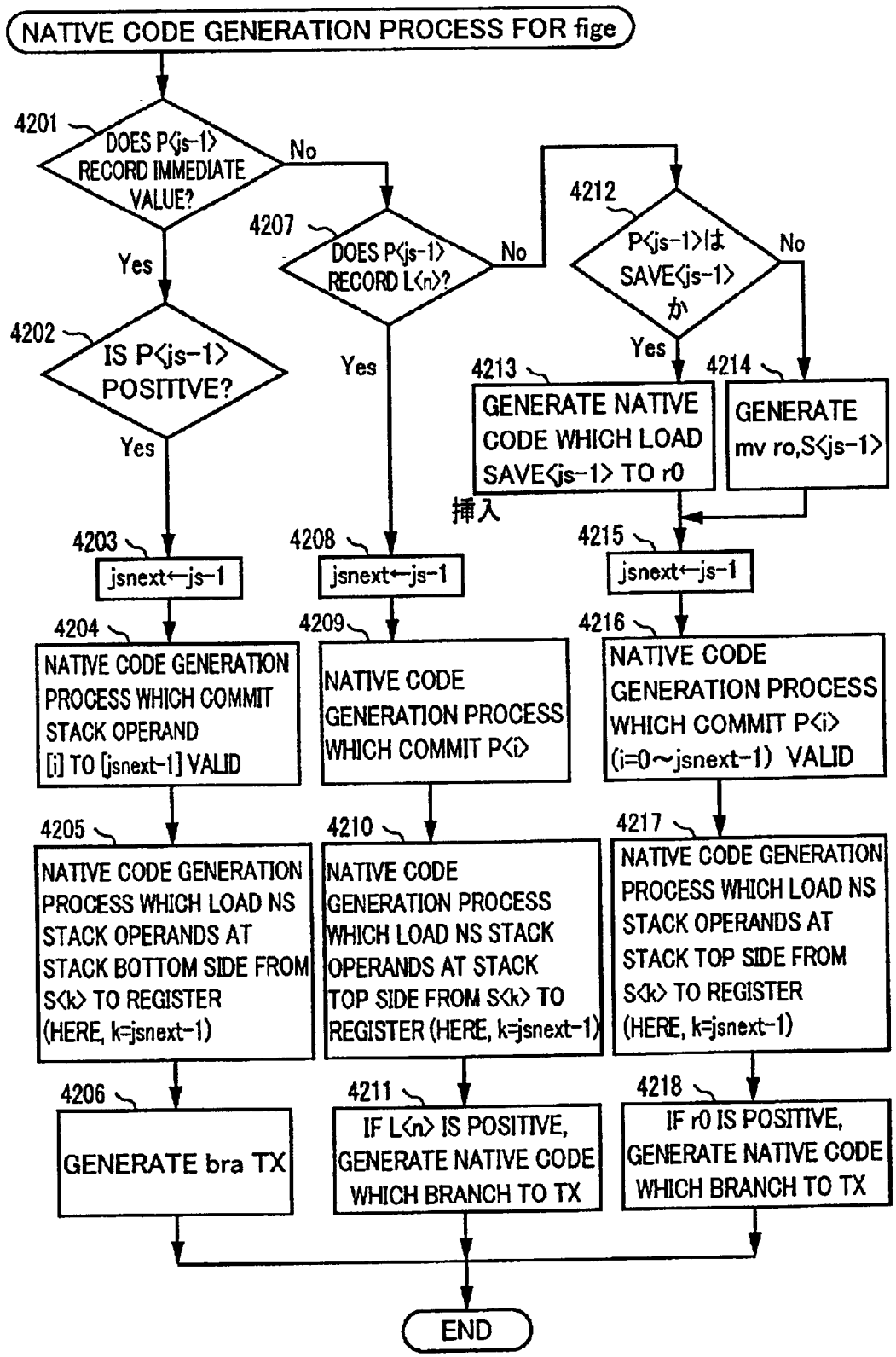
FIG. 62 is a flow chart of the procedure of a native code generation process for ifge according to the third embodiment.

FIG. 62 shows the native code generation process for ifge. Before generating the native code which compares the data of the transfer source recorded in P<js−1> with 0, and the native code which conditionally branches if the transfer source data >=0, a native code which loads the value of the NS entries at the stack top into the allocated registers is generated. Here, k=js−2 since the stack top is the stack top after the execution of ifge (steps 4203–4205, 4208–4210 and 4215–4217).

The description follows which shows how the method of Java bytecode of FIG. 6 is converted into a subroutine of native codes according to the procedure of FIG. 14.

The process up to step 602 is similar to that of the second embodiment. In other words, register allocation as shown in FIG. 46 is achieved.

At step 603, the process of FIG. 20 is carried out. FIG. 63 shows the native codes generated during the execution of this process.

At step 1201, the native code shown at status (1) in FIG. 63 is generated. This includes the native code to modify the stack layout from that of FIG. 32 to FIG. 33, and the native code to load any value that is an argument and allocated to the register (here, L<0> and L<2>) from the memory into the register.

At step 1202, jpc=0. At step 1203, the obtained Java bytecode jinst at address 0 is iload_0. At step 1204, the obtained jinstsize is 1. At step 1205, the obtained jpcnext is 1. Since stack depth 0 is registered in correspondence to address 0 as shown in (1) of FIG. 35, the value of js obtained at step 1206 is 0.

At step 1207, a process shown in FIGS. 50-62 is carried out according to Java bytecode jinst that is to be converted. In the present example, the process of FIG. 50 is carried out since jinst is iload_0. At step 4001, L<0> is recorded into P<0>. Control proceeds to NO from step 3602, and the process of FIG. 50 ends. In this way, the status (2) of FIG. 63 is achieved. After all, no native code for iload_0 is generated at (2).

Similarly for (3) of FIG. 63, no native code is generated. Only L<1> is recorded in P<1>.

In (4) of FIG. 63, the process of FIG. 54 is carried out at step 1207. At step 3701, the process of FIG. 52 is carried out (i=js−2=0). The determined result at step 4601 becomes (i=js−2=0). The determined result at step 4601 becomes "NO", and the process ends. At step 3702, the native code of FIG. 55 is generated. Here, the native code for case 29 is generated since operands P<0> and P<1> at stack depth js=2 are L<0> (register) and L<1> (register), respectively. The value of P<0> is altered to S<0>, and the process of FIG. 52 ends. At step 3703, the process of FIG. 56 is carried out. The determination result at step 4301 becomes "NO", and the process ends. Thus, the process of FIG. 54 ends.

In the conversion process of (5) in FIG. 63, the process of FIG. 59 is implemented at step 1207. At step 4001 of FIG. 59, the process of FIG. 60 is implemented. Since L<2> is not registered any of P<i> here, the determination result of step 4803 is always "NO". No native code is generated, and the process ends. Since P<0> is "S<0>" at stack depth js=1, a native code to store S<0> into local variable [2] at step 4002 is generated. Since local variable [2] is allocated to the memory as shown in FIG. 46, the native code of "st S<0>, @L<2>" is generated. Although the process of FIG. 56 is implemented at step 4003, the determination result at step 4301 becomes NO, and the process ends. Thus, the process of FIG. 59 ends.

The conversion process for (6) of FIG. 63 is similar to (2). Immediate value 1 is recorded in P<0>, and no native code is generated.

Similarly for (7) of FIG. 63, L<0> is recorded in P<1>, and no native code is generated.

For (8) of FIG. 63, the process of FIG. 62 is implemented at step 1207. Since P<1> is L<0> at stack depth js=2 here, control proceeds to steps 4201, 4207 and 4208. At step 4208, the obtained jsnext is 1. At step 4209, the process of FIG. 51 is implemented (k=0). From steps 4401, and 4402, i=0 is achieved, and control proceeds to step 4403. Since P<0> is an immediate value, control proceeds to step 4404. At step 4404, the process of FIG. 52 is implemented (k=0). Control proceeds from step 4061 to the NO side, and the process of FIG. 52 ends. At step 4405, a native code is generated which loads the immediate value (1) of P<0> to S<0>. Here, the native code of "ldi S<0>, #1" is generated. At step 4406, P<0> is changed to S<0>. Control proceeds through steps 4406 and 4402 to NO, and the process of FIG. 51 ends.

At step 4205 of FIG. 62, the process of FIG. 53 is implemented (k=0). Since there is no P<i> that records SAVE<i>, the determination result at step 4503 become "NO". The process of FIG. 53 ends without the generation of a native code. At step 4206, the native code of "bra T21" is generated.

(9)–(13) of FIG. 63 are processed similar to (6) (2) (2) (6) (2), respectively. Immediate value 2, L<0>, L<1> and immediate value 3, L<2> are recorded in P<1> to P<5>, respectively.

In (14) of FIG. 63, the process of FIG. 54 is carried out at step 1207. Here, at step 3701 of FIG. 54, the process of FIG. 52 is implemented (k=js−2=4). Here, control proceeds through step 4601 (YES) and 4602. Since SAVE<0> is recorded in P<0>, control proceeds to step 4603. At step 4603, a native code which stores S<0> is generated. More specifically, the native code of "st S<0>, 169 SAVE<0>" is generated. At step 4604, the value of P<0> is altered to the value of SAVE<0>, and the process of FIG. 52 ends.

At step 3702 of FIG. 54, the native code of FIG. 55 is generated. Since operands P<4> and P<5> correspond to immediate value 3 and L<2> (memory), respectively, at stack depth js=6 here, the native code of case number 5 is generated. The value of P<4> is altered to the value S<4>, and the process of FIG. 56 ends. Thus, the process of FIG. 54 ends.

In (15) of FIG. 63, the process of FIG. 54 is implemented at step 1207 (subtraction is used instead of addition). At step 3701, the process of FIG. 52 is carried out (k=js−2=3). Here, the determination result of step 4601 becomes "NO", and the process ends. At step 3702, a native code similar to that of FIG. 55 is generated. Since operands P<3> and P<4> are L<1> (register) and S<4> (register), respectively, at stack depth js=5 here, the native code of case number 27 is generated (except that div is used instead of add). The value of P<3> is altered to the value of S<3>.

Although the process of FIG. 56 is carried out at step 3703, the determination result of step 4301 becomes "NO", and the process ends. Thus, the process of FIG. 54 is completed.

In the conversion process of (16) of FIG. 63, the process of FIG. 54 is implemented at step 1207. Although the process of FIG. 52 (k=js−2=2) is carried out at step 3701 of FIG. 54, the determination result at step 4601 becomes "NO", and the process ends. At step 3702, the native code of FIG. 55 is generated. Since operands P<2> and P<3> are L<0> (register) and S<3> (register), respectively, at stack depth js=4 here, the native code of case number 27 is generated. The value of P<2> is changed to the value of S<2>. At step 3703, the process of FIG. 56 is implemented. The determination result at step 4301 becomes "NO", and the process ends. Thus, the process of FIG. 54 ends.

In the conversion process of (17) of FIG. 63, the process of FIG. 54 is implemented at step 1207 (except that multiplication is effected instead of addition). At step 3701, the process of FIG. 52 is carried out (k=js−2=1). At step 4601, the determination result becomes "NO", and the process of FIG. 52 ends.

Returning to FIG. 54, the native code of FIG. 55 is generated at step 3702 (except that mul is used instead of add). Since operands P<1> and P<2> are immediate value 2 and S<2> (register), respectively, at stack depth js=3, the native code of case number 2 is generated. Since the multiplication of immediate value 2 is obtained by shifting leftwards by two bits, instruction sll3, not instruction mul, is generated. The value of P<1> is altered to the value of S<1>. At step 3703, the process of FIG. 56 is implemented. At step 4301, the determination result becomes "NO", and the process of FIG. 56 ends with no operation. Thus, the process of FIG. 54 ends.

In the conversion process of (18) of FIG. 63, the process of FIG. 61 is implemented at step 1207. At step 4101 of FIG. 61, the process of FIG. 51 is effected (k=js−1=1). Since P<i> recorded with an immediate value or a local variable is not present, control proceeds through steps 4403 (NO) and 4407 (NO) for both cases of i=0 and 1. The process of FIG. 51 ends.

Returning to FIG. 61, the process of FIG. 53 is implemented at step 4102 (k=js−1=1). At step 4501, the obtained i is 0. Control proceeds to steps 4502 and 4503. Since SAVE<0> is recorded in P<0>, control proceeds to step 4504. At step 4504, a native code is generated which load the value from the memory region of SAVE<0> into register S<0>. More specifically, the native code of ld S<0>, @SAVE<0> is generated. At step 4504, the value of P<0> is altered to S<0>. At step 4506, i=1 is achieved, and control proceeds to steps 4502 and 4503. Since P<1> is S<1>, the determination result of step 4503 becomes "NO". Therefore, at step 4506, i=2 is achieved. The determination result of step 4502 becomes "NO", and the process of FIG. 53 ends.

Returning to FIG. 61, the native code of "bra T28" is generated at step 4103. In this way, the status of (18) in FIG. 63 is achieved.

The value of jsnext obtained at step 4104 of FIG. 61 is 1. At step 4105, P<0> becomes S<0>. The foregoing corresponds to (18') in FIG. 63.

In the conversion process of (19) in FIG. 64, L<0> is recorded in P<1> similar to (2). No native code is generated.

At (20) of FIG. 64, 1 is recorded in P<2>, similar to (6), and no native code is generated.

At (21) of FIG. 64, the native code shown is generated similar to (4) (provided that subtraction is effected instead of addition). This corresponds to case number=25 of FIG. 55. P<1> is altered to S<1>.

At (22) of FIG. 64, L<2> is recorded in P<2>, similar to (2). No native code is generated.

At (23) of FIG. 63, the process of FIG. 57 is implemented at step 1207. At step 3801 of FIG. 57, the process of FIG. 52 is implemented (k=js−2=1). The determination result of step 4601 becomes "NO", and the process ends. Control returns to step 3802 of FIG. 57. Since P<1> is S<1>, the native code generated at step 3802 becomes "push S<1>". Since P<2> is L<2> and L<2> is allocated the memory, the native code generated at step 3803 of FIG. 57 is "ld r0, @L<2>" and "push r0". Control proceeds through steps 3804 and 3805, whereby the native codes shown is generated. Although the process of FIG. 56 is implemented at step 3806, no native code is generated.

In the conversion process of (24) of FIG. 64, the native codes shown are generated similar to (4). This corresponds to case number 14 of FIG. 55. P<0> is altered to S<0>.

In the conversion process of (25), the process of FIG. 58 is implemented at step 1207. Since P<0> is S<0>, the native code generated at step 3901 is "mv r0, S<0>". Control proceeds to step 3902, and the native code of (25) of FIG. 64 is generated.

According to the data processor of the third embodiment, no native code is generated for the Java bytecode that effects only data transfer. The transfer source is recorded in correspondence with the operand of the transfer destination. In the case where an operand that has the transfer source already recorded is to be used in the conversion of Java bytecode that effects an operation, a native code is generated that carries out the operation using the recorded transfer source. Therefore, the number of resultant native codes after conversion is reduced. As a result, the execution speed is also improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor comprising:
   a processor with a predetermined instruction group as its native codes;
   a hardware translator converting a code which is non-native to said processor into one or more native codes of said processor; and
   a memory storing a program constituted by a native code operating on said processor,
   said program stored in said memory including
   a software translator program operating on said processor to convert a code that is non-native to said processor into one or more native codes of said processor and storing the converted native code in said memory,
   a software interpreter program operating on said processor to sequentially interpret a code that is non-native to said processor and executing said interpreted code using a native code of said processor, and
   a select program to select any of execution of a native code output by said hardware translator, execution of a native code output by said software translator and stored in said memory, and sequentially interpreting and executing non-native code by execution of said software interpreter according to a predetermined criterion to operate said processor.

2. The data processor according to claim 1, wherein said select program includes a program to select any of execution of a native code output by said hardware translator, execution of a native code output by said software translator, and sequential interpretation and execution of non-native code by execution of said software interpreter, depending upon a type and execution frequency of a read out non-native code and a status of said memory to operate said processor.

3. The data processor according to claim 1, wherein said select program includes a program to select any of execution of a native code output by said hardware translator, execution of a native code output by said software translator, and sequential interpretation and execution of non-native code by execution of said software interpreter, depending upon a type and execution frequency of a read out non-native code and a size of an available empty region in said memory to operate said processor.

4. The data processor according to claim 1, wherein said select program includes a program to select any of execution of a native code output by said hardware translator, execution of a native code output by said software translator, and sequential interpretation and execution of non-native code by execution of said software interpreter, depending upon an address in said memory and execution frequency of a read out non-native code and an available empty region in said memory to operate said processor.

5. The data processor according to claim 1, wherein said select program includes a program to select any of execution of a native code output by said hardware translator, execution of a native code output by said software translator, and sequential interpretation and execution of non-native code by execution of said software interpreter, depending upon an address in said memory and execution frequency of a read out non-native code to operate said processor.

6. The data processor according to claim 1, wherein said select program includes a program to select any of execution of a native code output by said hardware translator, execution of a native code output by said software translator, and sequential interpretation and execution of non-native code by execution of said software interpreter every time a method constituted by said non-native code is called according to said predetermined criterion to operate said processor.

7. The data processor according to claim 1, wherein said software translator includes a code conversion program to convert non-native code into a native code so that at least a portion of a memory operand included in said non-native code is allocated to a register provided in said processor.

8. The data processor according to claim 7, wherein said non-native code is a native code of a predetermined stack machine,
   wherein said code conversion program includes a program to generate a native code effecting storage and reset of data during execution between said memory and a register of said processor so that a stack operand at a stack top side among stack operands of said memory operand is stored in a register provided in said processor.

9. The data processor according to claim 8, wherein said code conversion program further includes a program to detect non-native code that effects only data transfer to a stack and storing said detected non-native code in correspondence between a transfer source and a transfer destination thereof,
   wherein said program to generate includes a program to generate a native code to effect storage and reset of data during execution between said memory and a register of said processor so that a stack operand of a stack top side from stack operands out of memory operands of said non-native code that carries out only data transfer is stored in a register provided in said processor, and for a code that uses said transfer destination as an operand, said transfer source stored in said memory is taken as an operand instead of said transfer destination.

10. An operation method of a data processor including:
    a processor with a predetermined instruction group as a native code,
    a hardware translator converting a code that is non-native to said processor into one or more native codes of said processor, and
    a memory storing a program constituted by a native code operating on said processor,
    said program stored in said memory including
    a software translator program operating on said processor to convert a code that is non-native to said processor into one or more native codes of said processor and storing said converted native code in said memory,
    a software interpreter program operating on said processor to sequentially interpret a code that is non-native to said processor and executing said interpreted code using a native code of said processor,
    said operation method comprising the steps of:
    selecting any of execution of a native code output by said hardware translator, execution of a native code output by said software translator and stored in said memory, and sequential interpretation and execution of non-native code by execution of said software interpreter according to a predetermined criterion, and
    applying to said processor for operation any of a native code output by said hardware translator, a native code output by invoking said software translator with said non-native code read out as an argument and stored in said memory, and a program code of said software interpreter with said non-native code read out as an argument, according to a selected result of said select step.

11. The operation method according to claim 10, wherein said select step comprises the step of selecting any of execution of a native code output by said hardware translator, execution of a native code output by said software translator, and sequential interpretation and execution of non-native code by execution of said software interpreter depending upon a type and execution frequency of non-native code read out and a status of said memory to operate said processor.

12. The operation method according to claim 10, wherein said select step comprises the step of selecting any of execution of a native code output by said hardware translator, execution of a native code output by said software translator, and sequential interpretation and execution of non-native code by execution of said software interpreter depending upon a type and execution frequency of non-native code read out and an available empty region in said memory to operate said processor.

13. The operation method according to claim 10, wherein said select step comprises the step of selecting any of execution of a native code output by said hardware translator, execution of a native code output by said software translator, and sequential interpretation and execution of non-native code by execution of said software interpreter depending upon an address in said memory and execution frequency of non-native code read out and an available empty region in said memory to operate said processor.

14. The operation method according to claim 10, wherein said select step comprises the step of selecting any of execution of a native code output by said hardware translator, execution of a native code output by said software translator, and sequential interpretation and execution of non-native code by execution of said software interpreter depending upon an address in said memory and execution frequency of non-native code read out to operate said processor.

15. The operation method according to claim 10, wherein said select step comprises the step of selecting any of execution of a native code output by said hardware translator, execution of a native code output by said software translator, and sequential interpretation and execution of non-native code by execution of said software interpreter every time a method constituted by said non-native code is called according to said predetermined criterion to operate said processor.

16. The operation method according to claim 10, further comprising the step of converting non-native code into a native code so that at least a portion of a memory operand included in said non-native code is allocated to a register provided in said processor by operating on said processor said software translator according to a selected result in said select step.

17. The operation method according to claim 16, wherein said non-native code is a native code of a predetermined stack machine, wherein said code conversion step comprises the step of generating a native code to effect storage and reset of data during execution between said memory and a register of said processor so that a stack operand at a stack top side from stack operands of said memory operand is stored in a register provided in said processor.

18. The operation method according to claim 17, wherein said code conversion step further comprises the step of detecting non-native code that effects only data transfer to a stack and storing said detected non-native code in correspondence between a transfer source and a transfer destination thereof, wherein said generate step comprises the step of generating a native code to effect data storage and reset during execution between said memory and a register in said processor so that a stack operand at a stack top side among stack operands from a memory operand of said non-native code that effects only data transfer is stored in a register provided in said processor, and for a code that uses said transfer destination as an operand, said transfer source stored in said memory is taken as an operand instead of said transfer destination.

19. A data processor comprising:

processor means with a predetermined instruction group as a native code;

a hardware translator converting non-native code to said processor into one or more native codes of said processor;

a software translator operating on said processor to convert non-native code to said processor into one or more native codes of said processor;

storage means for storing a native code output by said software translator;

a software interpreter operating on said processor to sequentially interpret non-native code to said processor and executing said interpreted non-native code using a native code to said processor; and selection means for selecting any of execution of a native code output by said hardware translator, execution of a native code output by said software translator, and sequential interpretation and execution of non-native code by execution of said software interpreter to operate said processor according to a predetermined criterion.

20. The data processing apparatus according to claim 19, wherein said select means comprises means for selecting any of execution of a native code output by said hardware translator, execution of a native code output by said software translator, and sequential interpretation and execution of non-native code by execution of said software interpreter, depending upon a type or execution frequency of non-native code, or a status of said storage means to operate said processor.

* * * * *